US006728165B1

(12) United States Patent
Roscigno et al.

(10) Patent No.: US 6,728,165 B1
(45) Date of Patent: *Apr. 27, 2004

(54) ACOUSTIC SENSING SYSTEM FOR DOWNHOLE SEISMIC APPLICATIONS UTILIZING AN ARRAY OF FIBER OPTIC SENSORS

(75) Inventors: John A. Roscigno, Stevenson Ranch, CA (US); Craig W. Hodgson, Thousand Oaks, CA (US); Donald A. Frederick, Simi Valley, CA (US); William C. Knaack, West Hills, CA (US)

(73) Assignee: Litton Systems, Inc., Woodland Hills, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/429,048

(22) Filed: Oct. 29, 1999

(51) Int. Cl.⁷ ................................................. G01V 1/00
(52) U.S. Cl. ..................... 367/14; 367/149; 181/102; 340/854.7; 340/855.3; 340/855.5
(58) Field of Search .................... 250/256, 268, 250/261, 269.1, 263, 301; 181/102, 108, 105; 166/255.1, 250.16, 177.1, 177.2; 340/854.5, 854.6, 854.7, 854.9, 855.3, 855.5, 855.7; 356/241.1; 359/191, 290, 192, 305, 285; 367/14, 64, 25, 128, 149; 385/7; 702/1, 6, 2; 73/655

(56) References Cited

U.S. PATENT DOCUMENTS

| 4,375,680 A | 3/1983 | Cahill et al. |
| 4,440,498 A | 4/1984 | Sheem |
| 4,525,818 A | 6/1985 | Cielo et al. |
| 4,536,861 A | 8/1985 | Graindorge |
| 4,545,253 A | 10/1985 | Avicola |
| 4,752,132 A | 6/1988 | Pavlath |
| 4,768,850 A | 9/1988 | Moslehi et al. |
| 4,799,752 A | 1/1989 | Carome |
| 4,928,004 A | 5/1990 | Zimmermann et al. |
| 5,173,743 A | 12/1992 | Kim |
| 5,373,487 A | 12/1994 | Crawford |
| 5,589,937 A | 12/1996 | Brininstool |
| 5,636,021 A | 6/1997 | Udd |

(List continued on next page.)

OTHER PUBLICATIONS

K.P. Jackson, et al., *Fiber–Optic Delay–Line Signal Processors, Optical Signal Processing*, Chapter 7.1, 1987, pp. 431–476.

(List continued on next page.)

*Primary Examiner*—Edward Lefkowitz
*Assistant Examiner*—Anthony Gutierrez
(74) *Attorney, Agent, or Firm*—Patti & Brill, LLC

(57) ABSTRACT

A system for sensing subterranean acoustic waves emitted from an acoustic source includes a plurality of laser sources, a plurality of subterranean optical sensors, at least one optical detector, and electronics. The laser sources each emit light at a different frequency. The subterranean optical sensors receive the light and alter the light in response to the acoustic waves. The optical detector receives the altered light and outputs an electrical signal. The electronics receives the electrical signal and converts it into seismic data format. The hydrophone for sensing the acoustic signals is able to operate at pressures of at least 5,000 psi and temperatures of at least 130 degrees Celsius. A hydrophone may be housed in a cable having a diameter of less than about 1.5 inches. The hydrophone's sensor preferably includes a reference mandrel, two sensing mandrels, and a telemetry can, all of which are aligned in a coaxial, end-to-end configuration to reduce the profile of the hydrophone. Flexible interlinks having grooves therein for receiving optical fiber join the mandrels together. The reference mandrel and sensing mandrels advantageously have hemispherically-shaped endcaps, permitting them to operate at high pressure.

57 Claims, 37 Drawing Sheets

U.S. PATENT DOCUMENTS

| | | | |
|---|---|---|---|
| 5,636,022 | A | 6/1997 | Priest |
| 5,694,114 | A | 12/1997 | Udd |
| 5,796,504 | A | 8/1998 | Sonderegger et al. |
| 5,920,828 | A * | 7/1999 | Norris et al. ............... 702/14 |
| 5,962,819 | A | 10/1999 | Paulsson |
| 6,034,924 | A | 3/2000 | Vakoc |
| 6,040,571 | A | 3/2000 | Hodgson et al. |
| 6,084,233 | A | 7/2000 | Hodgson et al. |
| 6,249,622 | B1 | 6/2001 | Hodgson et al. |
| 6,269,198 | B1 | 7/2001 | Hodgson et al. |
| 6,282,334 | B1 | 8/2001 | Hodgson et al. |
| 6,288,975 | B1 | 9/2001 | Frederick et al. |

OTHER PUBLICATIONS

J. L. Wagener, et al., *Novel Fiber Sensor Arrays Using Erbium–Doped Fiber Amplifiers, Journal of Lightwave Technology*, vol. 15, No. 9, Sep. 1997, pp. 1681–1688.

Rajiv Ramaswami, et al., *Analysis of Effective Power Budget in Optical Bus and Star Networks Using Erbium–Doped Fiber Amplifiers, Journal of Lightwave Technology*, No. 11, Nov. 1993, pp. 1863–1871.

Wenxin Zheng, et al., *Erbium–Doped Fiber Splicing and Splice Loss Estimation, Journal of Lightwave Technology*, vol. 12, Mar. 1994, pp. 430–435.

S.G. Grubb, et al., *High–Power 1.48µm Cascaded Raman Laser in Germanosilicate Fibers, Technical Digest Optical Amplifiers and Their Applications*, Paper SaA4, Davos, Switzerland, 1995, pp. 197–199.

Joar Saether, et al., *Optical Amplifiers in Multiplexed Sensor Systems—Theoretical Prediction of Noise Performance*, Eleventh Optical Fiber Sensor Conference, Sappro, May 21–24, 1996, pp. 518–521.

A.D. Kersey, et al., *64–element Time–division Multiplexed Interferometric Sensor Array with EDFA Telemetry, OFC '96 Technical Digest*, OSA Technical Digest Series, vol. 2, Paper ThP5, 1996, pp. 270–271.

C.W. Hodgson, et al., *Large–scale Fiber Interferometric Sensor Arrays with Multiple Optical Amplifiers, Technical Digest for OFC '97*, vol. 6, Feb. 16–21, 1997, Dallas Convention Center, Dallas, Texas, Talk WJ5 Presented Feb. 19, 1997, pp. 157–158.

E. Brandon, et al., *Cayman—Jamaica Fiber System: The Longest 2.5 Gbit/s Repeaterless Submarine Link Installed, OFC '97*, vol. 6, OSA Technical Digest Series, paper TuL1, 1997 p. 60.

Joar Saether, et al., *Noise Performance of Multiplexed Fiber–Optic Sensor Systems with Optical Amplifiers, Optical Review*, vol. 4, No. 1A, 1997, pp. 138–144.

C.W. Hodgson, et al., *Large Scale Interferometric Fiber Sensor Arrays with Multiple Optical Amplifiers, Optics Letters*, vol. 22, No. 21, Nov. 1, 1997, pp. 1651–1653.

C.W. Hodgson, et al., *Optimization of Large–Scale Fiber Sensor Arrays Incorporating Multiple Optical Amplifiers, Part I:, Signal–to–Noise Ratio, Journal of Lightwave Technology*, vol. 16, No. 2, Feb. 1998, pp. 218–223.

C.W. Hodgson, et al., *Optimization of Large–Scale Fiber Sensor Arrays Incorporating Multiple Optical Amplifiers, Part II: Pump Power, Journal of Lightwave Technology*, vol. 16, No. 2, Feb. 1998, pp. 224–231.

C.W. Hodgson, et al., *Large–Scale Interferometic Fiber Sensor Arrays Incorporating Multiple Optical Switches, Optical Fiber Technology 4*, Article No. 0F980257, 1998, pp. 316–327.

U.S. patent application Ser. No. 09/430,057, filed Oct. 29, 1999.

U.S. patent application Ser. No. 09/824,119, filed Apr. 2, 2001.

E. Udd, *Fiber–optic acoustic sensor based on the Sagnac interferometer, Proceedings of the SPIE—The International Society for Optical Engineering*, vol. 425, 1983, pp. 90–91.

Robert J. Urick, *The noise background of the sea: ambient noise level, Principles of Underwater Sound*, 3rd Ed., Chapter 7, McGraw–Hill, 1983, pp. 202–236.

Moslehi, *Analysis of Optical Phase Noise in Fiber–Optic Systems Employing a Laser Source with Arbitrary Coherence Time, Journal of Lightwave Technology*, vol. LT–4, No. 9, Sep. 1986, pp. 1334–1351.

Kjell Kråkenes, et al., *Sagnac interferometer for underwater sound detection: noise properties, Optics Letters*, vol. 14, No. 20, Oct. 15, 1989, pp. 1152–1145.

H.S. Al–Raweshidy, et al., *Spread spectrum technique for passive multiplexing of interferometric optical fibre sensors, SPIE*, vol. 1314 Fibre Optics '90, pp. 342–347.

S.F. Collins, et al., *A Multiplexing Scheme For Optical Fibre Interferometric Sensors Using An FMCW Generated Carrier, OFS '92 Conference Proceedings*, pp. 209–211.

A.D. Kersey, et al., *Code–division Multiplexed Interferometric Array With Phase Noise Reduction And Low Crosstalk, OFS '92 Conference Proceedings*, pp. 266–269.

C.C. Wang, et al., *Very high responsivity fiber optic hydrophones for commercial applications, Proceedings of the SPIE—The International Society for Optical Engineering*, vol. 2360, 1994, pp. 360–363.

Sverre Knudsen, et al., *An Ultrasonic Fiber–Optic Hydrophone Incorporating a Push–Pull Transducer in a Sagnac Interferometer, Journal of Lightwave Technology*, vol. 12, No. 9, Sep. 1994, pp. 1696–1700.

Sverre Knudsen, *Ambient and Optical Noise in Fiber–Optic Interferometric Acoustic Sensors, Fiber–Optic Sensors Based on the Michelson and Sagnac Interferometers: Responsivity and Noise Properties*, Thesis, Chapter 3, Norwegian University of Science and Technology, 1996, pp. 37–40.

* cited by examiner

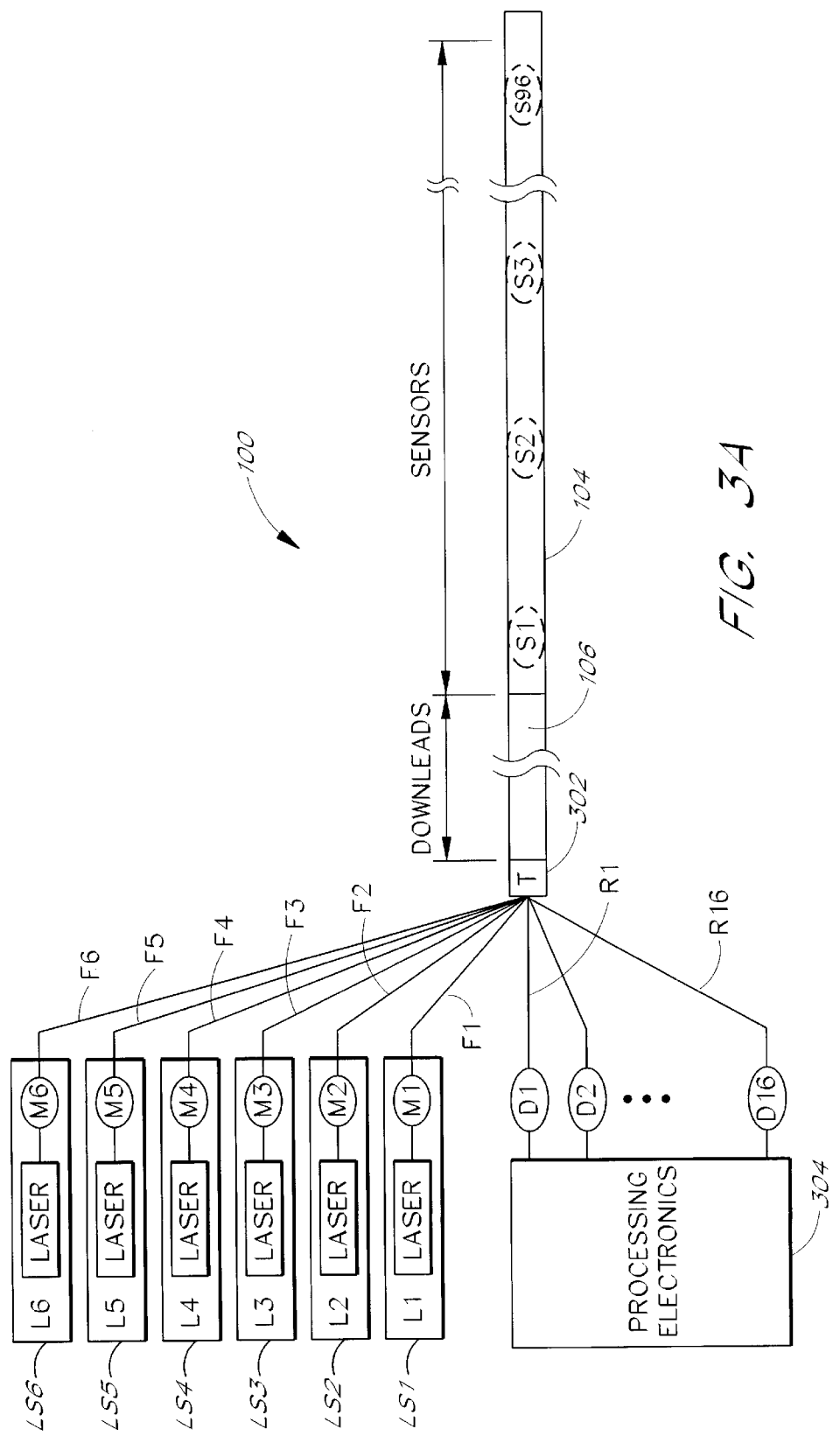

| FIG. 4A |
|---|
| FIG. 4B |
| FIG. 4C |
| FIG. 4D |
| FIG. 4E |
| FIG. 4F |
| FIG. 4G |
| FIG. 4H |

FIG. 4

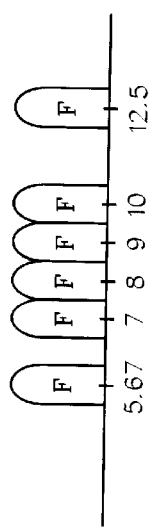
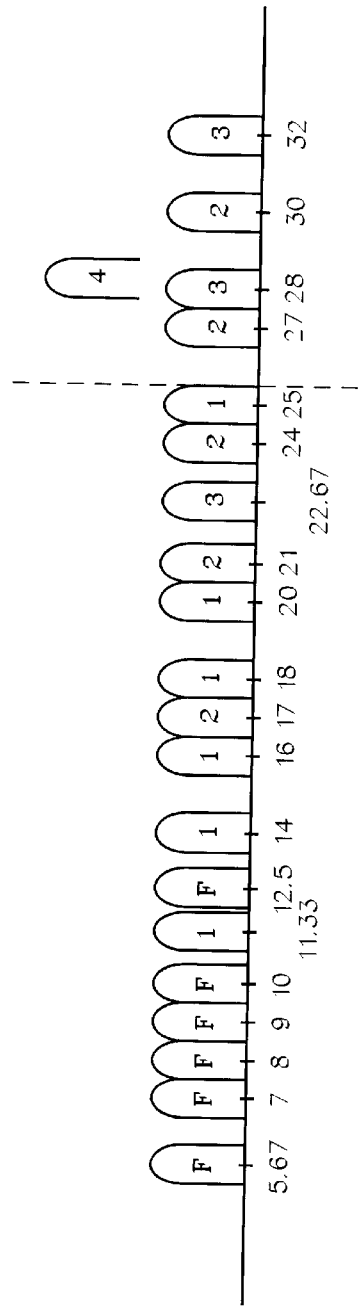
FIG. 14A
FIG. 14B

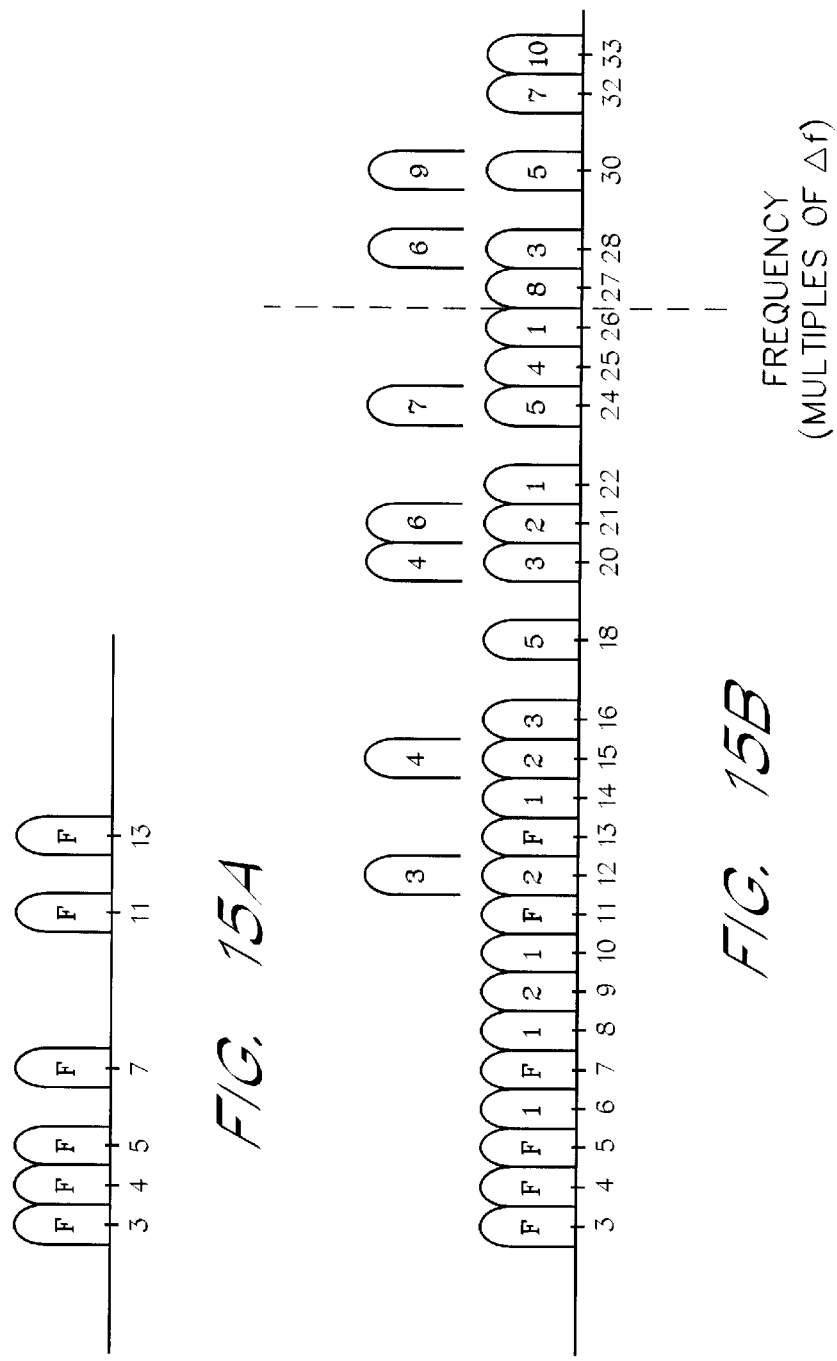

ACOUSTIC SENSING SYSTEM FOR DOWNHOLE SEISMIC APPLICATIONS UTILIZING AN ARRAY OF FIBER OPTIC SENSORS

BACKGROUND OF THE INVENTION

1. Field of the Invention

The present invention relates generally to acoustic sensing systems, and more specifically relates to a system for sensing acoustic waves comprising an acoustic sensor array.

2. Description of the Related Art

Typically, to obtain oil, a well or hole is dug by drilling and removing earth from the ground to form a shaft known as a "borehole," which extends to the bottom of the well. Generally, a large metal pipe or casing will be inserted into the borehole. Smaller pipes, known as production tubes, are inserted into the casing. These production tubes allow access to the bottom of the well. For example, oil may be drawn from the well through the production tubing.

Ultimately, the well will appear to go dry. Despite the apparent lack of oil within the well, vast supplies of oil are often trapped in pockets in the earth nearby the well. These pockets, however, are generally inaccessible to the drilled well. To locate such pockets, known in the art as "in-place" reserves, geologists conduct surveys of swaths of earth surrounding the wells. Geologists employ techniques like cross-well tomography in which acoustic waves are transmitted through a volume of earth to characterize properties, such as density, in that volume. Knowledge of the density of the earth helps determine the presence or absence of oil in the region of the earth being characterized.

To survey the transmission characteristics of a region of the earth, an acoustic wave source can be used to generate acoustic waves, i.e., sound, while an array of acoustic sensors detects these acoustic waves. Generally, each of the sensors in the array will be situated at a different location. The acoustic waves emitted from the acoustic source are thus sampled at a plurality of pints which typically make up a line. By changing the location of the acoustic source, the location of the sensor array, or both, the transmission characteristics of a volume of earth may be measured. In this manner, a three-dimensional map of the density throughout a region of earth can be produced.

Although some prior art techniques rely on acoustic sources and/or sensor arrays situated on the surface of the earth, placing the acoustic sources and sensor arrays deep within the earth is more effective for surveying lower regions of the earth. To conduct measurements deep within the earth, a probe can be lowered into the well.

However, the frailty of conventional prior art sensors prevents prior art sensor arrays from being employed deep within a well. Conventional sensor arrays employ piezoelectric transducers (or piezos) to convert vibrations originating from the acoustic waves into electronic signals. Since a piezoelectric transducer outputs only a small signal, an electronic preamplifier must be mounted near the piezo to prevent noise from overwhelming the small transducer signal. Electronics, however, are incompatible with the harsh environmental conditions, such as high temperature and pressure, that prevail deep within the earth. Even preamplifiers designed to survive high temperature have a short lifetime and may last, for example, only for one hour under harsh conditions. Thus, the requirement for an electronic preamplifier prevents piezoelectric transducers from being employed deep within a well.

Fiber optic sensors, on the other hand, are electrically passive devices. That is, they do not require electrical components or external electrical connections. Thus they are less susceptible to the harshness associated with high temperature, high pressure environments. Furthermore, fiber optic sensors avoid the environmental problems associated with electrical components, e.g., the electromagnetic interference that arises when electrical components are placed in the presence of transmission lines. For these reasons, fiber optic sensors are sometimes used in hydrophones operating under harsh environmental conditions.

Fiber optic hydrophones can generally be classified into two categories. Hydrophones of the air backed mandrel design have a hollow, sealed cavity that deforms in response to acoustic pressure, so that strain is transferred to the fiber wrapped around the mandrel. Other, less sensitive, fiber optic hydrophone designs record the effects of pressure directly on the fiber itself, e.g., the fiber may be wrapped around a solid body. Fiber optic hydrophones with high sensitivity (i.e., air backed mandrel hydrophones) are generally limited to operating pressures of less than about 5000 pounds per square inch (psi) and temperatures of less than about 120° C. Outside this range, the materials used in the mandrels of air backed mandrel hydrophones deform excessively. For example, polycarbonate plastic deforms at these temperatures, whereas metals such as aluminum buckle inelastically when subjected to high pressures. On the other hand, fiber optic hydrophones utilizing solid bodies or fiber for acoustic transduction typically have much lower sensitivities.

In addition to operating limitations on pressure and temperature, current fiber optic hydrophones are generally bulky, and may have large cross sections that do not lend themselves to use in applications where compactness is essential, e.g., in commercial petrochemical wells and boreholes. Thus, there is a need for a fiber optic hydrophone having a relatively small cross section and the ability to withstand high pressures and temperatures.

In addition to restrictions on the placement of the prior art acoustic arrays, limitations exist on the number of sensors that may be employed in prior art acoustic arrays. With a larger number of sensors more information must be processed. Limitations on the amount of information that can be processed within a reasonable amount of time restrict the number of sensors that can be used. Higher resolution maps, however, can be achieved with a larger number of sensors.

Thus, a need exists for a system for sensing acoustic waves that is rugged enough to operate in the harsh downhole environment and accommodates a large number of sensors.

Systems accommodating a large number of sensors may benefit from the use of multiplexing, in which multiple signals are communicated within a single line. One common approach, known as frequency division multiplexing (FDM), operates by modulating a carrier wave at a number of different frequencies equal to the number of signals that are to be multiplexed. When FDM is applied to a system using interferometric sensors, the multiplexed signal includes signal components not just at the modulation frequencies, but at all harmonic frequencies of the modulation frequencies as well. For such a system, the multiplexed signal may be demultiplexed through detection of the signal components at the modulation and first harmonic frequencies, provided these components do not overlap (in frequency) one another or any components at the higher harmonics. Such overlap may be prevented by selecting modulation frequencies that are sufficiently large and separated that the lowest second order harmonic component exceeds the highest first harmonic component. This leads to large bands of unused frequency between DC and the highest frequency signal component detected. However, to keep the signal processing electronics simple it is preferable to keep the maximum frequency detected as low as possible. Thus, a need exists for a method of selecting a set of FDM modulation frequencies having as low a maximum frequency as possible while maintaining fundamental and first harmonic signal components that are not overlapped by other signal components.

SUMMARY OF THE INVENTION

The present invention comprises a system for sensing subterranean acoustic waves emitted from an acoustic source. The system comprises at least one optical source emitting light. A plurality of optical sensors receive the light and alter the light in response to the acoustic waves. At least one optical detector receives the altered light and outputs an electrical signal. The system also comprises electronics that receives the electrical signal and converts the signal into seismic acoustic data format.

The system advantageously comprises at least one distribution optical fiber line that distributes the light emitted from the optical source to the sensors as well as at least one return optical fiber line that directs the altered light emitted from the sensors to the at least one optical detector.

Preferably, the light emitted from the at least one optical source is modulated at at least one modulation frequency. The electronics advantageously demultiplex or demodulate the electrical signal by mixing the signal with periodic waveforms having frequencies corresponding to the modulation frequencies and twice the modulation frequencies.

This system may comprise a number of different types of fiber optic sensor inputs, specifically land seismic, downhole, and ocean bottom cables using either hydrophones, geophones, or a combination of both.

Another embodiment of the present invention comprises a downhole system for sensing acoustic waves emitted from a surface acoustic source or an underground acoustic source. The system comprises at least one optical source emitting light. An array of downhole optical sensors receives the light. This array alters the light in response to the acoustic waves. A plurality of optical detectors receives the altered light and outputs electrical signals. Electronics process these electrical signals, converting the signals into seismic data format.

In another embodiment, a downhole system for performing cross-well tomography comprises a plurality of laser sources each emitting light that is modulated at different frequencies. This downhole system further comprises an array of downhole optical sensors. These downhole optical sensors receive the light and alter it in response to a acoustic waves that impinge upon the acoustic sensors. A plurality of optical detectors receive the altered light and output electrical signals. Electronics process the electrical signals converting the signals into seismic data format.

One additional embodiment involves another system for sensing subterranean acoustic waves emitted from an acoustic source. This system comprises means for producing a plurality of coherent beams of light and a means for modulating the plurality of coherent beams of light at different frequencies. The system further comprises means for altering the beams of light in response to the acoustic waves. Variations in the beam of light are thereby produced. The system additionally comprises means for detecting the variations in the beam of light. Means for converting the detected variations into seismic data format are also included.

Another embodiment comprises a method for sensing subterranean acoustic waves emitted from an acoustic source. The method comprises producing at least one optical beam of light. The beam of light is altered in response to the acoustic waves. Variations in the beam of light are thereby produced. These variations in the beam of light are detected, and the detected variations are converted into seismic data format.

Another method for sensing subterranean acoustic waves emitted from an acoustic source comprises producing a plurality of coherent beams of light. The plurality of coherent beams of light are modulated at different frequencies. The beams of light are altered in response to the acoustic waves thereby producing variation in the beams of light. The altered beams of light are received, and electrical signals are output. The electrical signals are processed and converted into data in seismic data format.

BRIEF DESCRIPTION OF THE DRAWINGS

The present invention will be described in detail below in connection with the attached drawings, in which:

FIG. 3A illustrates a schematic view of the first embodiment of the acoustic sensing system of the present invention comprising six laser sources, sixteen optical detectors, and 96 acoustic sensors, wherein the sensors are contained within a single acoustic sensor array;

FIG. 4, comprising

FIG. 9, comprising

FIG. 10, comprising FIGS. 10A and 10B illustrate the components for systems with five and six modulation frequencies, respectively.

FIG. 11, comprising FIGS. 11A and 11B illustrate the components for systems with five and six modulation frequencies, respectively.

FIG. 14, comprising FIGS. 14A and 14B, illustrates frequency components for a multiplexed signal resulting from six light sources in accordance with an embodiment of the present invention, wherein the modulation frequency components are selected at $\Delta f$ multiples of $5\frac{2}{3}$, 7, 8, 9, 10, and $12\frac{1}{2}$. For clarity, FIG. 14A isolates the fundamental frequency components.

FIG. 15, comprising FIGS. 15A and 15B, illustrates frequency components for a multiplexed signal resulting from six light sources in accordance with an embodiment of the present invention, wherein the modulation frequency components are selected at $\Delta f$ multiples of 3, 4, 5, 7, 11, and 13. For clarity, FIG. 15A isolates the fundamental frequency components.

FIG. 20, comprising In FIGS. 20A, 20B, and 20C, the sensor functions as a Mach-Zehnder interferometer, a Michelson interferometer, and a Fabry-Perot interferometer, respectively.

DETAILED DESCRIPTION OF THE PREFERRED EMBODIMENT

Figure 1:
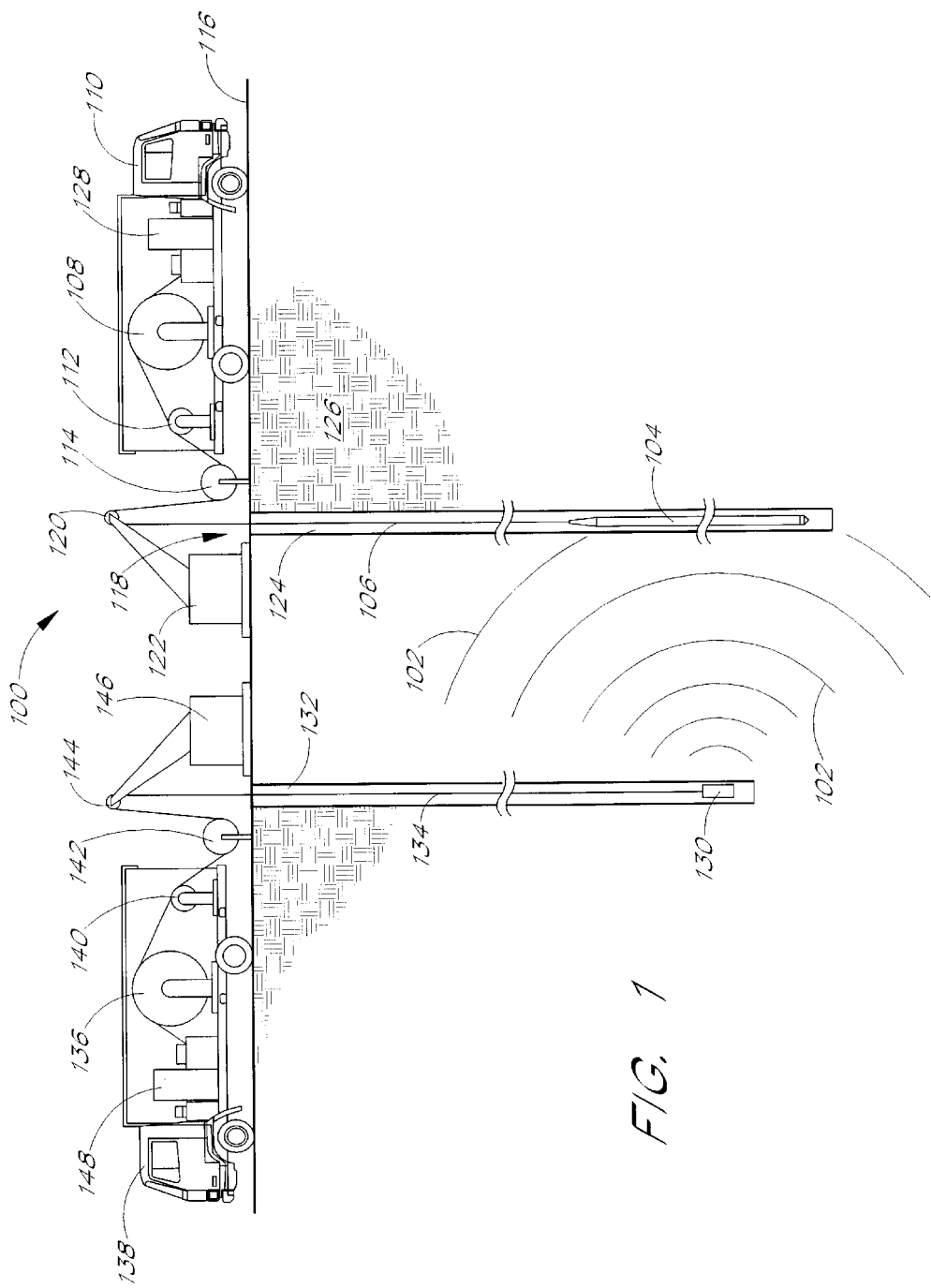
FIG. 1 illustrates a side elevational view of a downhole acoustic sensing system that is the preferred embodiment of the present invention.

A system 100 for sensing acoustic waves 102 in accordance with a preferred embodiment of the present invention is shown in FIG. 1. The system 100 comprises an acoustic array cable 104 attached to a downlead cable 106 which is held on a first spool 108 on a first truck 110. The downlead cable 106 passes from the first spool 108 to a reel 112, also mounted on the first truck 110, and to a sheave 114 situated on a surface 116 adjacent to a well 118. From the sheave 114, the downlead cable 106 runs up to a pulley 120 fixed to a crane 122. The downlead cable 106 and the acoustic array cable 104 extend from this pulley 120 into the well 118. The well 118 comprises a first borehole 124 formed in a layer of earth 126. A large metal pipe known as a casing (not shown) is inserted into the borehole 124. The downlead cable 106 on the spool 108 is connected to a receiver processing electronics 128 housed in the first truck 110.

An acoustic source 130 is situated in a second borehole 132. This acoustic source 130 is attached to an acoustic source cable 134, which is held on a second spool 136 on a second truck 138. The acoustic source cable 134 passes from the second spool 136 to a second reel 140, also mounted on the second truck 138, and to a second sheave 142 situated on the surface 116 adjacent to the second borehole 132. From the second sheave 142, the acoustic source cable 134 runs up to a second pulley 144 fixed to a second crane 146. The acoustic source cable 134 extends from this pulley 144 into the second borehole 132. Also housed in the second truck 138 is source electronics 148 associated with the acoustic source 130. The acoustic waves 102 emanate from the acoustic source 130 in the second borehole 132 and arrive at the acoustic array cable 104 in the first borehole 124.

Figure 2:
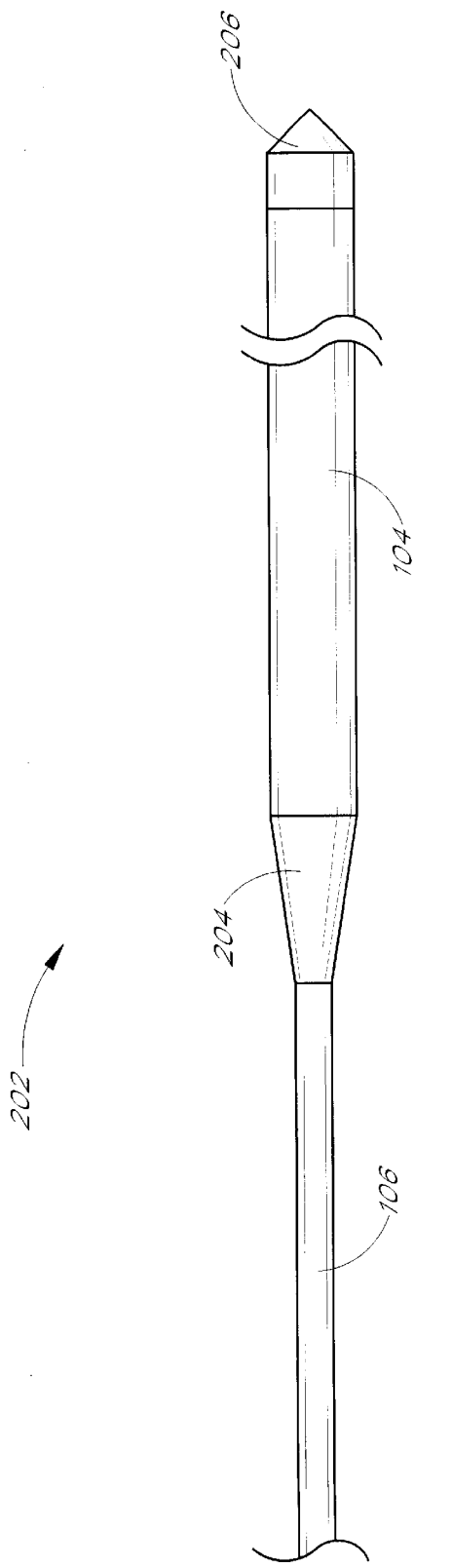
FIG. 2 illustrates a perspective view of a cable comprising a downlead cable and a sensor array cable.

A perspective view of a cable 202 comprising the downlead cable 106 and the acoustic array cable 104 is shown in FIG. 2. An interface 204 connects the downlead cable 106 to the acoustic array cable 104. The acoustic array cable 104 is terminated by a gamma detector 206, which operates in a conventional manner to produce an electrical signal responsive to the passage of the gamma detector 206 through each section of pipe forming the casing within the borehole 124. The gamma detector 206 provides a signal that is a processed to determine the depth to the termination of the acoustic array cable 104.

As shown in FIG. 3A, a plurality of laser sources LS1, LS2, LS3, LS4, LS5, LS6 are positioned to supply optical feed lines F1–F6, which are joined at an optical terminator 302. The optical terminator 302 connects to the downlead cable 106, which is connected to the acoustic array cable 104. The acoustic array cable 104 houses a plurality of sensors, which in this exemplary embodiment total 96 and are designated S1–S96. The optical terminator 302 also provides a link between the downlead cable 106 and a plurality (e.g., 16) of return fibers R1–R16, which are coupled to optical detectors D1–D16. The outputs of the optical detectors D1–D16 are electrically connected to processing electronics 304.

Each laser source LS1, LS2, LS3, LS4, LS5, LS6 comprises a respective laser L1, L2, L3, L4, L5, L6 and a modulator M1, M2, M3, M4, M5, M6. Each of the lasers L1–L6 generates an optical beam having a different optical wavelength. The six optical beams produced by these lasers L1–L6 are directed to respective modulators M1–M6. Preferably, these modulators M1–M6 comprise phase modulators, each characterized by a different modulation frequency. Accordingly, the laser sources LS1, LS2, LS3, LS4, LS5, LS6 output six optical signals each having different optical wavelengths and each modulated at a separate modulation frequency.

Figure 3B:
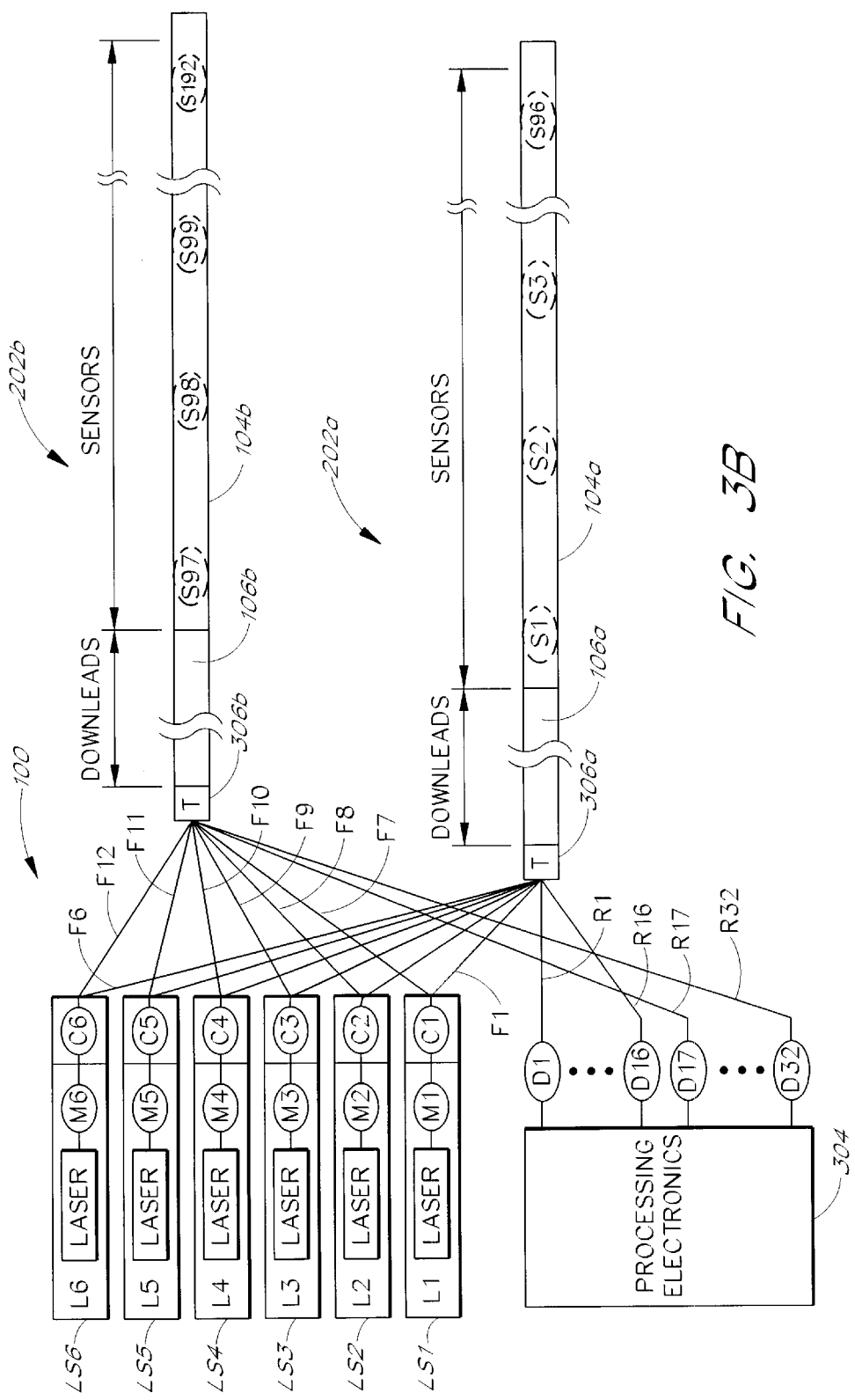
FIG. 3B illustrates a schematic view of an embodiment of the acoustic sensing system of the present invention comprising six laser sources, 32 optical detectors, and 192 acoustic sensors, wherein the sensors are contained within two separate acoustic sensor arrays.

FIG. 3B shows an embodiment comprising 192 sensors S1–S192 contained within two separate acoustic array cables 104a, 104b appended to two separate downlead cables 106a, 106b. The two separate acoustic array cables 104a, 104b and downlead cables 106a, 106b could be inserted in two separate boreholes 124. This embodiment having 192 sensors will be discussed more fully below.

The plurality of feed lines F1–F6 are connected to a plurality of distribution fiber lines DF1–DF6 (shown in FIG. 4A–4H) at the optical terminator 302 to transfer the optical signals outputted by the laser sources LS1–LS6 to the distribution fiber lines. These distribution feed lines DF1–DF6 run through the downlead cable 106 and into the acoustic array cable 104 as well.

Figure 4A:
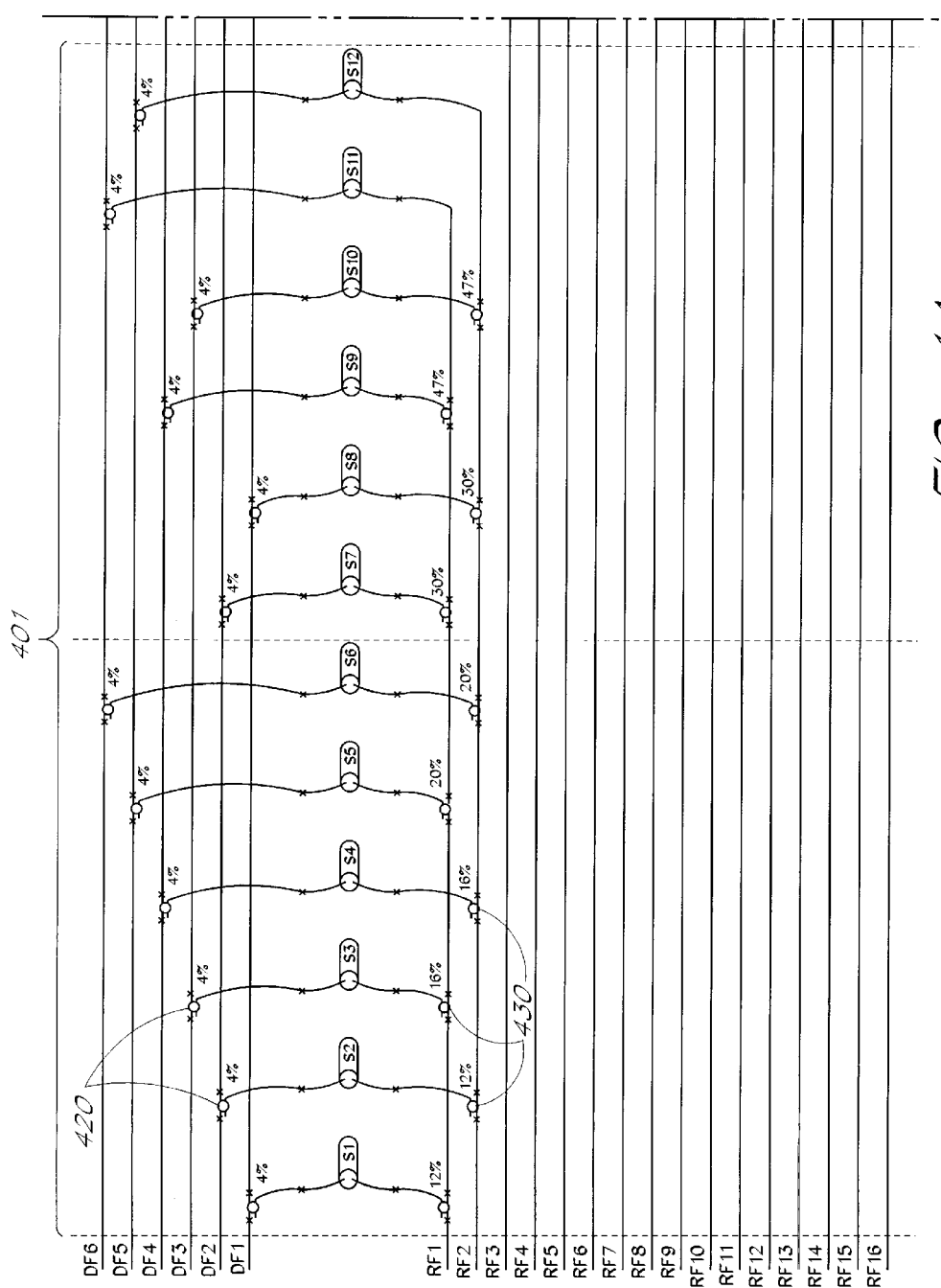
FIGS. 4A–4H, illustrates a schematic view of one implementation of the distribution and return of the optical signal in the first embodiment. This implementation accommodates a 6×16 optical sensors array having sixteen sensor groups, wherein each sensor group has a dedicated return fiber line.
Figure 4B:
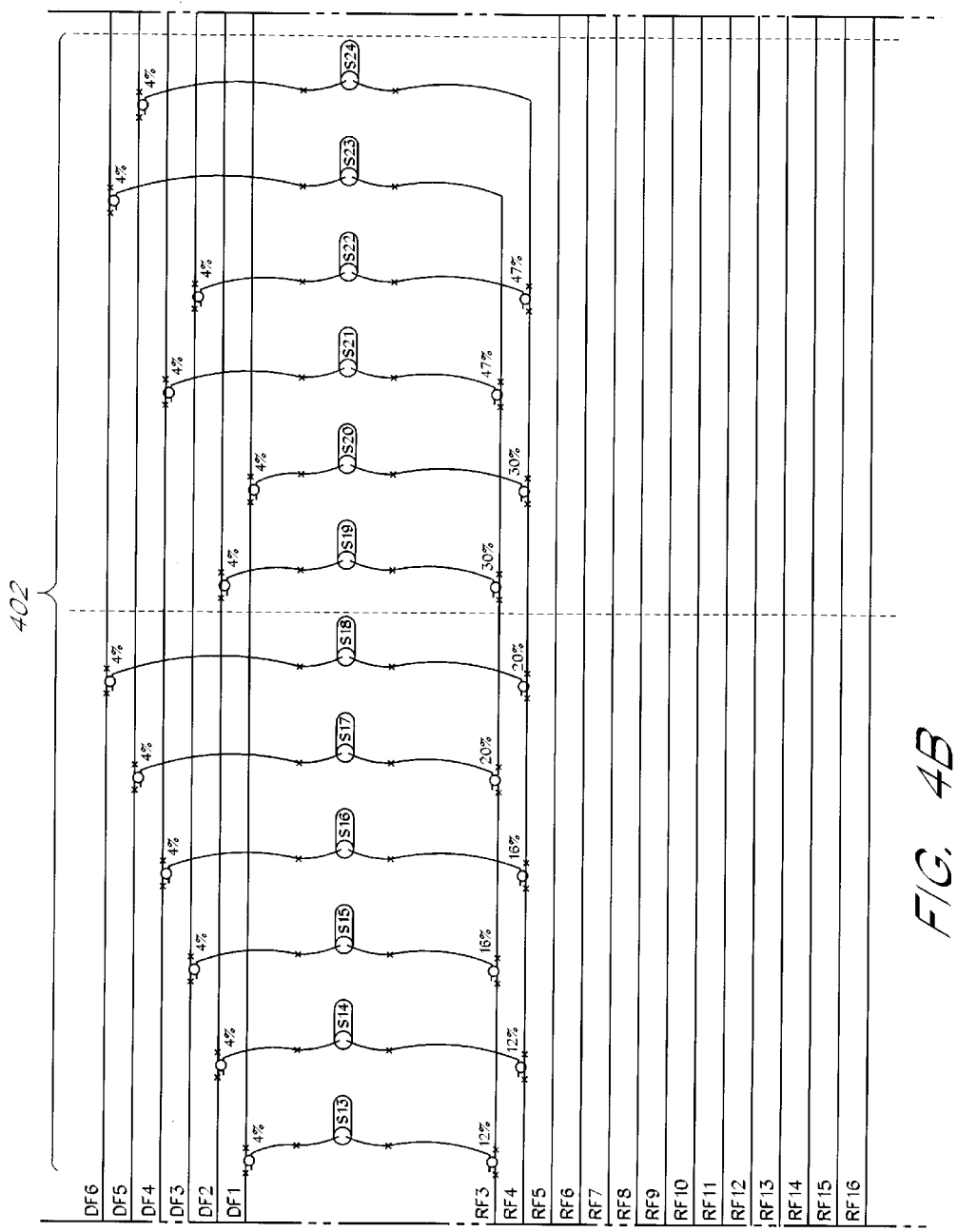
Figure 4C:
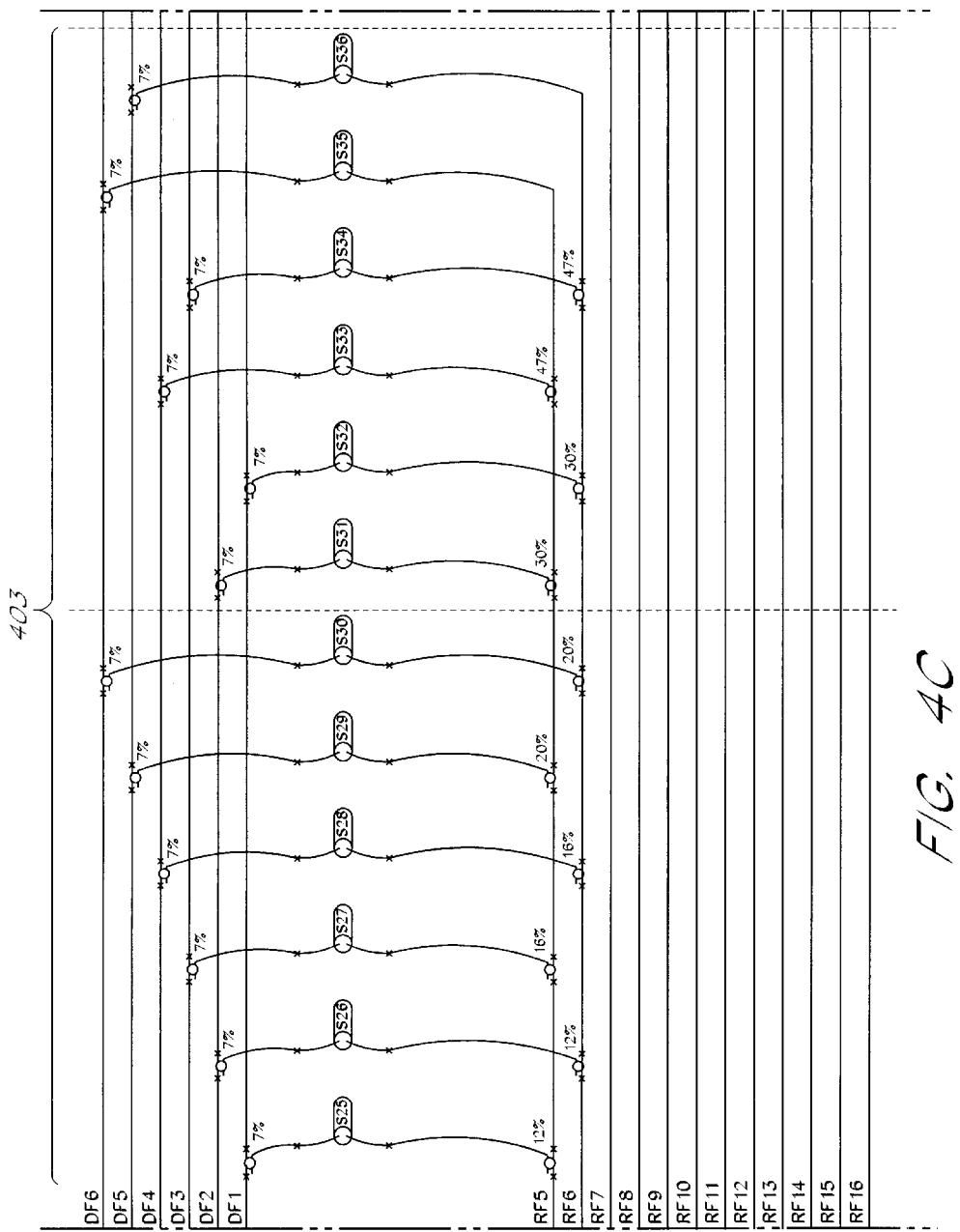
Figure 4D:
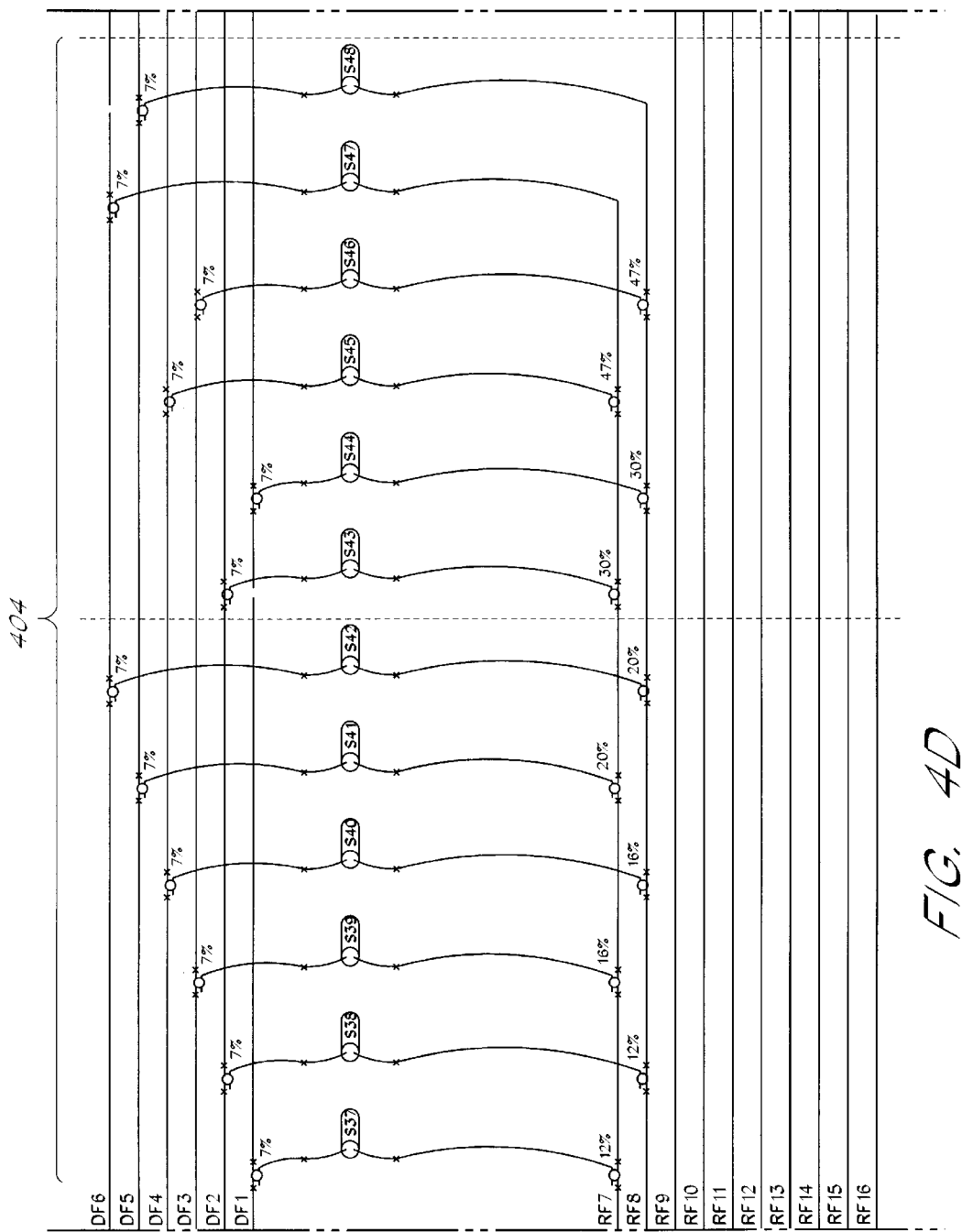
Figure 4E:
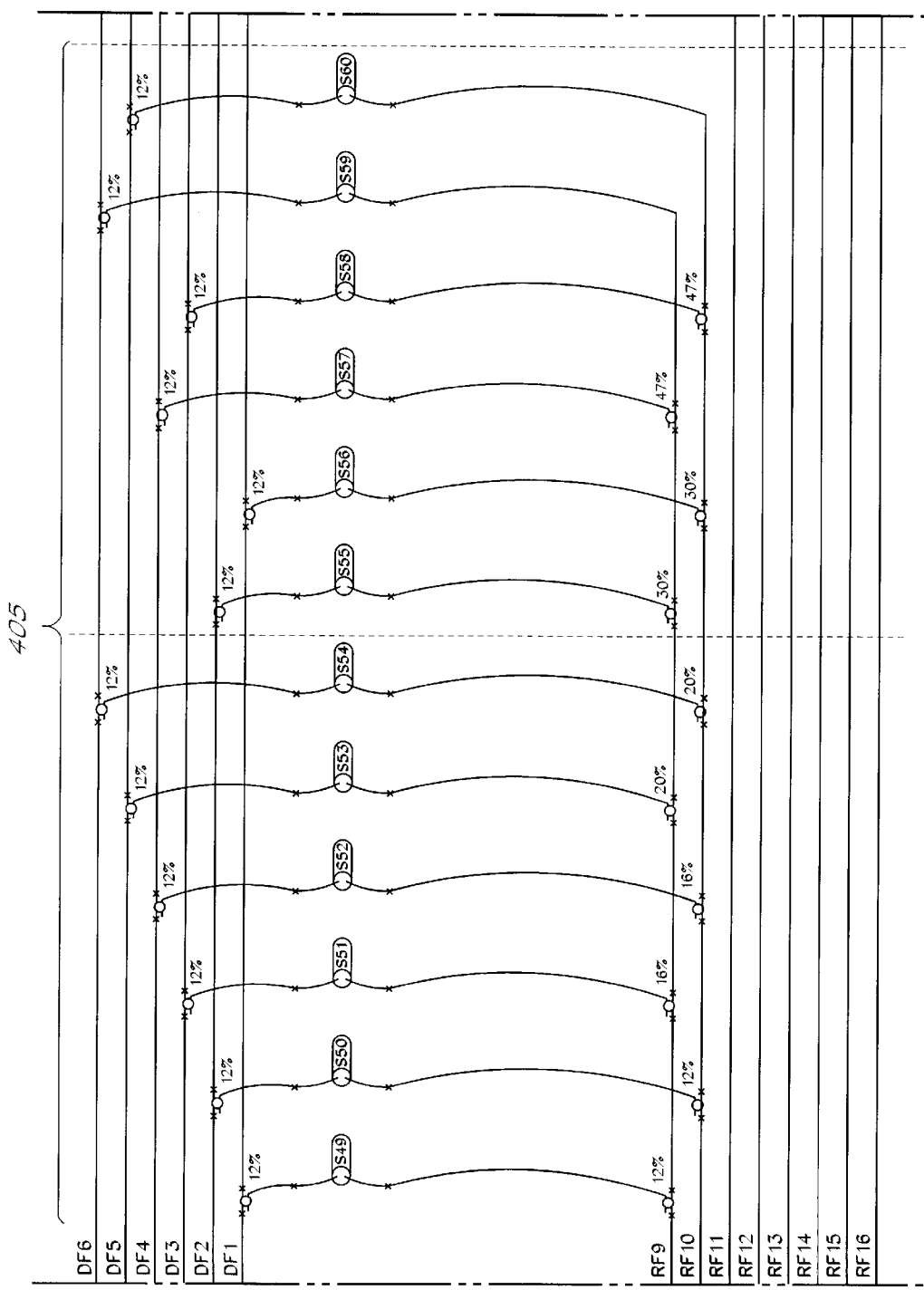
Figure 4F:
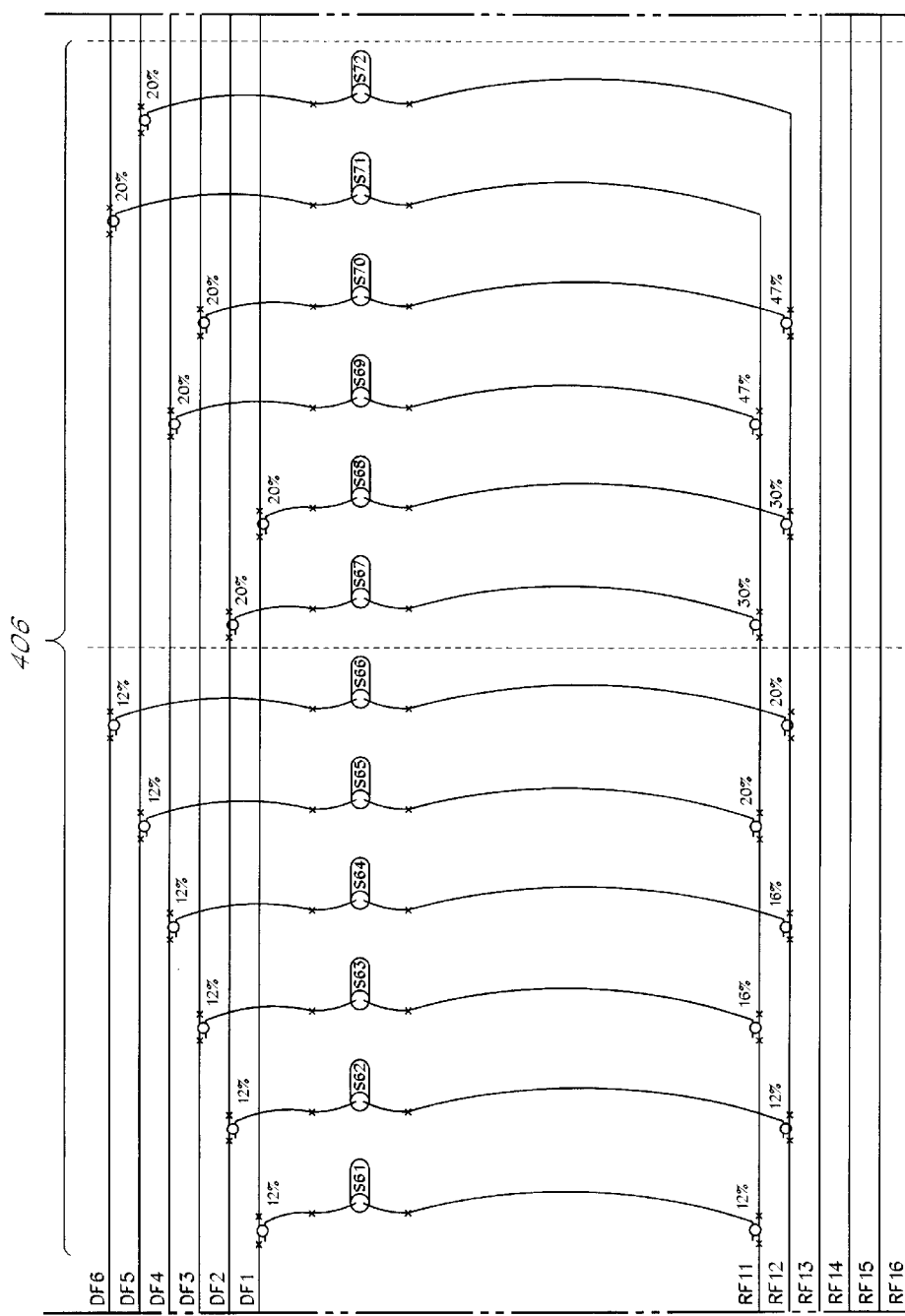
Figure 4G:
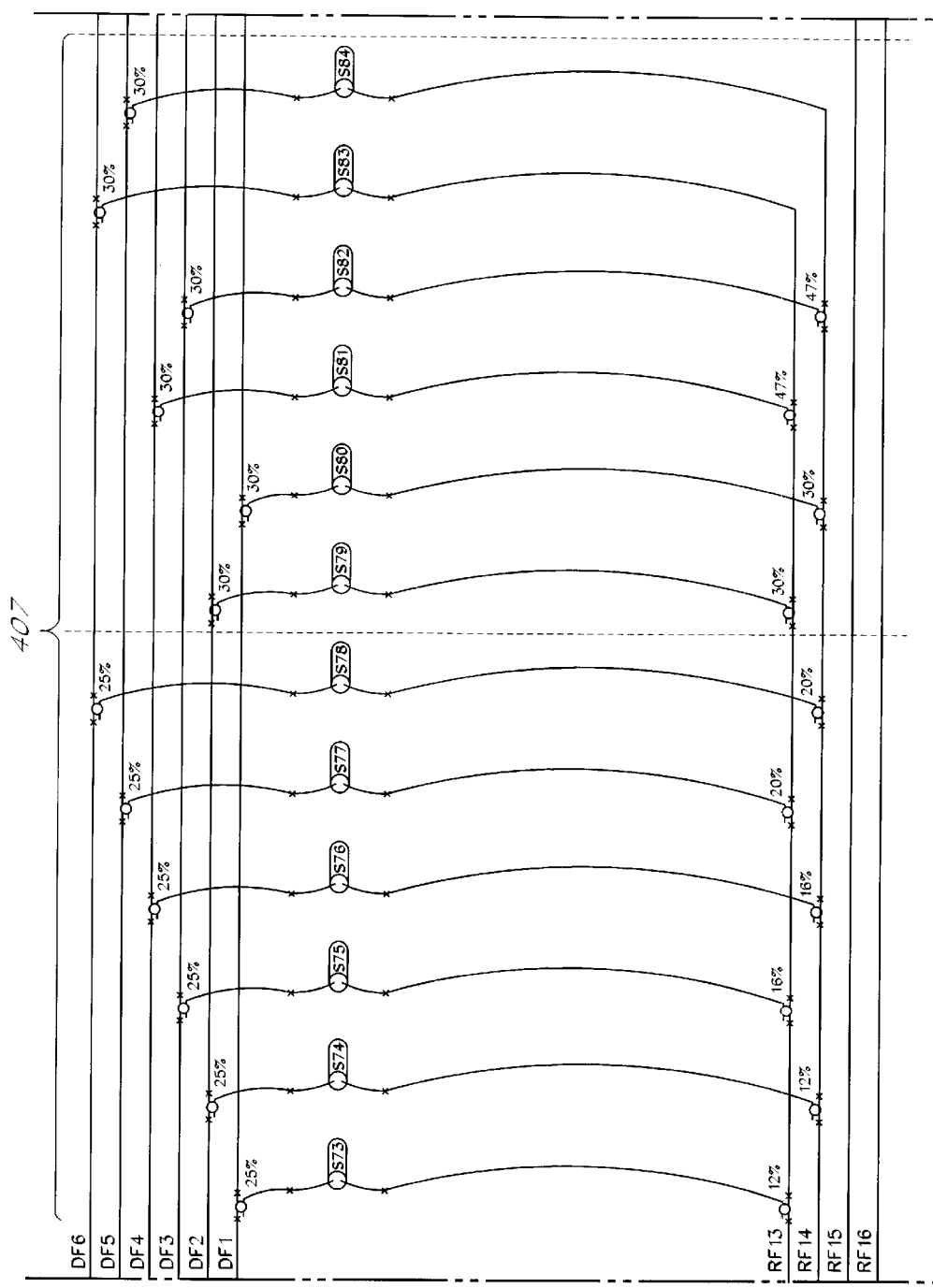
Figure 4H:
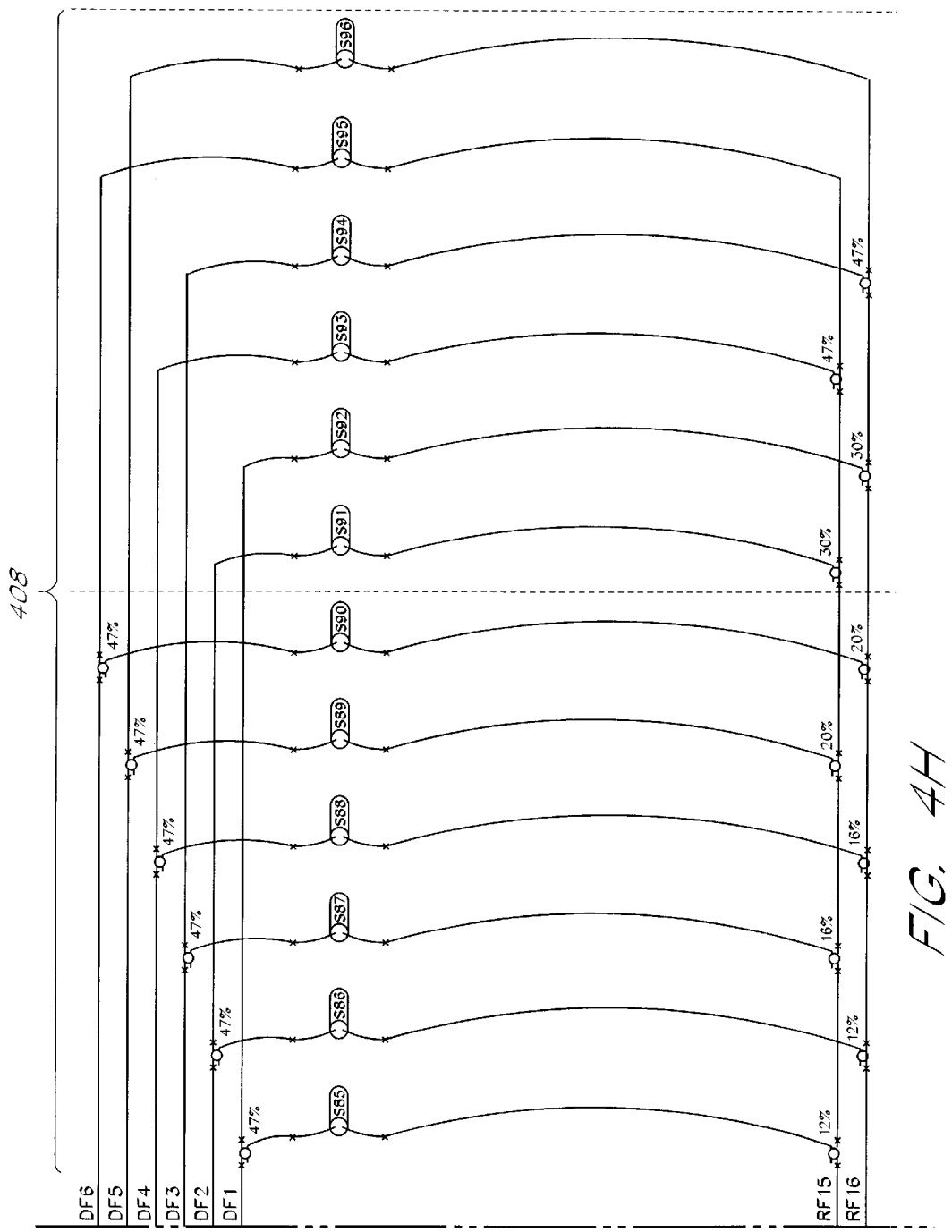

FIG. 4, which comprises FIGS. 4A–4H, shows the 96 sensors S1–S96 in a single acoustic array cable 104 similar to that shown in FIG. 3A. These 96 sensors S1–S96 are divided into eight sensor groups of twelve sensors each. A first sensor group, group 401, is shown in FIG. 4A. The optical path from the first sensor group 401 to the laser sources LS1, LS2, LS3, LS4, LS5, LS6 and to the processing electronics 304 is shorter than for any of the other sensor groups 402–408. Seven additional sensor groups 402–408 are shown in FIGS. 4A–4H. Each sensor group 401–408 has at least one sensor coupled to each of the six distribution fiber lines DF1–DF6. For example, in the first sensor group 401, the distribution fiber lines DF1–DF6 are connected to respective standard 1×2 input couplers 420, which are in turn connected to respective sensors S1–S12. Similarly, in the second sensor group 402, the distribution fiber lines DF1–DF6 are connected to respective sensors S13–S24 via additional standard 1×2 input couplers 420.

All the sensors S1–S12 in the group 401 are coupled to two return fiber lines RF1, RF2. Similarly, each of the sensor groups 402–408 has two of the return fiber lines RF2–RF16 dedicated solely to its use. For example, sensors S7–S24 are all coupled to two of the return fiber lines RF1–RF16, namely, the third and fourth fiber lines RF3, RF4. As a further example, the sensors S85–S96 are coupled to the last two fiber lines RF15, RF16. In this embodiment, no adjacent sensors S1–S96 share a common return fiber line RF1–RF16.

The return fiber lines RF1–RF16 are connected to return fibers R1–R16. The return fiber lines RF1–RF16 and the return fibers R1–R16 direct the optical outputs of the acoustic sensors S1–S96 to the optical detectors D1–D16.

Figure 5:
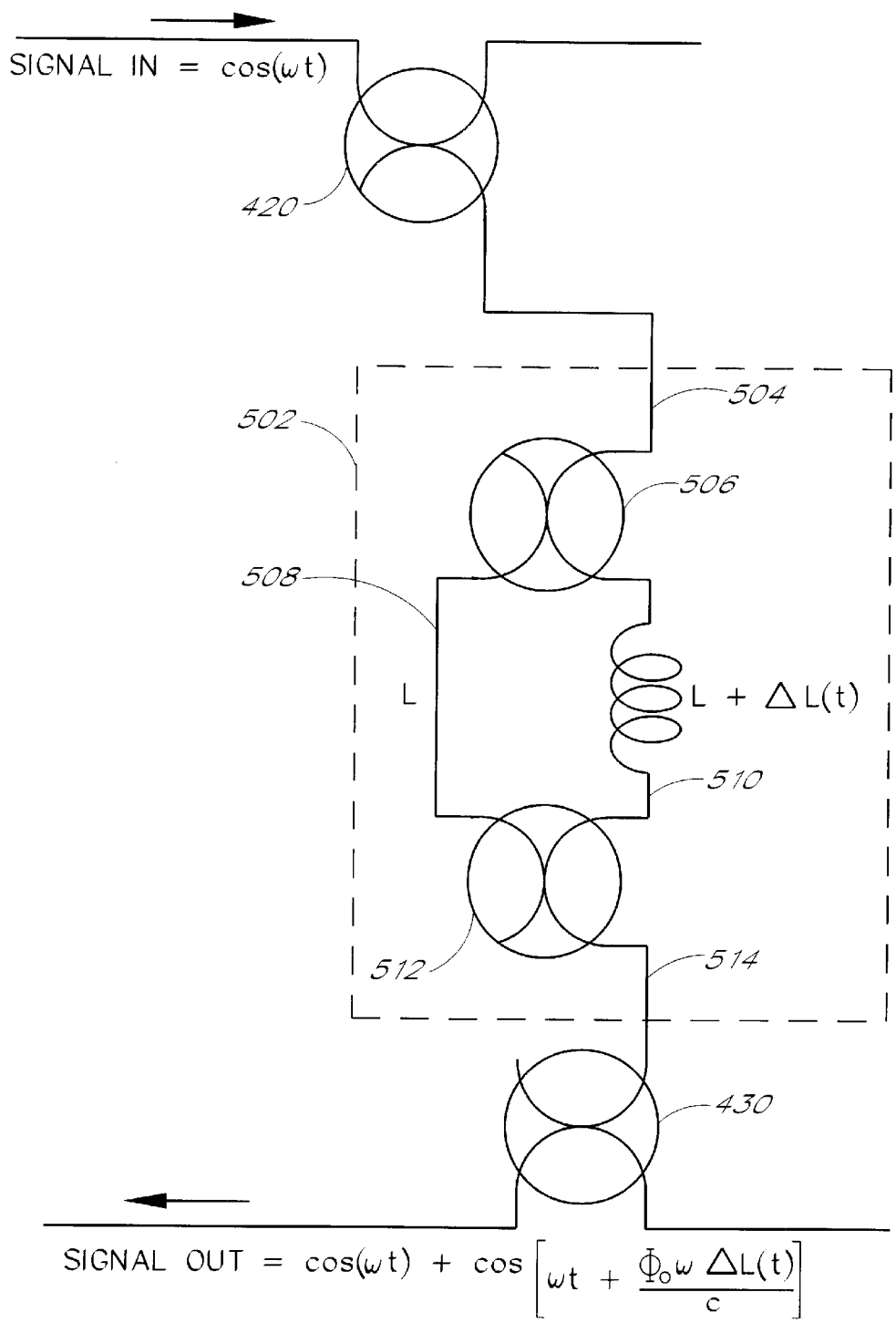
FIG. 5 illustrates a schematic view of one preferred embodiment of the acoustic sensor, a fiber sensor that is a Mach-Zehnder interferometer.

In FIG. 5, the acoustic sensors S1–S96 comprise an interferometer 502 that is sensitive to acoustic pressure, pressure changes, or pressure waves. The interferometer 502 depicted in FIG. 5 is a Mach-Zehnder interferometer. This interferometer 502 includes a sensor input line 504, which is connected to a first coupler 506. A reference arm 508 and a test or sensing arm 510 are attached to this first coupler 506. The reference arm 508 and the test arm 510, are optical fibers. The optical fibers 508, 510 are connected to a second coupler 512 that is connected to a sensor output line 514. The input coupler 420 and output coupler 430 are connected to the sensor input line 504 and sensor output line 514, respectively.

The optical signal that emanates from the laser sources LS1–LS6 is coupled into the sensor input line 504 of the interferometer 502 via the input coupler 420. This signal is split by the first coupler 506 into two beams. A reference beam travels through the reference arm 508, and a test beam travels through the test arm 510. The two beams are coupled into a single fiber 514, the sensor output line, at the second coupler 512 of the interferometer 504. The reference beam and the test beam interfere in the second coupler 512 to produce an output signal that is detected at one of the optical detectors D1–D16.

Acoustic vibrations that impinge on one of the acoustic sensors S1–S96 cause the optical fiber comprising the respective test arm 510 to be deformed, e.g., to be stretched or contracted, which in turn changes the optical path length of the test arm 510. In contrast, the reference arm 508 is shielded from the acoustic vibration. Thus, the optical path length of the reference arm does not change. Since the optical path length of the test arm 510 changes while the optical path length of the reference arm 508 does not change, the phase difference between the beams traveling in the test and reference arms changes in response to the acoustic vibrations. The changes in relative phase between the test and reference arms 510, 508 result in time-varying interference at the second coupler 512. The time-varying interference results in a time varying light intensity of the signal output from the second coupler 512. The time-varying light intensity is detected by one of the detectors (e.g., the first detector D1).

Figure 6:
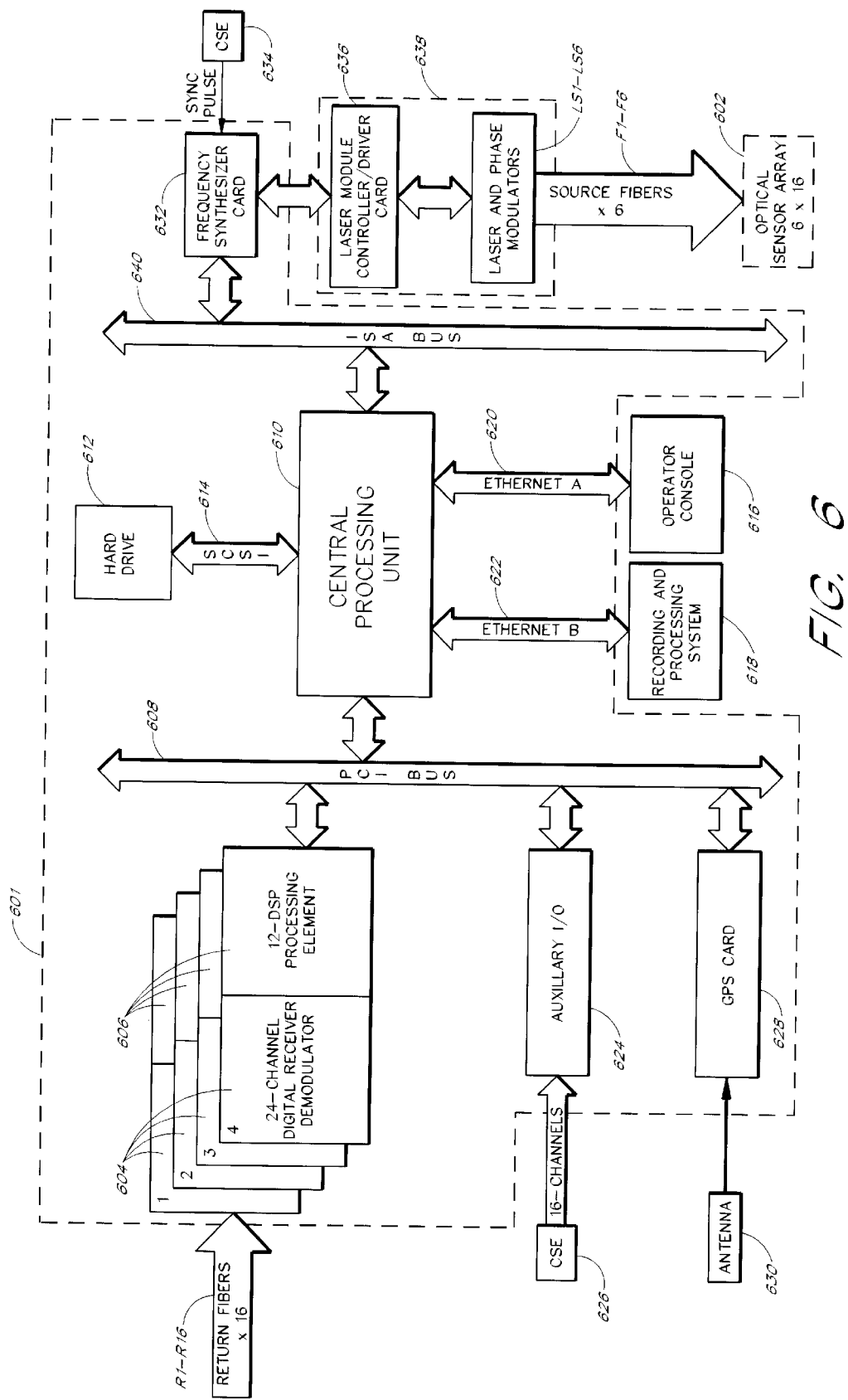
FIG. 6 illustrates a block diagram of the detector/electronics assembly and laser drawer in the first embodiment of the acoustic sensing system having 96 sensors in the 6×16 sensor array of FIG. 4.

FIG. 6 depicts a detector/electronics assembly 601 for the first embodiment of the acoustic sensing system 100, which has sixteen return fibers R1–R16 that are coupled to the sixteen optical detectors D1–D16. The detector/electronics assembly 601 includes the optical detectors D1–D16 and the processing electronics 304.

FIG. 6 also schematically shows an optic sensor array 602 and illustrates how the detector/electronics assembly 601 is connected to the optical sensor array and to the laser sources LS1–LS6. As defined herein, the optical sensor array 602 comprises a plurality of optical sensors coupled together using optical fibers. The optical sensor array 602 shown in FIG. 6 includes the designation 6×16 corresponding to the six distribution fiber lines DF1–DF6 and 16 return fiber lines RF1–RF6 shown in FIGS. 4A–4H.

Each of the optical detectors D1–D16 is included as part of the four 24-channel digital receivers/demodulators 604. The optical detectors are separated into four groups, D1–D4, D5–D8, D9–D12, and D13–D16, wherein each group is situated in one of the four 24-channel digital receiver/demodulators 604.

As shown in FIG. 6, the four 24-channel digital receiver/demodulators 604 are electrically connected to four 24-channel digital signal processors (DSPs) 606. Each of the 24-channel DSPs 606 comprises twelve digital signal processing chips. Accordingly, the term "12-DSP processing element" 606 may be used interchangeably with 24-channel digital signal processors.

Each of the 24-channel digital receiver/demodulators 604 is paired with one of the 12-DSP processing elements 606. The four 12-DSP processing elements are coupled to a PCI bus 608 (or other suitable bus), which is coupled to a central processing unit (CPU) 610, such as, for example, an Intel Pentium II or Pentium III processor.

The CPU 610 is coupled to a hard drive 612 via a SCSI bus 614. The central processing unit 610 is also connected to an operator console 616 and a recording and processing system 618 via two Ethernet lines 620, 622.

Each of the 24-channel digital receiver/demodulators 604 accommodates 24 signals because each of the four detectors D1–D16 within one of the digital receiver/demodulators receives six signals from a group of six sensors. The six signals that arrive at each of the optical detectors D1–D16 originate from the six laser sources LS1–LS6 and have a different optical wavelength and have different modulation frequency. Upon being irradiated by the six signals, each of the optical detectors D1–D16 outputs an electrical signal having components proportional to the intensity of the optical light incident thereon at each of the modulation frequencies and at harmonics of the modulation frequencies.

$$I_n(t) = A + B_n \left\{ \left[ J_0(C_n) + 2 \sum_{k=1,\infty} (-1)^k J_{2k}(C_n) \cos(2k\omega_n t) \right] \cos(\varphi_n(t)) - \left[ 2 \sum_{k=0,\infty} (-1)^k J_{2k+1}(C_n) \cos((2k+1)\omega_n t) \right] \sin(\varphi_n(t)) \right\}.$$

The electrical signal from one of the optical detectors, e.g., the first detector D1, is separated into the six signals produced by the six acoustic sensors, e.g., the first six odd sensors S1, S3, S5, S7, S9, S11, whose outputs are channeled to the optical detector. The six signals are distinguished by separating the components according to the modulation frequencies. Although the light incident on the detector D1 comprises six different optical wavelengths, it is not necessary to separate the signals optically. The difference in optical wavelengths is used to keep the six signals from optically interfering with each other.

The total number of acoustic sensor signals processed by the detector/electronics assembly 601 employed in the embodiment depicted in FIG. 6 is 96. Each of the 24-channel digital receiver/demodulators 604 receives four optical signals from four of the return fibers R1–R16. The 24-channel digital receiver/demodulator 604 converts each of the four optical beams into six separate electrical channels, resulting in 24 electrical channels. Since the detector/electronics assembly 601 for the embodiment shown in FIG. 6 has four 24-channel digital receiver/demodulators 604, a total of 96 (4×24) electrical channels are utilized. Each of the 96 electrical channels contain information relating to the acoustic vibrations at a respective one of the 96 acoustic sensors S1–S96.

As noted above, each of the acoustic sensors S1–S96 comprises an interferometer 502 that splits the coherent light source into two waves following separate paths that eventually converge. Upon convergence, the two waves interfere with each other such that the intensity I of the combination is given by I=A+B cos θ, where A and B are constants and θ is the phase difference between the two waves upon convergence.

In order to multiplex the six sensor signals associated with the six lasers L1–L6 that are transmitted via each return fiber (e.g., RF1), the interferometer phase angle of each of the six sensors is modulated at a different frequency, $\omega_n$. The interferometer phase angle modulation may be represented as $\theta(t)=C_n \cos \omega_n t$, where n=1, . . . , 6, and $C_n$ is the amplitude of the phase modulation in radians. The phase angle in the interferometer is modulated by sinusoidally varying the phase of each laser L1–L6. This is accomplished by the modulator M1–M6 by sinusoidally varying the voltage across a lithium niobate segment (not shown) of the optical path. A laser source phase modulation, $\Phi=\Phi_o \cos(\omega t)$, where $\Phi_o$ is the phase amplitude in radians, results in a laser frequency modulation $f=f_c+\Delta f \sin(\omega t)$, where $f_c$ is the optical carrier frequency and $\Delta f = \Phi_o \omega/2\pi$. This frequency modulation, in turn, results in a modulation of the interferometer phase angle, $\phi=2\pi\Delta L\Delta f/c \sin(\omega t)$, where $\Delta L$ is the path length offset between the two interferometer paths and c is the speed of light in the fiber.

This modulation results in a time varying intensity for the output of the nth interferometer given by: $I_n(t)=A_n+B_n \cos[C_n \cos(\omega_n t)+\phi_n(t)]$, where ($\phi_n(t)$ is the time varying phase created by the acoustical signal in the nth optical sensor (and signal noise). This equation may be expanded in terms of Bessel functions to give:

As noted earlier, the N lasers L1–L6 are chosen to have sufficiently different optical carrier frequencies to avoid optical interference. Thus, the total intensity on the detector, $I_{tot}$, connected to this particular return fiber (e.g., RF1) is then given by $I_{tot}(t)=\Sigma_{n=1,6}I_n(t)$. The light intensities detected by each of the 16 detectors D1–D16 is described by an analogous equation.

The above equations demonstrate that the interferometer intensity output contains signal not only at the six modulation frequencies $\omega_n$, but also at $2\omega_n$, $3\omega_n$, etc. The multiplexed intensity signal received by a given detector D1–D16 may be fully demultiplexed through detection of the signal components at $\omega_n$ and $2\omega_n$ using the following approach.

The total output signal, $I_{tot}$, may be mixed with a signal at $\omega_n$ and a signal at $2\omega_n$, and the results of the mixing may be low pass filtered to remove the signal at all harmonics above the first harmonic. This results in "direct" (I) and "quadrature" (Q) components, such that: $I_n=B_n GJ_1(C_n) \sin \phi_n(t)$ and $Q_n=B_n HJ_2(C_n) \cos \phi_n(t)$, where G and H are the amplitudes of the mixing signals corresponding to the $\omega_n$ and $2\omega_n$ components of the signal, respectively. The properties of Bessel functions are such that $J_1(x)$ and $J_2(x)$ are equal when the parameter x≈2.6. See, e.g., *Handbook of Mathematical Functions*, 1974, edited by M. Abramowitz and I. Stegun. Then, by choosing G=H and $C_n$=2.6 radians, the phase angle is given by: $\phi_n(t)=\arctan(I_n/Q_n)$.

Thus, to demodulate, the 24-channel digital receiver/demodulators 604 mix the electrical signals output by the optical detectors D1–D16 with sinusoidal waveforms at the six frequencies at which the output of the six lasers L1–L6 are modulated. The 24-channel digital receiver/demodulators 604 also mix the electrical signals output by the optical detectors D1–D16 with sinusoidal waveforms having twice these six frequencies. Accordingly, the 24-channel digital receiver/demodulators 604 will mix the electrical signals output by the optical detectors D1–D16 with sinusoidal carriers at frequencies of $\omega_1$, $\omega_2$, $\omega_3$, $\omega_4$, $\omega_5$, $\omega_6$ and $2\omega_1$, $2\omega_2$, $2\omega_3$, $2\omega_4$, $2\omega_5$, and $2\omega_6$.

As noted above, the demodulated signals produced as a result of this mixing result in direct (I) and quadrature (Q) components. These components are provided for each channel as inputs to a circuit (not shown) that outputs the arctangent of the two components. In this manner, polar phase is obtained from the demodulated signals. This polar phase corresponds to the phase difference between the optical beams in the test and reference arms 510, 508. The time derivative of the polar phase is generated from digital circuitry (not shown) that is designed to implement differentiation. The derivative of the phase is proportional to the magnitude of the acoustic vibrations sensed at the sensors S1–S96.

The derivative of the phase produced by two channels of each 24-channel digital receiver/demodulator 604 is sent to one element of the corresponding 12-DSP elements 606. The 12-DSP elements 606 filter and decimate the demodulated signals down to standard sample rates required by conventional seismic data recorders. These 12-DSP elements 606 are coupled to the PCI bus 608 and use the PCI bus to communicate with the CPU 610. Accordingly, the filtered and decimated derivative of the phase are fed into the CPU 610. Note that each of the 12-DSP elements 606 processes the phase information from two acoustic channels, each of which is performed separately.

The CPU 610 formats the data corresponding to the acoustic vibrations such that it is compatible with industry standards (e.g., the SEG-D format). For example, the CPU 610 stamps the acoustic data output with the time of system events such as the start of sensing. The CPU also adds any necessary information to identify the data in accordance with the industry standard format.

The CPU also handles interfaces with conventional seismic data recording equipment. The CPU 610 sends the reformatted acoustic data to seismic data recording equipment at industry standard data rates. More specifically, the processed and formatted signals generated from the acoustic sensors S1–S96 and optical detectors D1–D16 are transmitted over the PCI bus 608 to the CPU 610 and are outputted to customer supplied seismic processing equipment via the Ethernet line 622.

The host CPU 610 additionally provides system control and sequencing for the operation of the individual components in the acoustic sensing system 100.

The CPU also handles interfaces with an operator console 616. The operator console 616 allows manual system intervention and is also used to display system status.

The detector/electronics assembly 601 additionally includes an auxiliary input/output subsystem 624 that interfaces with the central processing unit 610 via the PCI bus 608. This auxiliary input/output subsystem 624 interface with customer supplied equipment (CSE) 626 to provide up to sixteen acoustic or non-acoustic sensor inputs for time marking or event triggering.

The detector/electronics assembly 601 additionally includes a global position sensing (GPS) electronics card 628 that is electronically connected to an antenna 630. The GPS electronics card 628 interfaces with the CPU 610 via the PCI bus 608. The GPS electronics card 628 provides accurate time for the host CPU 610 to facilitate time stamping of system events.

In the embodiment shown in FIG. 6, a frequency synthesizer card 632 is included with the detector/electronics assembly 601. The frequency synthesizer card 632 accepts a sync pulse from additional customer supplied equipment (CSE) 634. Preferably, the frequency synthesizer card 632 accepts a sync pulse from the source electronics 148 associated with the acoustic source 130 in FIG. 1. As shown in FIG. 1, the electronics 148 associated with the acoustic source 130 is located in the second truck 138 adjacent the second borehole 132.

The frequency synthesizer card 632 is electrically connected to a laser module controller/driver card 636, which is connected to the laser sources LS1–LS6, both of which are preferably located in a laser drawer 638. Additionally, the frequency synthesizer card 630 is electrically connected to an ISA bus 640 that is also coupled to the central processing unit 610.

As described above, the laser sources LS1–LS6 include lasers L1–L6 and modulators M1–M6, which provide signals to the optical feed lines F1–F6 that are coupled to the acoustic sensors S1–S96. The frequency synthesizer card 632 provides the modulators M1–M6 with periodic waveforms having the six modulation frequencies to modulate the outputs of the six lasers L1–L6. The frequency synthesizer card 632 also provides the 24-channel digital receiver/demodulators 604 with global synchronization and timing signals to insure that the modulators M1–M6 and demodulator are phase locked. In particular, the frequency synthesizer card 632 provides a sync signal and a high speed clock signal to the 24-channel digital receiver/demodulators 604. Using this sync signal and this clock signal, the 24-channel digital receiver/demodulators 604 generate digital representations of sinusoidal carriers at the six modulation frequencies $\omega_1$, $\omega_2$, $\omega_3$, $\omega_4$, $\omega_5$, $\omega_6$ and at twice the modulation frequencies $2\omega_1$, $2\omega_2$, $2\omega_3$, $2\omega_4$, $2\omega_5$, and $2\omega_6$. These digital carriers are employed by 24-channel digital receiver/demrodulators 604 for mixing and demodulation as described above.

Figure 7:
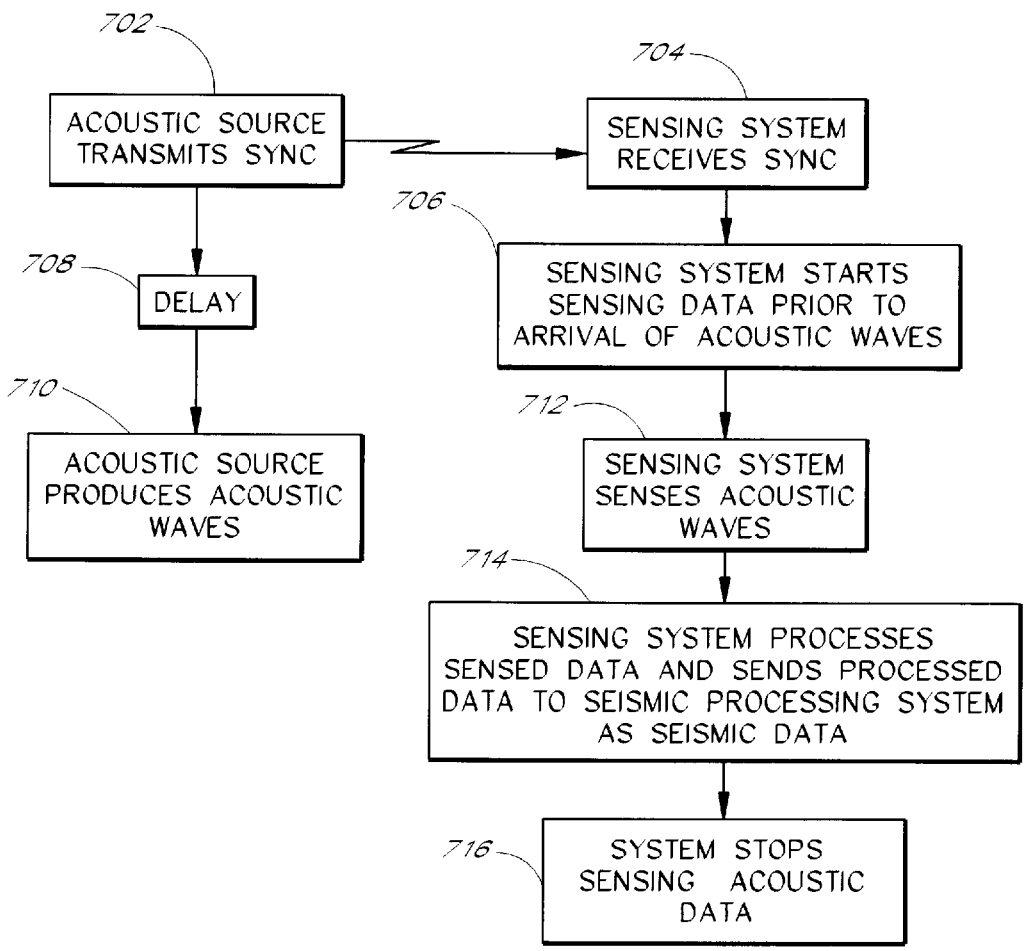
FIG. 7 illustrates a flow chart of the interaction of the acoustic source and the acoustic sensing system.

The operation of the above-described acoustic sensing system 100 as presented in FIGS. 1–6 is illustrated in FIG. 7 in flowchart form. A first block 702 in a source flow diagram represents the triggering event for the operation of the acoustic sensing system 100, wherein the acoustic source 130 transmits a sync pulse to the acoustic sensing system. (See FIG. 1.) In an alternative preferred embodiment, the acoustic sensing system 100 can send a sync pulse to the acoustic source 130 to trigger the source. This acoustic source 130 may comprise, e.g., a surface acoustic source or an underground acoustic source.

The acoustic sensing system 100 receives the sync pulse as indicated by a first block 704 in a series of blocks corresponding to the steps performed by the acoustic sensing system 100. In response to receiving the sync pulse, the acoustic sensing system 100 begins sensing. That is, the acoustic sensing system 100 begins measuring the level of acoustic vibration at the sensors S1–S96. The start of the sensing is represented by block 706 in FIG. 7.

As shown in the source flow diagram, after a predetermined delay (block 708), the acoustic source 130 starts producing acoustic waves 102 as indicated in a block 710. As represented by a block 712, the acoustic sensing system 100 continues monitoring the level of acoustic vibration at the sensors S1–S96 and begins to sense the acoustic waves 102 emitted by the acoustic source 130 that reach the acoustic sensors. A more detailed discussion of the steps involved in sensing acoustic vibration are presented in FIG. 8 in flow chart form, as discussed more fully below.

A block 714 represents the sensing system 100 sending the results of measurements of the level of vibration at the acoustic sensors S1–S96 to seismic processing system as seismic data. At a block 716, the system 100 stops sensing the acoustic data. A determination as to when to stop sensing data is advantageously based upon the expiration of a predetermined time internal from the sync pulse.

Figure 8:
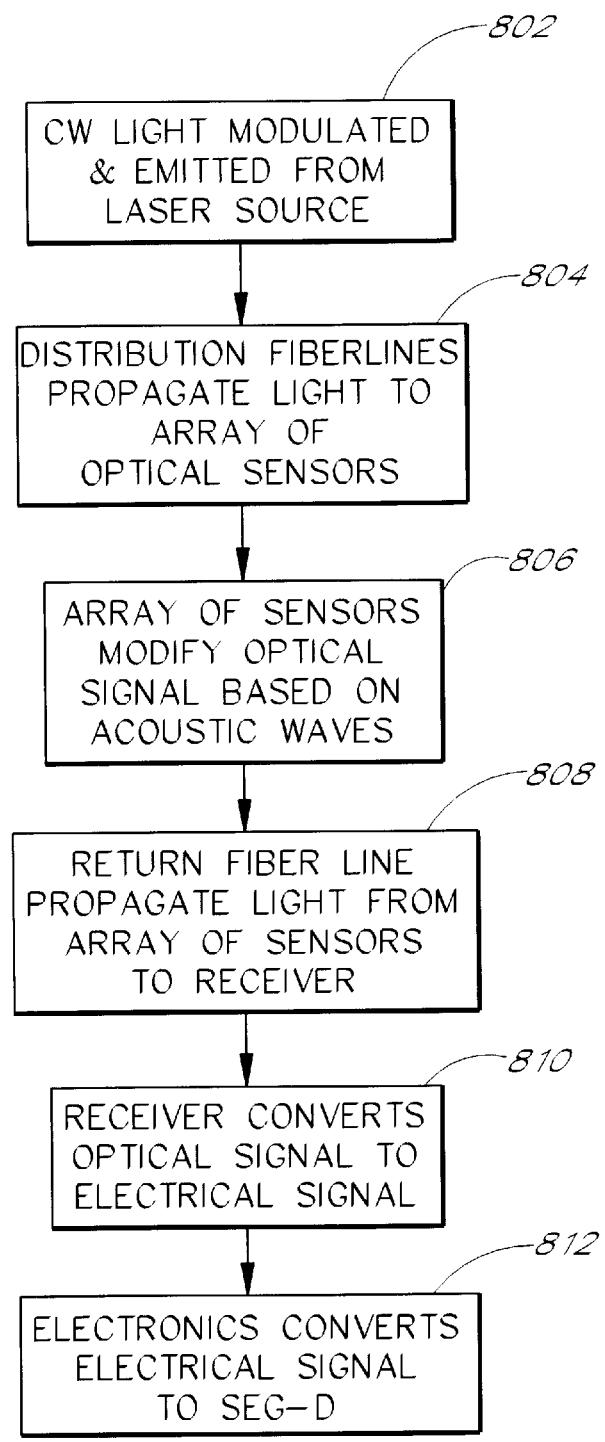
FIG. 8 illustrates a flow chart of the operation of the acoustic sensing system, namely, the process by which acoustic waves are sensed and data is output in conventional industry standard seismic format.

The process for sensing acoustic data in the block 706 and the block 712 in FIG. 7 is depicted in more detail in FIG. 8. As discussed above, the sensing for acoustic vibration at the acoustic sensors S1–S96 starts immediately after receiving the sync pulse, although a delay exists between the time the sync pulse is received and the acoustic source 130 begins producing acoustic waves 102. This permits the seismic processing system to receive data indicative of the acoustic background noise prior the receipt of acoustic waves from the acoustic source.

In FIG. 8, a first block 802 indicates that continuous wave light is emitted from each of the laser sources LS1–LS6. The light from each source is modulated, as discussed above. In particular, the light from each of the laser sources LS1–LS6 is modulated at a different modulation frequency.

A block 804 represents the next step wherein the distribution fiber lines DF1–DF6 propagate the light from the laser sources LS1–LS6 to the optical sensors S1–S96. As discussed above, the light in the respective test arms 508 of the optical sensors S1–S96 is variably delayed when acoustic waves 102 strike the sensors. (See block 806). The light in the reference arm 510 of each sensor S1–S96 is not variably delayed. Each of acoustic sensors S1–S96 combines the light from the two arms 508, 510 in the output coupler 512.

A block 808 represents the return fiber lines RF1–RF16 carrying the light outputted by the optical sensors S1–S96 to the fiber receivers 604, i.e., the 24-channel digital receivers/demodulators 604. The fiber receivers, which include the optical detectors D1–D16, convert the optical signals incident on the optical detectors into electrical signals as indicated in a block 810. As depicted by a block 812, the processing electronics 304 convert the electrical signal outputted by the optical detectors D1–D16 into SEG-D format, a standard format established by the Society of Exploration Geophysicists. The SEG-D format is conventional and is well known in the art.

The embodiment described above is particularly well suited for subterranean geophysical surveys such as are employed in determining the presence of "in-place" oil reserves. The acoustic sensors S1–S96 contained within the acoustic array cable 104 are capable of being lowered into the borehole of an oil well. The acoustic sensors S1–S96 may also be employed for land seismic applications and in ocean bottom cables.

As used herein, the term borehole is defined as a shaft that extends to the bottom of a well 118 and a "well" is simply a hole dug by drilling and removing earth from the ground, often for the purpose of accessing oil or water.

Cable

The cable 202 shown in FIG. 2 is designed to fit into a well 118 such as an oil well. If the cable 202 is small enough, the cable can be inserted into the production tubing or in the gaps between the production tubing in the casing. However, the cable needs to be smaller than at least the inner diameter of the production tubing.

As described above, the term "casing" refers to a large metal pipe that is typically inserted into the borehole. "Production tubes" are smaller pipes inserted in the casing that allow access to the bottom of the well 118.

The standard diameter for production tubing is two inches in the United States and is 1.25 inches in the North Sea. Consequently, to fit in the production tubing or in the gaps between the production tubing, the cable 202 needs to have a diameter less than two inches for use in the United States and less than 1.25 inches for use in the North Sea.

Conventional electronic acoustic sensor arrays range from 2.5 to 6 inches in diameter requiring all the production tubing to be removed from the casing in order to insert a probe containing the array down into the well 118. After the probe is removed, the production tubing must be reinserted into the casing. The removal and reinsertion procedure is both costly, time-consuming, and inconvenient.

Accordingly, the cable 202, including the downlead cable 106, the interface 204, and the acoustic array cable 104 have an outer diameter that is less than two inches. The diameter of the cable 202 is preferably than 1.25 inch. More preferably, the diameter of the cable 202 is less than 1.1 inches. Also, preferably the diameter of the acoustic array cable 104 does not vary more than ±0.01 inch.

As shown above, the cable 202 includes a downlead cable 106 joined to an acoustic array cable 104. The downlead cable 106 does not contain any sensors S1–S96. Preferably, the downlead cable 106 has a length selected from the range between 1,000 feet and 20,000 feet. In one particular embodiment, the downlead cable 106 is approximately 10,000 feet long.

As described above, the acoustic array cable 104 contains the acoustic sensors S1–S96. Preferably, these acoustic sensors S1–S96 are evenly spaced through the acoustic array cable 104. For example, in one particular embodiment each of the acoustic sensors S1–S96 are advantageously spaced five feet apart within the acoustic array cable 104. The spacing, however, may vary ±0.25 inches or by ±0.5% axially.

The spacing in the present invention, however, is not limited to spacings of five feet, rather, the spacing may be larger or smaller than five feet. For example, in one application, the acoustic sensors S1–S96 may preferably be spaced 5 to 100 feet apart within the acoustic array cable 104. Closer spacing provides better resolution of the acoustic signals. Greater spacing provides greater coverage of the acoustic signals at the expense of resolution. Although even spacing is preferable, the spacing need not be the same between each of the sensors S1–S96. The spacings described above still apply to the case where each of the sensors S1–S96 are not separated by the same distance.

The length of the active portion of acoustic array cable 104 varies in accordance with the spacing between the acoustic array sensors S1–S96. The active portion of the array cable 104 is the aperture of the array. Preferably, the acoustic array cable 104 has a length selected from the range between 200 feet and 1000 feet. More preferably, the length of the acoustic array cable 104 is approximately 500 feet. By spacing the sensors farther apart, the aperture can be increased to as much as 10,000 feet.

Preferably, the cable 202 is durable enough to protect the distribution fiber lines DF1–DF6, the return fiber lines RF1–RF16, and the acoustic sensors S1–S96 against the harsh downhole environment. As used herein, the term "downhole" is defined as down in the borehole. The downhole environment includes high temperature and high pressure and may also include corrosive liquids commonly found in an oil well environment.

In some cases, the cable 202 will be lowered into a pipe such as the production tubing or casing in the well where the pressure in a region of the pipe at the top of the well (i.e., at the surface 116) is higher than the ambient pressure at the top of the well (i.e., at the surface 116 but outside the well). The cable 202 may be lowered through a grease injection head capable of maintaining a pressure difference between the ambient pressure at the top of the well and the pressure within the region of the pipe at the top of the well. In the case where the cable 202 is lowered through a grease injection head, a cable 202 having a uniform diameter is required.

Distribution Fiber Lines

As shown in FIGS. 3 and 4A–4H, the distribution fiber lines DF1–DF6 couple the light from the laser sources LS1–LS6 into the optical sensors S1–S96 via the input couplers 420. In each sensor group 401–408, a certain fraction of the light from the lasers sources LS1–LS6 is coupled to one of the sensors S1–S96 in that group. The amount of light coupled into each sensor S1–S96 is preferably chosen so as to reduce differences in the level of optical signal delivered to each sensor, and more particularly, to reduce the variations in the power level of the optical signals that are delivered to the different optical detectors D1–D16. A design for sensor arrays that enables the signal levels of the optical signals returned from the sensor groups 401–408 to their associated detectors D1–D16 to be similar in magnitude is disclosed in the related application of entitled "Architecture for Large Optical Fiber Array Using Standard 1×2 Couplers", U.S. patent application Ser. No. 09/107,399, filed on Jun. 30, 1998 which is hereby incorporated by reference herein.

Although six distribution fiber lines DF1–DF6 carry light beams emitted by six laser sources L1–L6 as shown in FIGS. 3 and 4A–4H, the number of distribution fiber lines that can be used is not restricted to six. Rather, the number of distribution fiber lines DF1–DF6 employed can range from two to twelve or more. Preferably, however, the number of distribution fiber lines DF1–DF6 will correspond with the number of laser sources LS1–LS6.

Similarly, in the embodiment shown in FIGS. 4A–4H, each of the distribution fiber lines DF1–DF6 couples light into one of the sensor S1–S96 in each of the sensor groups 401–408. The present invention is not limited to this arrangement.

Acoustic Sensors

The acoustic sensors S1–S96 that are employed in the embodiment depicted in FIGS. 1–5 are "optical" sensors and more particularly "all-optical" sensors.

As used herein the term "optical" means pertaining to or using light, which corresponds to electromagnetic radiation in the wavelength range extending from the vacuum ultraviolet at about 40 nanometers, through visible spectrum, to the far infrared at 1 millimeter in wavelength. More particularly, the optical sensors in the present invention operate in the range of visible or infrared wavelengths. Most particularly, the optical sensors operate in the infrared range at approximately 1319 nanometers.

As used herein the term "all-optical" means that the downhole portion of the acoustic sensor array does not include any electronics. In particular, the acoustic sensors S1–S96 are electrically passive devices; they require no electrical components or electrical connections to the other components. Most notably, the acoustic sensors S1–S96 do not rely on any semiconductor-based electronics, which are highly sensitive to temperature. Semiconductor-based electronics such as transistors are generally not compatible with the high temperatures that prevail in the downhole environment, e.g., 10,000 feet below the surface of the earth. For example, some preamplifiers designed to survive high temperatures have a short lifetime and may last only for one hour under harsh conditions. In contrast, the embodiment described above requires no pre-amplifier in the borehole.

Each of the acoustic sensors S1–S96 in the preferred embodiment comprises a sensor that receives an optical beam as input and that outputs an optical signal that contains information corresponding to the level of acoustic vibration incident on the sensor. More preferably, the sensors S1–S96 employed in the present invention are fiber-optic sensors wherein a beam of light is inputted into one end of a fiber, the light beam is altered in some manner while in the fiber, and this altered beam is outputted at another end of the fiber. As used herein, the term fiber-optic sensor is defined as a sensor for monitoring some physical property that comprises a length of optical fiber having light within it, wherein the fiber acts as a transducer that modifies some attribute of the light upon exposure to variation in the physical property being measured.

Preferably, the acoustic sensors S1–S96 are optical interferometers. Most preferably the sensors S1–S96 are Mach-Zehnder interferometers. While acoustic sensors S1–S96 as depicted in FIG. 5 comprise Mach-Zehnder interferometers, the acoustic sensors of the present invention are not so limited but may comprise other interferometers as well as other types of optical sensors including sensors other than fiber-optic sensors. Other interferometers may include, for example, Michelson interferometers, Fabry-Perot interferometers, and Sagnac interferometers.

In accordance with the present invention, the acoustic sensors S1–S96 need to be capable of operating in a downhole. In particular, the sensors S1–S96 need to be able to function and output a retrievable signal at a depth in the range of between 1,000 and 20,000 feet below the surface of the earth. More preferably, this depth is approximately 10,000 feet.

In particular, the sensors S1–S96 must be capable of functioning within the acoustic array cable 104 while the temperature surrounding the acoustic array cable in the range of between 100° C. and 150° C.

Additionally, the sensors S1–S96 must be capable of functioning within the acoustic array cable 104 while the pressure on the acoustic array cable is in the range of 5,500 pounds per square inch (p.s.i.).

The acoustic sensors S1–S96 must be capable of functioning within the acoustic array cable 104 when the acoustic array cable is immersed in water. Accordingly, the optical sensor S1–S96 may comprise a hydrophone. Alternatively, the optical sensor S1–S96 may comprise a geophone or a combination of a hydrophone and a geophone, e.g., one hydrophone and three geophones. A geophone is a vector sensor. Consequently the preferred arrangement is to have three geophones employed together, possibly in combination with a hydrophone.

A hydrophone measures pressure, pressure changes, or both. A hydrophone typically measures pressure or pressure changes in the audio or seismic range corresponding to at least 1 Hz to 30 kHz. A geophone measures movement, displacement, velocity, and/or acceleration. The geophone typically measures movement, displacement, velocity, or acceleration in the audio or seismic range corresponding to at least 0.1 Hz to 10 kHz. One preferred hydrophone design is disclosed below.

Although 96 acoustic sensors S1–S96 are shown in FIGS. 3 and 4A–4H, the number of sensors that can be used is not restricted to 96. As described above, the number of sensors can be doubled to 192. More generally, the number of acoustic sensors S1–S96 can range from two to more than 200. If time division multiplexing is also employed, the number of acoustic sensors S1–S96 can be increased 10 to 100 times. Accordingly, the number of acoustic sensors S1–S96 can range from two to 20,000 or more. Preferably, however, the number of acoustic sensors S1–S96 corresponds to the product of the number of laser sources LS1–LS6 and the number of optical detectors D1–D16 which also corresponds to the product of the number of distribution fibers lines DF1–DF16 and the number of return fiber lines RF1–RF16.

Return Fiber Lines

As shown in FIGS. 3 and 4A–4H, the return fiber lines RF1–RF16 couple the light from the acoustic sensors S1–S96 to the optical detectors D1–D16 via output couplers 420. In each sensor group 401–408, a certain fraction of the light from the acoustic sensors S1–S96 is coupled to one of the optical detectors D1–D16. The amount of light coupled into each sensor S1–S96 is preferably chosen so as to reduce the differences in the power level of the optical signals that are delivered to the different optical detectors D1–D16. In particular, the coupling ratios of the input couplers 420 and the output couplers 430 are selected to reduce variations in the returned optical signal levels at the detectors D1–D16. As discussed above, a design for sensor arrays that enables the signal levels of the optical signals returned from the sensor groups 401–408 to their associated detectors D1–D16 to be similar in magnitude is disclosed in the U.S. patent application Ser. No. 09/107,399, cited above.

The embodiment shown in FIGS. 3 and 4A–4H includes eight sensor groups in which no two adjacent sensors have either a common distribution fiber line or a common return fiber line. The present invention is not limited to this arrangement. For example, sixteen sensor groups can be configured so that each sensor group has one of the return fibers R1–R16 dedicated to it as disclosed in U.S. patent application Ser. No. 09/107,399 cited above.

In accordance with the present invention, the return fiber lines RF1–RF16 as well as the distribution fiber lines DF1–DF6 need to be able to operate in a downhole and, therefore, need to be capable of functioning and outputting a retrievable signal at a depth in the range of between 5,000 and 20,000 feet below the earth's surface. As described above, the return fiber lines RF1–RF16 as well as the distribution fiber lines DF1–DF6 are contained within the cable 202. This cable 202 serves in part to protect the acoustic array from the harsh environment of the downhole. In particular, the return fiber lines as well as the distribution fiber lines must be capable of functioning within the cable while the temperature surrounding the cable in the range of between 100° C. and 150° C. Additionally, the return fiber lines as well as the distribution fiber lines must be capable of functioning within the cable while the pressure on the cable is as much as 5,500 pounds per square inch.

The return fiber lines RF1–RF16 as well as the distribution fiber lines DF1–DF6 must be capable of functioning within the cable when the cable is immersed in water.

Although sixteen return fiber lines are shown in FIGS. 4A–4H, the number of return fiber lines that can be used is not restricted to sixteen. For example, the number of return fiber lines can be doubled to 32, as described above. More generally, the number of return fiber lines employed can range from two to more than 32

Optical Detectors

In the embodiment depicted in FIGS. 1–5, the optical detectors D1–D16 output an electrical signal whose magnitude is proportional to the intensity of incident light thereon. In particular, these optical detectors D1–D16 output a voltage or a current responsive to the intensity of incident light. In one embodiment, the optical detectors D1–D16 output a current responsive to the intensity of incident light, and a transimpedance amplifier is employed to convert the current output into a voltage.

As shown in FIGS. 3 and 4A–4H, each of the return fiber lines RF1–RF16 directs light onto one of the optical detectors D1–D16. In one preferred embodiment of the present invention, each of the optical detectors D1–D16 comprises a polarization diversity receiver to guarantee the strongest optical interference signal is taken and processed. In this embodiment, each of the optical detectors D1–D16 includes three photodetectors, such as photodiodes, that sense a portion of light from the beam incident on the optical detector. In particular, the three photodetectors sense three different polarizations. The processing electronics 304 subsequently samples the signal originating from each of the three photodetectors and selects the photodetector that yields the strongest signal for each acoustic channel. A polarization diversity receiver that employs three such photodiodes is described in U.S. Pat. No. 5,852,507 to Hall, which is hereby incorporated by reference herein.

Although sixteen optical detectors D1–D16 are shown in FIG. 3, the number of optical detectors that can be used is not restricted to sixteen. For example, the number of optical detectors D1–D16 can be doubled to 32, as discussed above. More generally, the number of optical detectors D1–D16 employed can range from two to more than 32. Preferably, however, the number of optical detectors D1–D16 will correspond with the number of return fiber lines.

24-Channel Digital Receiver/Demodulators (Fiber Receivers)

The 24-channel digital receiver/demodulators 604, alternatively referred to as fiber receivers are displayed in FIG. 6 described above, as well as in FIGS. 9A–9B.

Figure 9A:
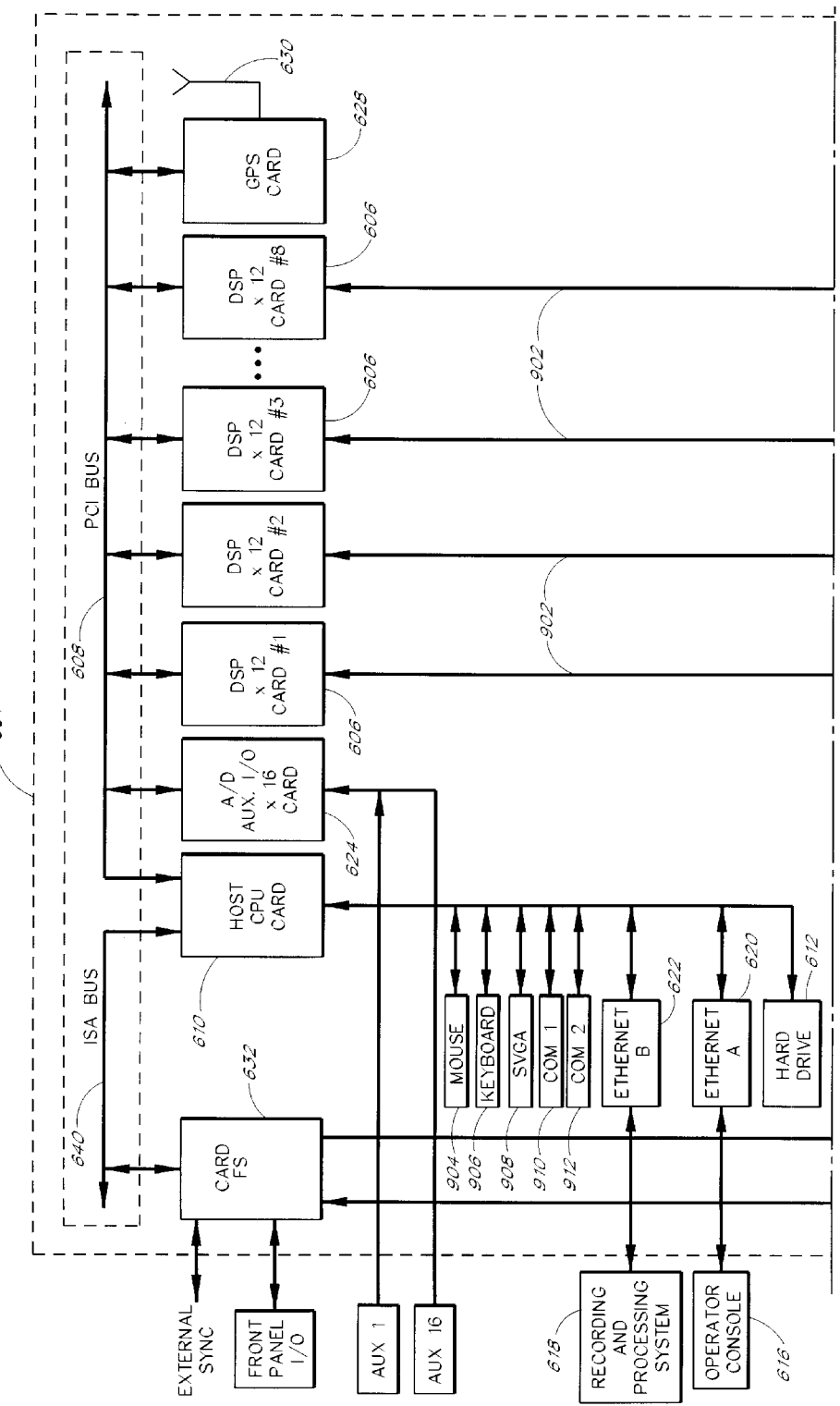
FIGS. 9A–9B, illustrates a schematic view of the detector/electronics assembly and laser drawer in the second embodiment of the acoustic sensing system having 192 sensors in a 2×(6×16) sensor array.
Figure 9B:
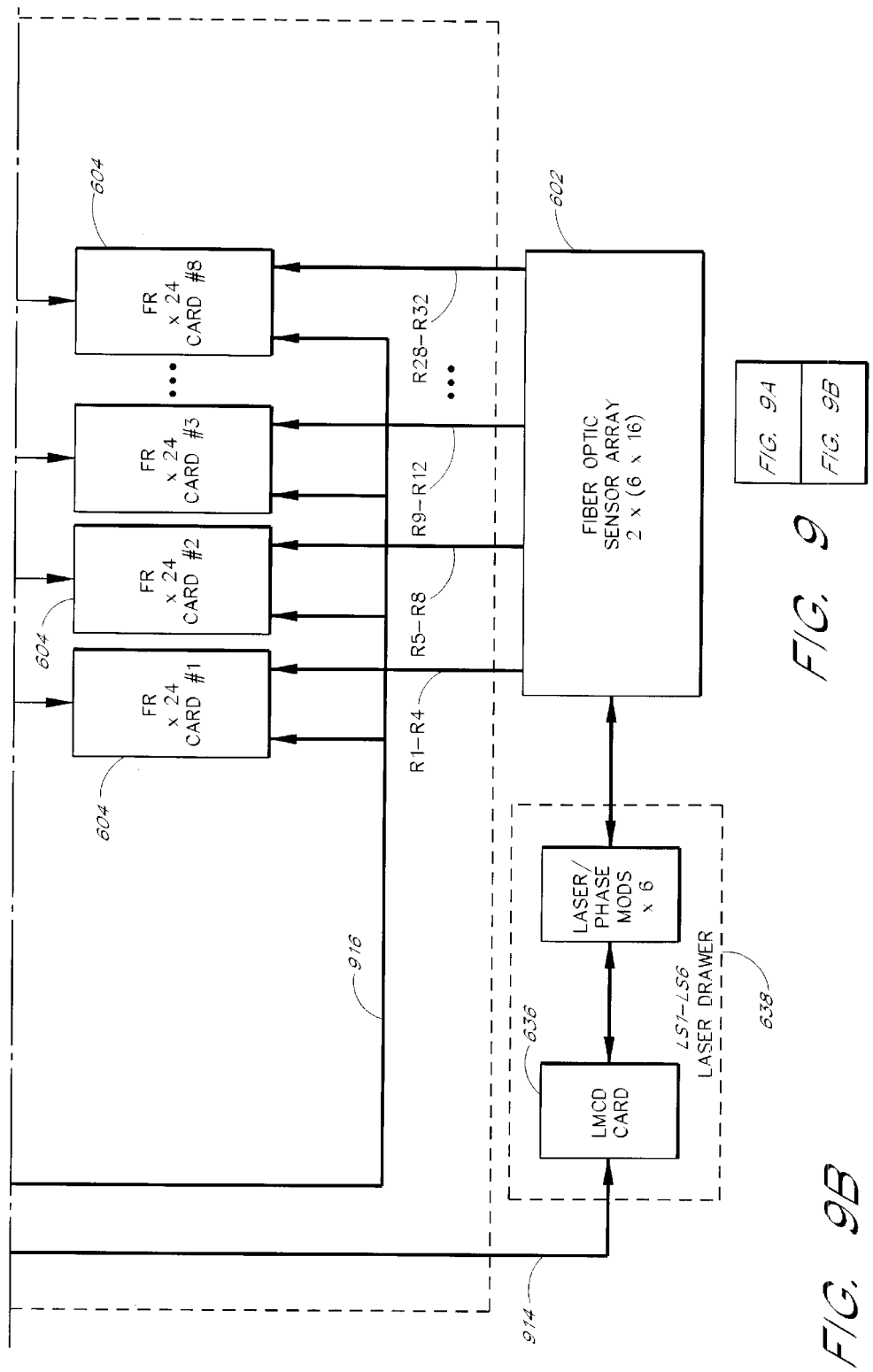

FIGS. 9A–9B depict the detector/electronics assembly 601, laser drawer 638, and acoustic sensor array 602 for a second embodiment of the acoustic sensing system 100 of the present invention having 192 acoustic sensors S1–S192 (not shown) and six laser sources LS1–LS6.

Such a system 100 having 192 acoustic sensors S1–S192 is shown in FIG. 3B described above. The system 100 in FIG. 3B comprises 192 sensors S1–S192 contained within two separate acoustic array cables 104 appended to two separate downlead cables 106.

The laser sources LS1, LS2, LS3, LS4, LS5, LS6 supply twelve optical feed lines F1–F12, which are joined at optical couplers C1–C6. A first set of six optical feed lines F1–F6 extend from optical couplers C1–C6 to a first terminator 306a connected to a first cable 202a. The first cable 202a comprises a first downlead cable 106a and a first acoustic array cable 104a. The first acoustic array cable 104a holds a first set of 96 acoustic sensors S1–S96. A second set of six optical feed lines F7–F12 extend from optical couplers C1–C6 to a second terminator 306b connected to a second cable 202b. This second cable 202b comprises a second downlead cable 106b and a second acoustic array cable 104b. The second acoustic array cable 104b holds a second set of 96 acoustic sensors designated S97–S192.

The first terminator 306a also provides a link between the first downlead cable 106a and sixteen return fibers R1–R16, which are coupled to sixteen optical detectors D1–D16. The second terminator 306b also provides a link between the second downlead cable 106b and sixteen additional return fibers designated R17–R32, which are coupled to sixteen additional optical detectors D7–D32. Such a system 100 has six distribution fiber lines DF1–DF6 (not shown) and 32 return fiber lines RF1–RF32 (not shown) in each cable 202a, 202b. The outputs of the 32 optical detectors D1–D32 are electrically connected to processing electronics 304.

In an alternative embodiment comprising 192 acoustic sensors S1–S192, the 192 sensors S1–S192 may be contained in a single acoustic array cable 104 attached to a downlead cable 106. Such a system 100 has six distribution fiber lines DF1–DF6, 32 return fiber lines RF1–RF32, and 32 optical detectors D1–D32.

Either a system 100 comprising a single cable 202 or a system comprising two cables 202a, 202b can be employed in conjunction with 192 sensors S1–S192 and the detector/ electronics assembly 601 depicted in FIGS. 9A–9B. As discussed above, the 192 sensors can be contained in the single cable 202 or a first set of sensors S1–S96 can be contained within a first cable and a second set of sensors S97–S192 can be contained within second cable.

FIG. 9B shows an optical sensor array 602 comprising fiber optic sensors. This optical sensor array 602 is designated a 2×(6×16) array because various configurations can be employed to accommodate 192 sensors S1–S192.

In FIG. 9B, the 32 return fiber lines RF1–RF32 are separated into eight groups having four fibers each. Each group is connected to one of the 24-channel digital receiver/demodulators 604 via four of the return fibers R1–R32. The 24-channel digital receiver/demodulators 604 comprise circuitry formed on circuit boards, and, are hereinafter referred to as 24-channel digital receiver/demodulator cards or as fiber receiver cards. Each fiber receiver card 604 receives four of the return fibers R1–R32 and, accordingly, contains four of the optical detectors D1–D32 to sense the light from the four return fibers. Each of the return fibers R1–R32 contains the output of six of the acoustic sensors S1–S192. The six outputs are modulated at different frequencies, as described above.

The optical detectors D1–D32 within the fiber receiver cards 604 comprise polarization diversity receivers as discussed above. Polarization diversity receivers are known in the art and one such polarization diversity receivers described in U.S. Pat. No. 5,852,507 to Hall was cited above. In this embodiment containing a polarization diversity receiver, each of the optical detectors D1–D32 includes three photodetectors, such as photodiodes, that sense respective portion of light from the beam incident on the optical detector in accordance with the polarization of the light. The processing electronics 304 subsequently sample the signal originating from each of the three photodetectors and selects the photodetector output that yields the strongest signal for each acoustic channel. The output of this photodetector is then employed until the acoustic sensing system 100 is recalibrated.

The output of the photodetector is directed to a transimpedance amplifier and converted from analog to digital via an analog-to-digital converter. This output, now in digital form, is mixed with a sinusoidal signal at the same modulation frequency at which the output of the six lasers L1–L6 is modulated, $\omega_1$, $\omega_2$, $\omega_3$, $\omega_4$, $\omega_5$, and $\omega_6$, resulting in six signals herein denoted I1, I2, I3, I4, I5, and I6. The digitized output of the photodetector is also mixed with a sinusoidal signal at twice the modulation frequency at which the output of the six lasers L1–L6 is modulated, $2\omega_1$, $2\omega_2$, $2\omega_3$, $2\omega_4$, $2\omega_5$, and $2\omega_6$, resulting in six signals herein denoted Q1, Q2, Q3, Q4, Q5, and Q6. These resultant signals individually pass through circuitry that performs decimation and through circuitry that provides gain.

For each of the optical detectors D1–D32, twelve signals are generated. Six signals are generated by mixing at the frequencies at which the six laser sources LS1–LS6 are modulated, e.g., I1–I6. Six signals are generated by mixing at twice the frequencies at which the six laser sources are modulated, e.g., Q1–Q6. Since each fiber receiver card 604 contains four of the optical detectors D1–D32 that each receive light from six laser sources LS1–LS6, then each fiber receiver card produces 48 resultant signals. One set of 24, derived from demodulation at the frequencies $\omega_1$, $\omega_2$, $\omega_3$, $\omega_4$, $\omega_5$, $\omega_6$ and are herein denoted I1–I24 and the other set of 24, derived from demodulation at the frequencies $2\omega_1$, $2\omega_2$, $2\omega_3$, $2\omega_4$, $2\omega_5$, and $2\omega_6$ are herein denoted, Q1–Q24.

The eight fiber receiver cards 604 shown in the detector/electronics assembly 601 of FIG. 9A–9B produce a total of 384 such resultant signals, herein denoted I1–I192 and Q1–Q192.

Preferably, the magnitudes of the signals resulting from mixing with sinusoidal signals having the modulation frequencies $\omega_1$, $\omega_2$, $\omega_3$, $\omega_4$, $\omega_5$ and $\omega_6$ are equal to the magnitudes of the corresponding signals resulting from mixing with sinusoidal signals having the frequencies $2\omega_1$, $2\omega_2$, $2\omega_3$, $2\omega_4$, $2\omega_5$, and $2\omega_6$; that is, preferably |I1|=|Q1|, |I2|=|Q2|, |I3|=|Q3| . . . |I192|=|I192|. As described above, the mixed signals I1–I192, as well as Q1–Q196, each individually pass through separate circuitry that can provide gain. In this manner the mixed signals can be set to have equal magnitude, i.e., |I1| can be set equal to |Q1|, |I2| can be set equal to |Q2|, . . . and |I192| can be set equal to |I192|.

Each fiber receiver card 604 contains two demultiplexers. One demultiplexer is dedicated to selecting the signals resulting from mixing with a sinusoidal signal at the frequencies $\omega_1$, $\omega_2$, $\omega_3$, $\omega_4$, $\omega_5$, and $\omega_6$, e.g. I1–I24, the other demultiplexer is dedicated to selecting the signals resulting from mixing with a sinusoidal signal at the frequencies $2\omega_1$, $2\omega_2$, $2\omega_3$, $2\omega_4$, $2\omega_5$, and $2\omega_6$, e.g. Q1–Q24. The demultiplexers sequentially read the 24 resultant signals, e.g. I1–I24 and Q1–Q24 and pairs the signals together. In sequence, each pair of resultant signals, i.e. I1 and Q1, I2 and Q2, . . . I24 and Q24, are then provided as inputs to circuitry that computes the arctangent of the ratio of the two inputted signals, e.g., $\tan^{-1}[I_1/Q_1]$, $\tan^{-1}[I_2/Q_2]$ . . . $\tan^{-1}[I_{24}/Q_{24}]$. This circuitry outputs the respective phase angles, $\phi 1$, $\phi 2$, . . . $\phi 24$. Each phase angle, $\phi 1$–$\phi 24$, etc., corresponds to the output of one of the acoustic sensors S1–S24, etc. These phase angles, $\phi 1$, $\phi 2$, . . . $\phi 24$, are then provided as input to circuitry that differentiates the phase angles with respect to time to produce $d\phi 1/dt$, $d\phi 2/dt$, . . . $d\phi 24/dt$.

In the preferred embodiment, the arctangent circuitry outputs a 16-bit word corresponding to phase. The circuitry that performs differentiation receives the 16-bit word and outputs a 32-bit word. This 32-bit word comprises two 16-bit words corresponding to the differentiated phase for two channels, e.g. $d\phi 1/dt$ and $d\phi 2/dt$, packed into one 32-bit word. Thus, in each of the 24-channel digital receiver/demodulators 604, the results of two channels within the 24-channel digital receiver/demodulator are packed together into one word and the word is outputted from the receiver/demodulator 604.

With reference to FIG. 9A and 9B, each 32-bit word outputted by one of the eight 24-channel digital receiver/demodulators 604 is coupled to one of the eight 12-DSP elements 606 via the digital signal processor cluster local bus 902 and accompanying link ports. This 32-bit word is unpacked into two 16-bit words in the 12-DSP elements 606. Since two of the channels are packed together, the output of the 24-channel digital receiver/demodulators 604 can serve as the input for the 12-DSP elements 606.

Although eight fiber receiver cards (i.e., 24-channel digital receiver/demodulators) 604 are shown in FIG. 9B, the number of fiber receivers that can be used is not restricted to eight. For example, the number of fiber receiver cards can be reduced to four. More generally, the number of fiber receivers 604 employed can range from one to more than eight. Preferably, however, the number of fiber receiver cards 604 corresponds to the number of return fiber lines RF1–RF32 and the number of 12-DSP cards 606.

Additionally, although each fiber receiver 604 shown in FIG. 9A contains 24 channels, each channel corresponding to the output of one of the acoustic sensors S1–S192, the number of channels that can be used is not restricted to 24.

12-DSP Cards

As discussed above, the eight 12-DSP elements 606 receive 32-bit words outputted by the eight 24-channel digital receiver/demodulators 604. Each one of the 12-DSP elements 606 is coupled to one of the eight 24-channel digital receiver/demodulators 604 via the digital signal processor cluster local bus 902 and accompanying link ports.

Each 32-bit word received by one of the 12-DSP elements 606 is unpacked into the two component 16-bit words in the 12-DSP elements 606. Each 16-bit word corresponds to the output of one of the acoustic sensors S1–S192.

The 12-DSP elements 606 decimate the incoming signal reducing the data flow rate of the signals received by the 12-DSP elements to a rate more compatible with the sampling rate standard to conventional seismic recording equipment. The word "decimate" is used herein in accordance with its conventional usage in the art as meaning to re-sample the signal at a lower rate to reduce the original sampling rate for a sequence to a lower rate. In particular, in the preferred embodiment, the 12-DSP elements 606 receive signals from the fiber receivers at a rate of 512,000 samples per second and output a signal to the CPU 610 at a rate of 500, 1,000, 2,000, or 4,000 samples per second.

More specifically, the 12-DSP elements 606 convert the 16-bit words, which were obtained from unpacking the two components of the 32-bit words, from 16-bit fixed point words to 32-bit floating point words. The these 32-bit words are passed through a multi-stage finite input response (FIR) filter, which serves as a low pass filter. This filter has a symmetric impulse response and introduces no phase distortion or introduces only linear phase distortion across the frequencies. The 32-bit floating point words are converted to 32-bit fixed point words and then passed to a RAM (Random Access Memory) buffer before being sent to the CPU 610. Each of these words correspond to the output of one of the acoustic sensors S1–S192.

The 12-DSP elements 606 in the embodiment depicted in FIG. 9A have interfaces unique to the Analog Devices SHARC (Super Harvard Architecture) 2106x, e.g., 21060, 21061, 21062, or 21065 DSP.

As described above, each of the 12-DSP elements 606 couples its respective output signal to the CPU 610 via the PCI bus 608. The PCI bus 608 is a generic bus conventionally employed in personal computers. As such, a wide variety of hardware is readily available that interfaces with a PCI bus 608. Consequently, as improvements are made in hardware and electronics becomes faster, components in the detector/electronics assembly 601 can be easily replaced with these faster PCI compatible electronics.

Although eight 12-DSP cards 606 are shown in FIG. 9A, the number of 12-DSP cards that can be used is not restricted to eight. For example, the number of 12-DSP cards 606 can be reduced to four. More generally, the number of 12-DSP cards 606 employed can range from one to more than sixteen. Preferably, however, the number of 12-DSP cards 606 corresponds to the number of fiber receiver cards 604 and return fiber lines RF1–RF32.

Additionally, although each of the 12-DSP cards 606 shown in FIG. 9A contains 12 outputs, each output corresponding to the output of two of the acoustic sensors S1–S192, the number of outputs that can be used is not restricted to 12. The number of outputs employed can range from two to more than 24. Preferably, however, the number of DSP outputs corresponds to one-half the number of received/demodulator channels.

CPU

The CPU 610 receives the 32-bit fixed point words corresponding to the output of one of the acoustic sensors S1–S192 from the RAM buffer in the 12-DSP cards 606. The CPU 610 truncates the 32-bit words down to 24 bits. The CPU 610 also provides any necessary scaling to comply with the SEG-D format.

Additionally, to comply with SEG-D format, the CPU 610 provides timing information. In particular, the CPU 610 outputs the absolute measure of time when the processing electronics 304 received the sync signal from the acoustic source 130. This absolute measure of time is acquired from the GPS electronics 628 at the time the processing electronics 304 received the sync signal. The GPS card can provide 1 part per million (ppm) accuracy for time stamping events. The CPU 610 also includes the measure of time that lapsed between when the processing electronics 304 received the sync signal and when the acoustic sensing system 100 began sampling, i.e., sensing for acoustic vibration. The CPU 610 additionally provides the time separation between the samples.

FIGS. 6 and 9A show the CPU 610 outputting to the recording and processing system 618 via the Ethernet bus 622. The signal output by the CPU 610 corresponds to the filtered differentiated phase and also includes the timing information described above. This output is compliant with conventional seismic data, and more specifically, with SEG-D format. Accordingly, the phase data, i.e., the rate of change in phase, output by the CPU 610 is readable by conventional seismic data recording and processing equipment, which e.g., can use the phase and timing information to determine the amplitudes of the acoustic waves 102 at the sensors S1–S192.

The processing electronics 304 shown in FIGS. 6, 9A, and 9B can output data at a sample rate of 500 hertz (Hz), 1 kilohertz (kHz), 2 kHz, and 4 kHz upon the user's selection. The output data resolution is 24 bits. Conventional systems do not provide the ability to select sample rates of, for example, 2 and 4 kHz.

Although, the processing electronics 304 shown in FIGS. 6, 9A and 9B provides output in SEG-D format, the invention is not so limited. Other data formats can be employed, for example, SEG-Y or single precision (32-bit) ASCII. Preferably, such data formats are in conformity with conventional formats.

The CPU card 610 shown in FIG. 9A is electrically connected to a mouse 904, a keyboard 906, an SVGA card 908 for display, and to a hard drive 612. The CPU card 610 also has Com 1 910 and Corn 2 912 ports. As described above, the CPU card 610 couples to an operator console 616 via Ethernet 620.

In the embodiment shown in FIG. 9A, the CPU couples to the 12-DSP cards 606, the 16-channel A/D Auxiliary Input/Output Card 624 (denoted in FIG. 6 as the Auxiliary I/O), and the GPS card 628 via the PCI bus 608. The CPU card 610 couples to the frequency synthesizer card 632 through the ISA bus 640. The CPU 610 manages the operation and interaction of these cards.

The PCI bus 608 as well as the ISA bus 640 are generic buses conventionally employed in personal computers. As such, a wide variety of hardware is readily available that interfaces with these buses 608, 640, and in particular with the PCI bus. Consequently, as improvements are made in hardware and electronics becomes faster, components in the processing electronics 304 can be easily replaced with these faster PCI (or ISA) compatible electronics.

Laser Sources

In one preferred embodiment of the invention, the lasers L1–L6 produce optical radiation at a nominal wavelength of 1319 nanometers (nm), corresponding to an optical frequency of approximately 227 terahertz (THz) in optical fiber. The frequencies may be separated by approximately 0.5 to 3 gigahertz (GHz) and are modulated by respective carriers between approximately 2 (megahertz) MHz and 7 MHz.

The lasers L1–L6 may comprise Nd:YAG lasers that are all identical except for the optical frequency at which they are operated. The temperatures of the lasers L1–L6 are preferably adjusted so that each laser has a unique operating optical frequency/wavelength. Operating at different optical frequencies avoids optical interference between the optical signals from different sources in the same fiber.

Although Nd:YAG lasers operating at a nominal wavelength of 1319 nm are described above as being appropriate for use as lasers L1–L6, the invention is not so limited. Rather, other lasers and other wavelengths can be employed in accordance with the present invention. Additionally, other modulation frequencies can be employed. The selection of appropriate modulation frequencies is discussed more fully below.

Similarly, although six laser sources modulated at six modulation frequencies are shown in FIG. 3, the number of laser sources that can be employed is not restricted to six. The number of laser sources employed can range from one to more than twelve.

More, generally, instead of employing laser sources LS1–LS6 to couple light into the acoustic sensors S1–S192, other optical sources can be used. The optical source can be a coherent source, such as a laser diode, or an incoherent source, such as a light emitting diode (LED) or a fiber source.

Frequency Synthesizer Card

The frequency synthesize card 632 provides waveforms to the laser sources LS1–LS6 to establish the frequencies at which the outputs of the lasers L1–L6 are modulated. The frequency synthesizer card 632 also provides clock, synchronization, and timing to the fiber receivers 604 for synchronizing the system 100 and phase locking the demodulators 604 to the modulators M1–M6.

In the embodiment shown in FIGS. 6, 9A, and 9B, the frequency synthesizer produces six periodic waveforms at six different frequencies $\omega_1$, $\omega_2$, $\omega_3$, $\omega_4$, $\omega_5$, $\omega_6$. The frequency synthesizer card sends the waveforms at the six frequencies $\omega_1$, $\omega_2$, $\omega_3$, $\omega_4$, $\omega_5$, $\omega_6$, to the laser modulation control driver card 636 in the laser drawer 638 via electrical line 914. The frequency synthesizer card 630 also sends the critical timing and synchronization signals to each of the fiber receiver cards 604. The frequency synthesizer card 630 sends these signals to the fiber receiver cards 604 via a plurality of shielded signal lines 916.

As discussed above, the frequency synthesizer card 630 sends the sync signal and clock signal to the fiber receiver cards 604 and, from these two signals, the fiber receiver cards 604 generate digital carriers at the six modulation frequencies $\omega_1$, $\omega_2$, $\omega_3$, $\omega_4$, $\omega_5$, $\omega_6$ and at twice the six modulation frequencies $2\omega_1$, $2\omega_2$, $2\omega_3$, $2\omega_4$, $2\omega_5$, $2\omega_6$ for mixing and demodulation.

Although six frequencies are generated by the frequency synthesizer card 630 shown in FIGS. 6, 9A, and 9B, the number of frequencies produced is not restricted to six. The number of frequencies employed can range from two to more than twelve. Preferably, the number of frequencies will correspond to the number of laser sources LS1–LS6.

Selection of Modulation Frequencies

As noted above, the signals from six sensors, e.g. S1–S6, may be multiplexed within a single return fiber, e.g., RF1, using frequency division multiplexing. Due to the nonlinear nature of the interferometer, this modulation results in signal output from the interferometer modulated not just at the six modulation frequencies, $f_n$ ($=\omega_n/2\pi$), where n=1, . . . , 6, but also at $2f_n$, $3f_n$, $4f_n$, etc. The $f_n$ frequencies will be referred to as the "modulation frequencies" or "fundamental frequencies," and the higher multiples of $f_n$ will be referred to as "harmonics," such that the $2f_n$ signals are the "first harmonics," or "harmonics of the first order," the $3f_n$ signals are the "second harmonics," or "harmonics of the second order," etc. The group of N fundamental frequencies will be referred to as the "fundamental set." Similarly, the group of N first harmonic frequencies will be referred to as the "first harmonic set," and so on for the higher harmonics.

As noted above, the multiplexed intensity signal received by a given detector may be demultiplexed by detection of the signals at $f_n$ and $2f_n$. For the foregoing demodulation technique to work, however, each of the $f_n$ and $2f_n$ components of the multiplexed signal must be isolated in frequency space. That is, the set of $f_n$ modulation frequencies must be selected so that no $f_n$ or $2f_n$ components (i.e., the "information containing components") overlaps with any other frequency component, including any of the higher harmonics. Any information containing component that is overlapped in frequency space cannot be unambiguously demodulated. As will become more clear below, this limitation complicates the selection of modulation frequencies.

Each frequency component in the multiplexed output contains signal over a bandwidth centered about the frequency. The size of the bandwidth depends upon the frequency characteristics of the signal received by the sensor and possibly upon the frequency response of the sensor itself. Once the operating bandwidth of the frequency components is known, the various $f_n$ values must be selected with sufficient spacing to ensure that no overlapping results. The minimum spacing needed to avoid overlap between neighboring components will be referred to as $\Delta f$.

Figure 10A:
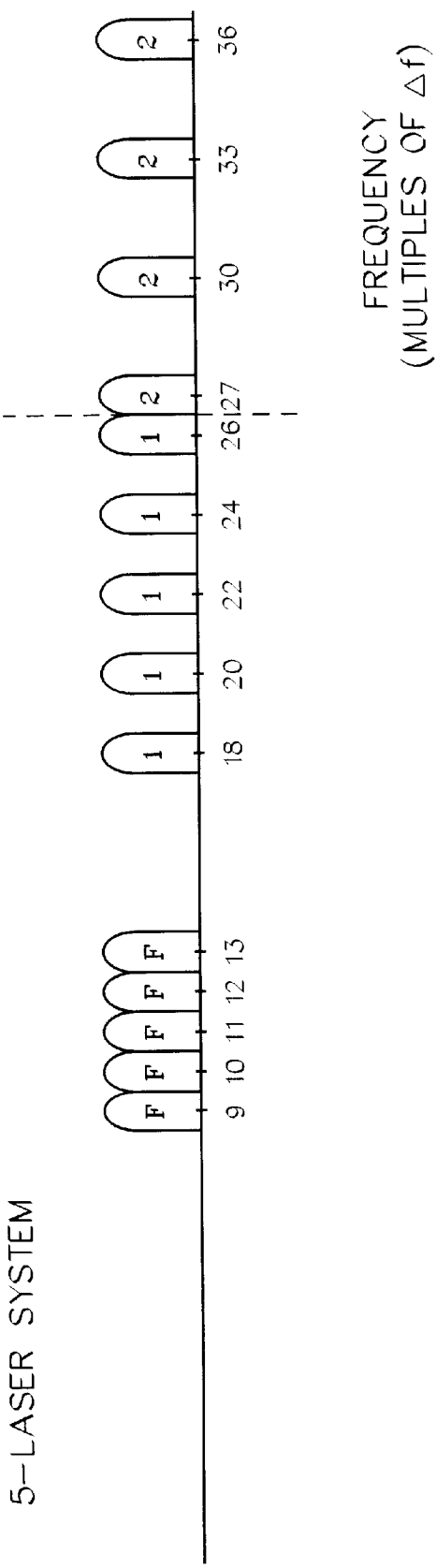
FIGS. 10A and 10B, illustrates frequency components for multiplexed signals in which the modulation frequencies have been selected so as to keep the fundamental, first harmonic, and second harmonic sets from overlapping.
Figure 10B:
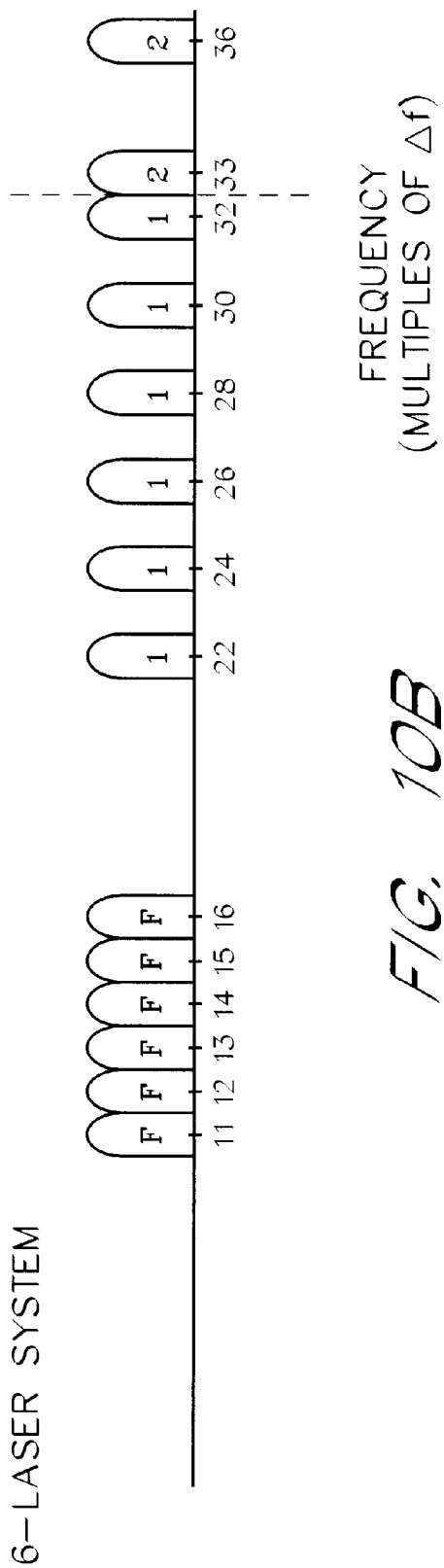

FIGS. 10A and 10B illustrate one approach to selecting frequencies so as to avoid interfering with information carrying components. The plot depicts the multiplexed signal frequency spectrum containing acoustical information received simultaneously by a single detector from a plurality of acoustical sensors. The numbers represent frequency values in multiples of $\Delta f$. Thus, if $\Delta f=0.5$ MHz, the positions indicated as 9, 10, 11, 12, and 13 correspond to actual frequencies of 4.5 MHz, 5.0 MHz, 5.5 MHz, 6.0 MHz, and 6.5 MHz, respectively. The larger the selection of $\Delta f$, the greater the possible dynamic range of the system. Thus, in practice, $\Delta f$ is selected to be as large as possible.

The multiplexed signal is depicted as a series of bullet-shaped components distributed along the spectrum. The width of each component depicts the frequency bandwidth for that component of the signal. The frequency value associated with a particular component indicates the frequency at the center of the component. Components containing the letter "F" represent fundamental frequencies.

Components containing a number represent harmonic frequencies, with the number representing the order of the harmonic. Thus, the first order harmonics contain a "1," the second order harmonics contain a "2," etc. Harmonics higher than second order are omitted from FIGS. 10A and 10B in the interest of clarity.

FIGS. 10A and 10B show multiplexed signal spectra for two systems in which the fundamental, first harmonic, and second harmonic sets do not overlap. The five-light-source system of FIG. 10A utilizes evenly spaced modulation frequencies at 9Δf through 13Δf. The spacing between neighboring fundamental frequencies is selected to equal Δf, the smallest spacing allowed. FIG. 10B illustrates the analogous six-light-source system using modulation frequencies at 11 Δf through 16Δf. This approach ensures that the fundamental components will not be interfered with by any of the harmonics, and that the first harmonics will not be interfered with by the fundamentals or by the second or higher harmonics. Since there is no overlapping of any of the information carrying signals, complete demodulation of the transmitted signal is possible. This approach, however, fails to use large portions of the frequency spectrum. For example, FIG. 10A demonstrates that the five-light-source system makes no use of the frequencies at Δf multiples of 0 to 8, 14 to 17, 19, 21, 23, or 25.

The highest information-containing frequency is depicted in FIGS. 10A and 10B as a dashed vertical line. In order to simplify the electronics needed for processing the received signal, it is preferable to select this frequency to be as low as possible. FIGS. 10A and 10B illustrate that, in the absence of overlapping sets, the processing for five-light-source and six-light-source systems must be designed to handle frequencies of at least 26Δf and 32Δf, respectively.

The problem of unused frequency space associated with the approach of FIGS. 10A and 10B is aggravated as the number of light sources increases. For an N-light-source system, the lowest fundamental frequency, $f_1$, may not be chosen below $(2N-1)\Delta f$, and the processing system must handle the largest first harmonic frequency, $2f_N$, of $(6N-4)\Delta f$. For example, a twelve-light-source system could not do better than $f_1=23\Delta f$ and $2f_{12}=68\Delta f$.

Figure 11A:
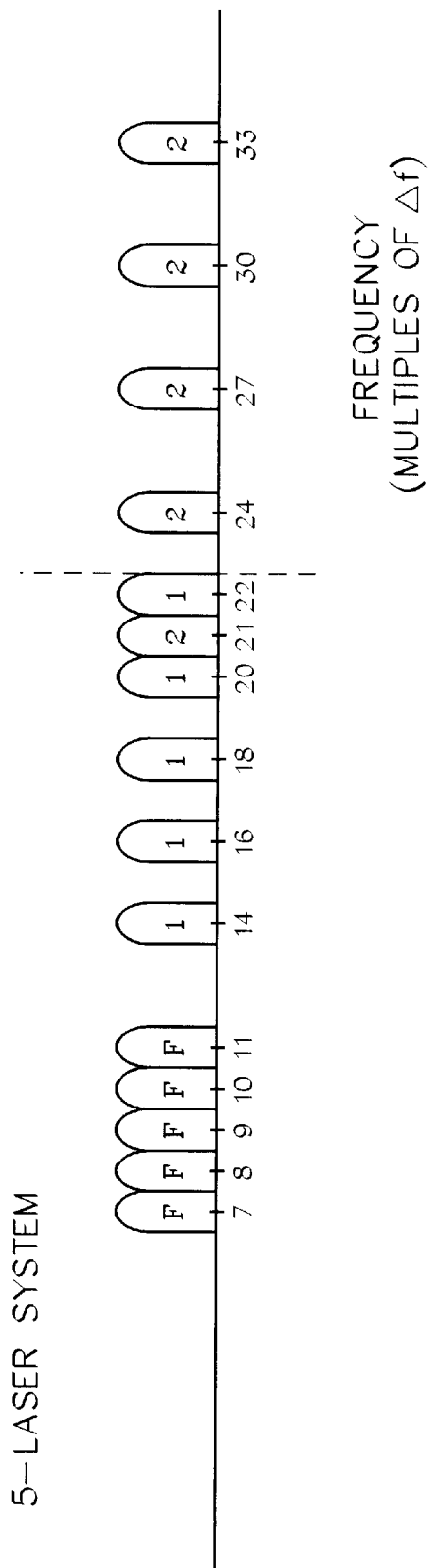
FIGS. 11A and 11B, illustrates frequency components for multiplexed signals in accordance with an embodiment of the present invention, wherein the modulation frequencies are selected to be equally spaced, and wherein the first harmonic and second harmonic sets overlap without overlapping the component signals within the two sets.
Figure 11B:
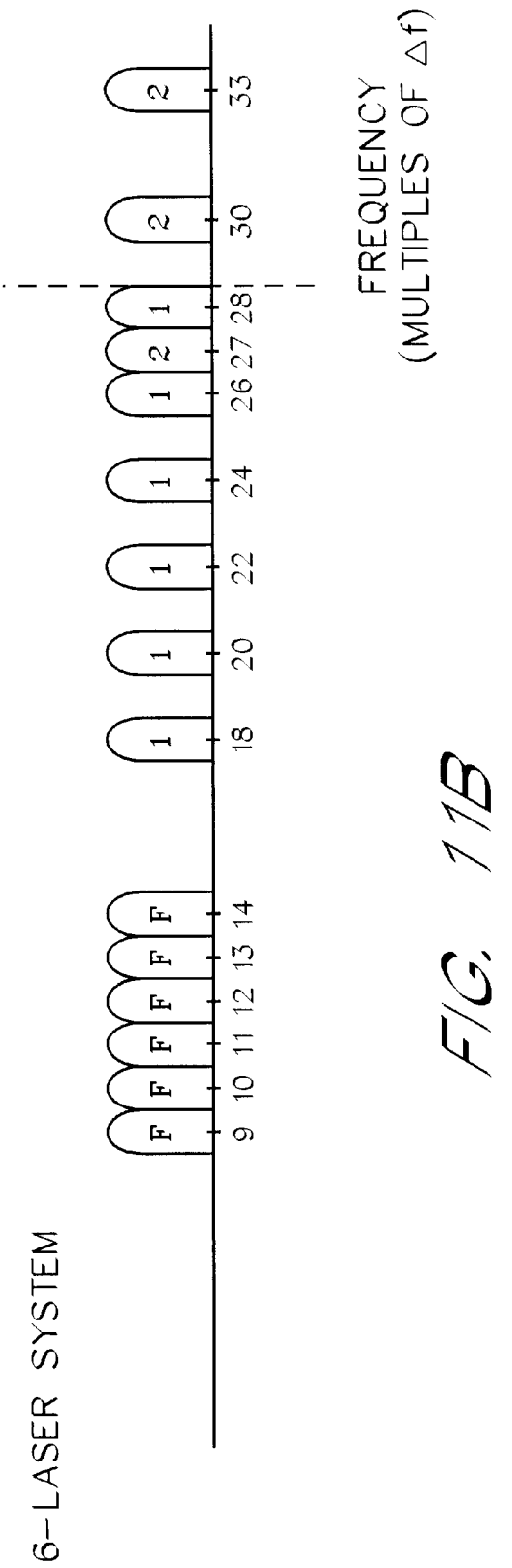

FIGS. 11A and 11B illustrate two embodiments in accordance with one aspect of the present invention. The embodiments maintain an equally spaced set of fundamental frequencies starting at a lower frequency than allowed in the non-overlapping approach of FIGS. 10A and 10B.

Comparison of FIGS. 10A and 11A indicates that for the five-light-source system the embodiment of FIG. 11A reduces the lowest fundamental frequency from 9Δf to 7Δf, while the highest first harmonic frequency is reduced from 26Δf to 22Δf. This lowering of frequencies causes the beginning of the second harmonic set (at 21Δf) to be at a lower frequency than the maximum frequency of the first harmonic set (at 22Δf). The overlapping of sets interleaves the individual frequency components in such a manner that none of the information carrying components is interfered with. In particular, the non-information carrying component $3f_1$, at 21Δf, is harmlessly nestled between the information carrying components $2f_4$ and $2f_5$, at 20Δf and 22Δf, respectively.

Similarly, a comparison of FIGS. 10B and 11B indicates that for the six-light-source system the embodiment of FIG. 11B reduces the lowest fundamental frequency from 11Δf to 9Δf, while the highest first harmonic frequency is lowered from 32Δf, to 28Δf. As with the five-light-source system, the lowest second harmonic frequency is interleaved between the two highest first harmonic frequencies, such that no information carrying components is interfered with.

The embodiments illustrated in FIGS. 11A and 11B may be generalized to any multiplexed system utilizing three or more light sources. For an N-light-source system, where $N \geq 3$, an embodiment includes equally spaced fumdamental frequencies starting at $f_1=(2N-3)\Delta f$. For the remaining modulation frequencies, this gives, for $1 > n \geq N$, $f_n = f_{n-1} + \Delta f$.

This class of embodiments results in a highest first harmonic frequency at $2f_N=(6N-8)\Delta f$. Comparing these values with the corresponding values above indicates that these embodiments reduce the lowest fundamental frequency by 2Δf and the highest first harmonic frequency by 4Δf relative to the best non-overlapping approach. TABLE I illustrates the selection of modulation frequencies associated with these embodiments for values of N ranging from 3 to 9.

TABLE I

| N | Modulation Frequencies (multiples of Δf) |
|---|---|
| 3 | 3, 4, 5 |
| 4 | 5, 6, 7, 8 |
| 5 | 7, 8, 9, 10, 11 |
| 6 | 9, 10, 11, 12, 13, 14 |
| 7 | 11, 12, 13, 14, 15, 16, 17 |
| 8 | 13, 14, 15, 16, 17, 18, 19, 20 |
| 9 | 15, 16, 17, 18, 19, 20, 21, 22, 23 |

Figure 12:
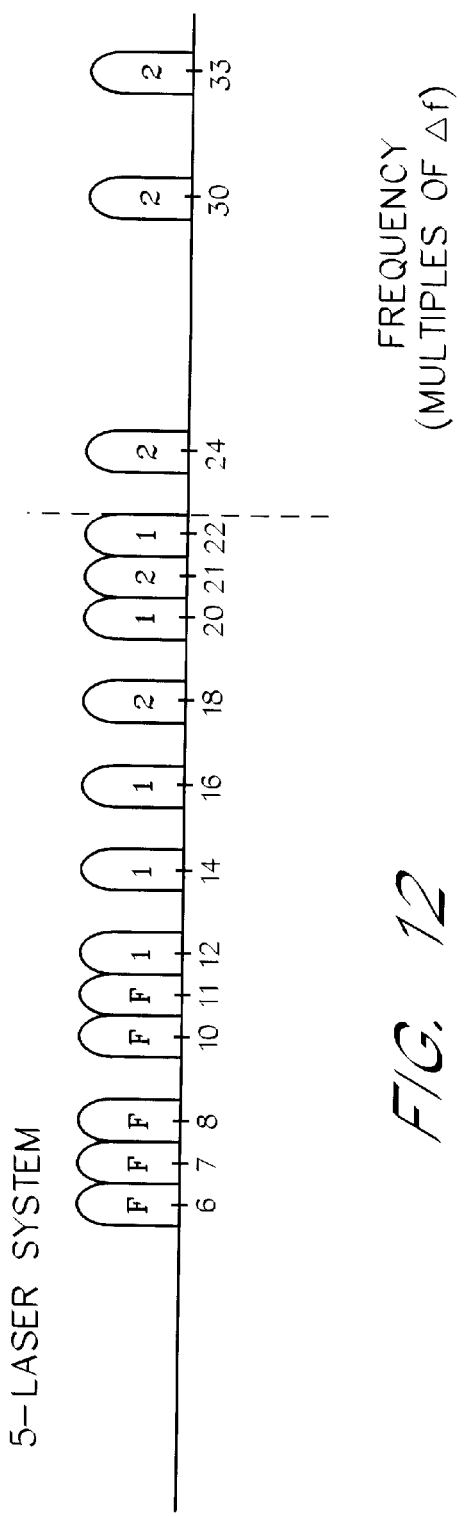
FIG. 12 illustrates frequency components for a multiplexed signal resulting from five light sources in accordance with an embodiment of the present invention, wherein the modulation frequencies are evenly spaced beginning at $6\Delta f$, except for skipping a modulation frequency at $9\Delta f$
Figure 13:
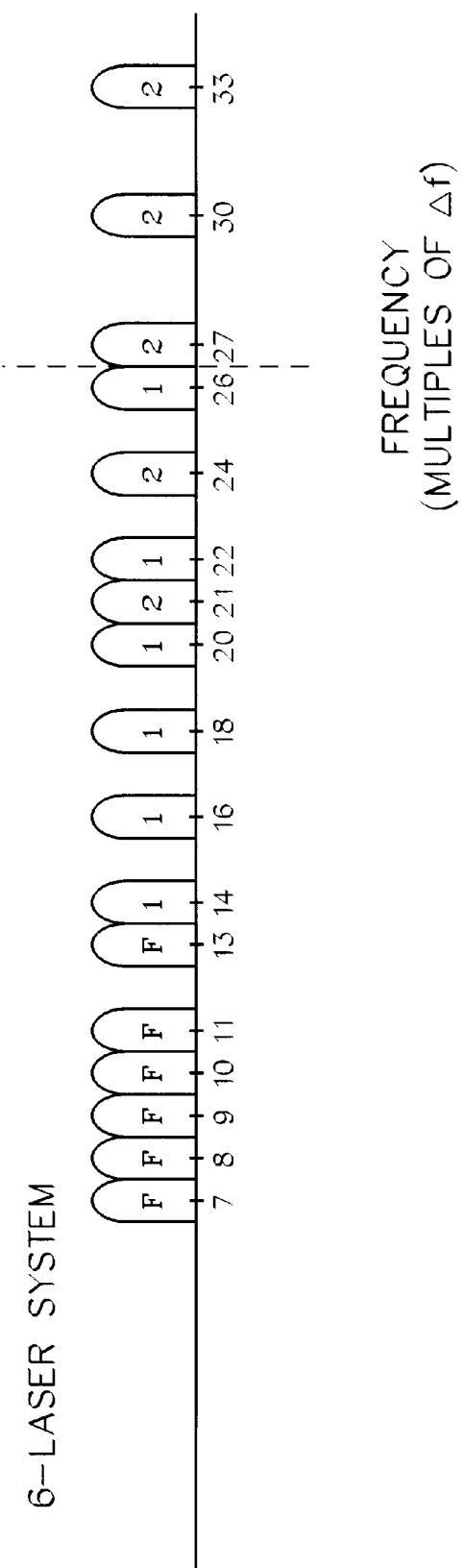
FIG. 13 illustrates frequency components for a multiplexed signal resulting from six light sources in accordance with an embodiment of the present invention, wherein the modulation frequencies are evenly spaced beginning at $7\Delta f$, except for skipping a modulation frequency at $12\Delta f$.

FIGS. 12 and 13 illustrate two embodiments that utilize a 2Δf gap in an otherwise equally spaced (at Δf intervals) set of fundamental frequencies.

FIG. 12 shows a five-light-source embodiment with fundamental frequencies ranging from 6Δf to 11Δf, skipping an intermediate position at 9Δf. This selection of fundamental frequencies allows the first harmonic set to shift down near the fundamental set. It also allows the second harmonic set to substantially overlap the first harmonic set. The second harmonic components are interleaved, however, so as not to interfere with any of the first harmonic components.

Comparison of FIGS. 10A and 12 indicates that this five-light-source embodiment reduces the lowest fundamental frequency from 9Δf to 6Δf relative to the best non-overlapping approach, while the highest first harmonic frequency is lowered from 26Δf, to 22Δf.

The embodiment illustrated in FIG. 12 may be generalized to any multiplexed system utilizing five or more light sources. For an N-light-source system, where $N \geq 5$, an embodiment includes equally spaced fundamental frequencies starting at $f_1=(2N-4)\Delta f$, except for skipping the frequency at $3(N-2)\Delta f$. This gives the following modulation frequencies: $f_1=(2N-4)\Delta f$; $f_{N-1}=f_{N-2}+2\Delta f$, $f_N=(3N-4)\Delta f$, and, for $1 < n < N-1$, $f_n = f_{n-1} + \Delta f$.

This class of embodiments results in a highest first harmonic frequency at $2f_N=(6N-8)\Delta f$ TABLE II illustrates the selection of modulation frequencies associated with this embodiment for N ranging from 5 to 11.

TABLE II

| N | Modulation Frequencies (multiples of Δf) |
|---|---|
| 5 | 6, 7, 8, 10, 11 |
| 6 | 8, 9, 10, 11, 13, 14 |
| 7 | 10, 11, 12, 13, 14, 16, 17 |
| 8 | 12, 13, 14, 15, 16, 17, 19, 20 |

TABLE II-continued

| N | Modulation Frequencies (multiples of $\Delta f$) |
|---|---|
| 9 | 14, 15, 16, 17, 18, 19, 20, 22, 23 |
| 10 | 16, 17, 18, 19, 20, 21, 22, 23, 25, 26 |
| 11 | 18, 19, 20, 21, 22, 23, 24, 25, 26, 28, 29 |

FIG. 13 shows a six-light-source embodiment with fundamental frequencies ranging from $7\Delta f$ to $13\Delta f$, skipping an intermediate position at $12\Delta f$. This selection of fundamental frequencies allows the first harmonic set to shift down until it abuts up against the fumdamental set. The second harmonic components substantially overlap the first harmonic components, but are interleaved so as not to interfere with any of the information carrying components.

Comparison of FIGS. 10B and 13 indicates that this six-light-source embodiment reduces the lowest fundamental frequency from $11\Delta f$ to $7\Delta f$ relative to the best non-overlapping approach, while the highest first harmonic frequency is lowered from $32\Delta f$ to $26\Delta f$.

The embodiment illustrated in FIG. 13 may be generalized to any multiplexed system utilizing four light sources or six or more light sources. For an N-light-source system, where $N \geq 4$, $N \neq 5$, an embodiment includes equally spaced fundamental frequencies starting at $f_1 = (2N-5)\Delta f$, except for skipping the position at $3(N-2)\Delta f$. This gives the following modulation frequencies: $f_1 = (2N-5)\Delta f$; $f_N = f_{N-1} + 2\Delta f$, and, for $1 < n < N$, $f_n = f_{n-1} + \Delta f$.

This class of embodiments results in a highest first harmonic frequency at $2f_N = (6N-10)\Delta f$. TABLE III illustrates the selection of modulation frequencies associated with this embodiment for N ranging from 4 to 11.

TABLE III

| N | Modulation Frequencies (multiples of $\Delta f$) |
|---|---|
| 4 | 3, 4, 5, 7 |
| 6 | 7, 8, 9, 10, 11, 13 |
| 7 | 9, 10, 11, 12, 13, 14, 16 |
| 8 | 11, 12, 13, 14, 15, 16, 17, 19 |
| 9 | 13, 14, 15, 16, 17, 18, 19, 20, 22 |
| 10 | 15, 16, 17, 18, 19, 20, 21, 22, 23, 25 |
| 11 | 17, 18, 19, 20, 21, 22, 23, 24, 25, 26, 28 |

FIGS. 14A and 14B illustrate a six-light-source embodiment that utilizes two gaps of unequal size. The embodiment uses fundamental frequencies, shown isolated in FIG. 14A for clarity, at $\Delta f$ multiples of $5\frac{2}{3}$, 7, 8, 9, 10, and $12\frac{1}{2}$. As shown in FIG. 14B, this embodiment results in an overlap between the fumdamental and first harmonic sets, with the lowest first harmonic frequency (at $11\frac{1}{3}\Delta f$) interleaved between the two highest fundamental frequencies (at $10\Delta f$ and $12\frac{1}{2}\Delta f$). The third harmonic set joins the second harmonic set in overlapping the first harmonic set. As required, the interleaving of the higher harmonics avoids interfering with any of the information carrying components.

FIGS. 15A and 15B illustrate a six-light-source embodiment that utilizes three gaps. This embodiment uses fundamental frequencies, shown isolated in FIG. 15A for clarity, at $\Delta f$ multiples of 3, 4, 5, 7, 11, and 13. As shown in FIG. 15B, this embodiment results in the first, second and third harmonic sets all overlapping the fundamental set. The first harmonic set is overlapped by higher harmonics extending out to the seventh harmonic set. Although FIG. 15B indicates that there is substantial overlapping between different signal components (depicted by the bands on top of other bands), none of the overlapping interferes with the information carrying components.

The embodiment illustrated in FIGS. 15A and 15B may be generalized to any multiplexed system utilizing four or more light sources. For an N-light-source system, where $N \geq 4$, an embodiment includes fundamental frequencies at multiples of $\Delta f$ equaling 3 and 4, followed by the next N−2 consecutive prime numbers beginning at 5. Thus, the modulation frequencies may be written as: $f_1 = 3\Delta f$; $f_2 = 4\Delta f$; and, for $2 < n \leq N$, $f_n = X_n \Delta f$, where $X_n$ is the (n-2)th consecutive prime number starting at 5. TABLE IV illustrates the selection of modulation frequencies associated with this embodiment for different values of N.

TABLE IV

| N | Modulation Frequencies (multiples of $\Delta f$) |
|---|---|
| 4 | 3, 4, 5, 7 |
| 5 | 3, 4, 5, 7, 11 |
| 6 | 3, 4, 5, 7, 11, 13 |
| 7 | 3, 4, 5, 7, 11, 13, 17 |
| 8 | 3, 4, 5, 7, 11, 13, 17, 19 |
| 9 | 3, 4, 5, 7, 11, 13, 17, 19, 23 |
| 10 | 3, 4, 5, 7, 11, 13, 17, 19, 23, 29 |

Although the embodiments illustrated above usually present the modulation frequencies as integer values of the minimum spacing parameter, $\Delta f$, it will be recognized by one skilled in the art that the invention could be practiced by choosing frequencies varying slightly from these integer values. The amount of variation allowed depends upon the relative sizes of the component bandwidths and $\Delta f$. Furthermore, FIGS. 10A through 15B depict systems with component bandwidths exactly equal to $\Delta f$. This aspect of the figures is stylistic. The embodiments presented above include systems for which the component bandwidths are narrower than $\Delta f$.

High Pressure, High Temperature Hydrophone

In preferred embodiments of the present invention, the hydrophone sensor array operates at pressures of at least 5,000 psi and at temperatures of at least 130° C. More preferably, the hydrophone sensor array operates at pressures of at least 5,000 psi and at temperatures of at least 150° C. Most preferably, the hydrophone sensor array operates at pressures of at least 5,000 psi and at temperatures of at least 180° C.

In particularly preferred embodiments of the present invention, the hydrophone sensor array operates at pressures of at least 8,000 psi and at temperatures of at least 110° C. More preferably, the hydrophone sensor array operates at pressures of at least 8,000 psi and at temperatures of at least 150° C. Most preferably, the hydrophone sensor array operates at pressures of at least 8,000 psi and at temperatures of at least 180° C.

The small outer diameter of the hydrophone sensor array of the present invention is particularly advantageous. In preferred embodiments of the present invention, the outside diameter of the sensor array is no more than 1.5 inches. In particularly preferred embodiments, the outside diameter of the sensor array is no more than approximately 1.375 inches. In other preferred embodiments, the outside diameter of the sensor array is between approximately 1.375 inches and approximately 1.5 inches. In still other preferred embodiments, the outside diameter of the sensor array is no more than approximately 1.0 inch. The small outside diameter of the sensor array allows the hydrophone to be inserted into the downhole casing of a well without removing the production tubing. The sensor array may also be inserted into a length of production tubing.

The outside diameter of the hydrophone sensor array of the present invention is substantially uniform (±0.020 inch) over the length of the array. The uniform outside diameter permits the array to be inserted into a conventional grease injection head of an oil well under pressure so that pressure control of the oil well may be maintained. The outer covering of the array fits snugly in the injection head and is lubricated by grease under pressure so that the array may be lowered into the well without releasing the pressure in the well. One skilled in the art will appreciate that a stacked fitting is advantageously applied to the wellhead to accommodate the smaller uniform outside diameter of the downlead cable.

Figure 16:
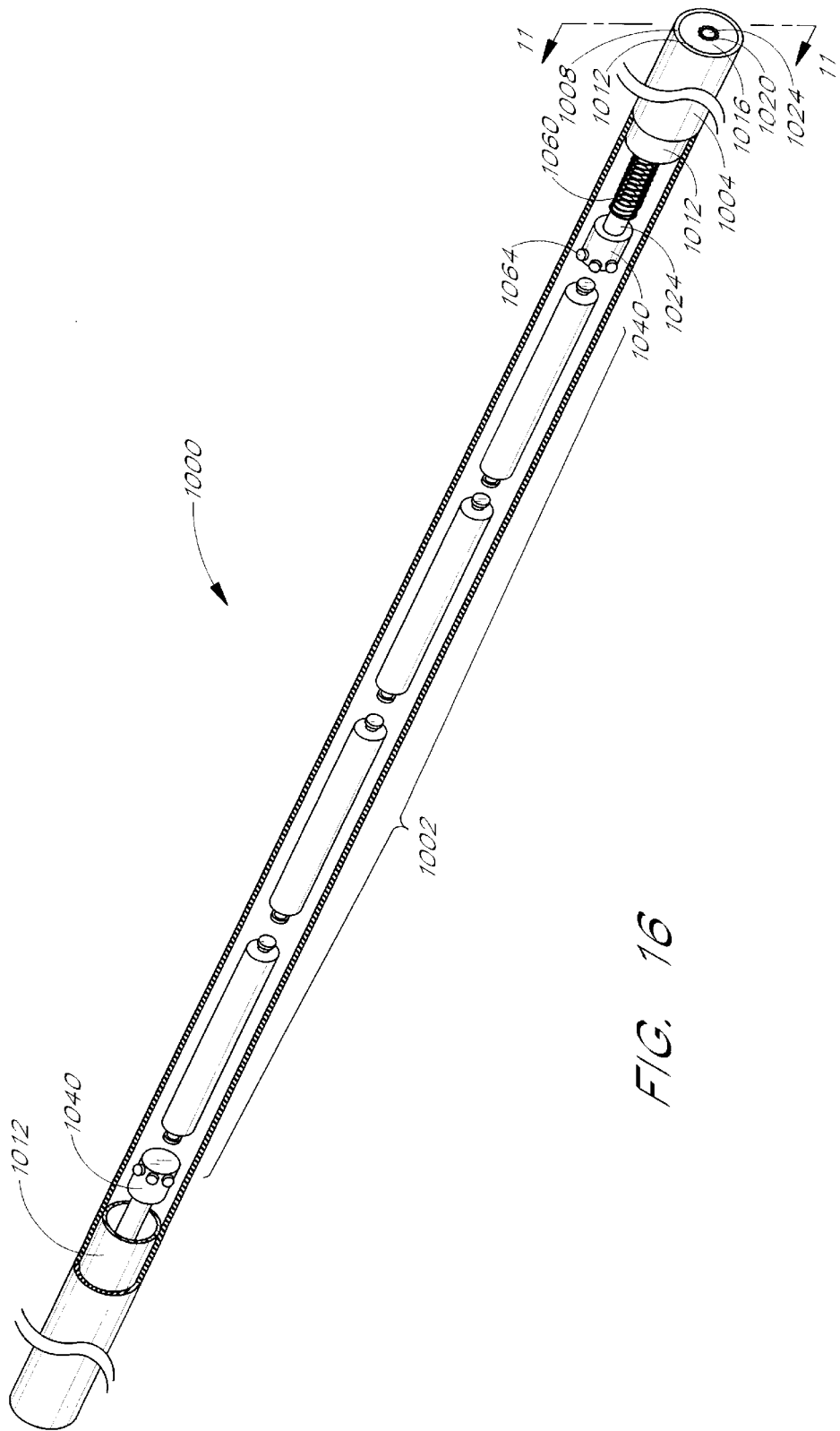
FIG. 16 illustrates a cutaway view of a hydrophone embodiment that resides within a cable.
Figure 17:
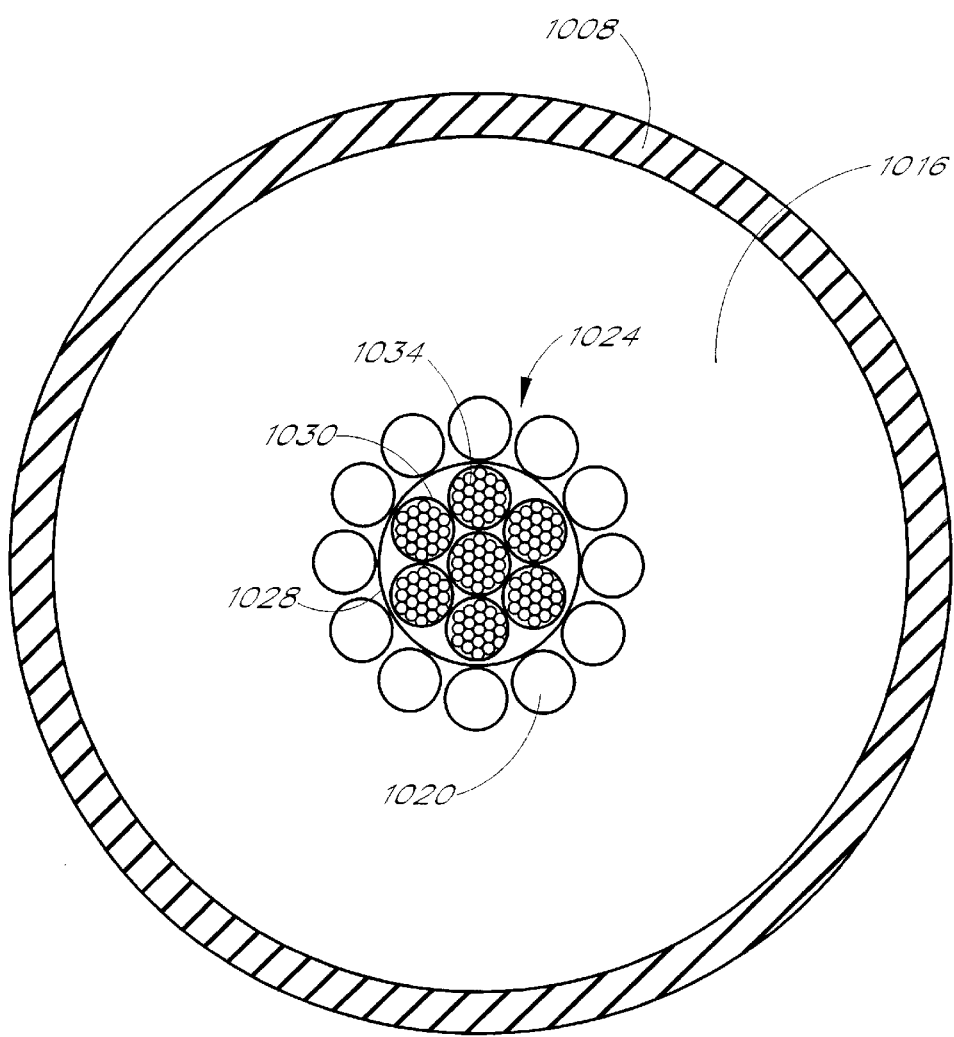
FIG. 17 illustrates a cross sectional view of the cable of FIG. 16 at a location away from the hydrophone.

The general layout of a preferred hydrophone embodiment 1000 is shown in FIG. 16, which is capable of operating under extreme conditions such as temperatures of up to about 220° C. and pressures of 10,000 or even 15,000–20,000 pounds per square inch (psi). The hydrophone may also operate satisfactorily under less extreme conditions such as temperatures of at least 150° C. and pressures of 8000 psi, or temperatures of at least 130° C. and pressures of at least 6000 psi. Sensors 1002 are inserted at periodic intervals along a 1.0 inch to 1.5 inch diameter (e.g., 1.25 inch diameter) cable 1004, with one such sensor 1002 being shown in FIG. 16. Alternatively, the cable 1004 may have a diameter between 0.9 inch and 2.0 inches. In one preferred embodiment, the sensors are spaced almost exactly 5 feet from each other, within a tolerance of ¼ inch. The cable 1004 includes an outer sheath 1008 which surrounds a filler member 1012 that extends around the sensors 1002. In the portions of the cable 1004 away from the sensors 1002, the outer sheath 1008 surrounds a core member 1016 which surrounds a plurality of tubular strands 1020 disposed around a central strength member 1024. These relationships are seen more clearly in the cross sectional view of the cable 1004 shown in FIG. 17.

The central strength member 1024 is located along the center of the cable 1004 and provides strength to the cable 1004 except at those locations where the sensors 1002 are located. The strength member 1024 includes a plastic sheath 1028 that surrounds 6–8 bundles 1030, with each bundle having 15–20 steel strands 1034 of a diameter of approximately 0.015 inch. The overall diameter of the strength member 1024 may be 7/32 inch. The tubular strands 1020 may be, for example, 0.084 inch diameter Hytrel™ 5556, Hytrel™ 7246, or Hytrel™ 8238 from DuPont (which have melting points and Vicat softening points of 203° C., 180° C.; 218° C., 207° C.; and 223° C., 212° C. respectively). The tubular strands 1020 surround conductors or optical fibers, or the tubular strands may just be empty (filler strands) to lend structural integrity to the hydrophone 1000. In one particular embodiment, twelve tubular strands 1020 are used, in which two strands carry copper conductors, four strands each carry six optical fibers, and the six remaining strands are filler strands. Such an embodiment is suitable for use in a 6×16 array in which two optical fibers are designated as spares. The copper conductors may be used to provide electrical power to a device at the distal end of the cable 1004, e.g., a gamma tool for sensing purposes.

The core member 1016 extends along the length of the cable 1004 except in and around the sensors 1002. The core member 1016 may advantageously be Furon (0611-950 from Furon Company). In the area of each sensor 1002, the filler member 1012 is advantageously polyurethane (e.g., PRC 1547 from Courtaulds Aerospace) which extends out to a diameter of 1.0 inch to hold together the components making up the sensors 1002. As such, the filler member 1012 is formed around the sensors 1002 after the sensors have been positioned within the cable 1004. The outer sheath 1008 may be 0.1 inch thick Hytrel™ 5556, Hytrel™ 7246, or Hytrel™ 8238 and extends along the entire length of the cable 1004. (A high temperature, Teflon-based material such as Tefzel may be substituted for the Hytrel™ materials herein.) The outer sheath 1008, the filler member 1012, and the core member 1016 function as protective layers to protect the hydrophone 1000 (including its reference mandrel and its sensing mandrel, discussed below) from a corrosive environment. The outside diameter of the hydrophone 1000 is preferably less than approximately 1.5 inches, and more preferably is less than approximately 1 inch.

As seen in FIG. 16, the strength member 1024 is joined to a flange 1040 which transfers axial load from the strength member 1024 to a stress relief mechanism such as a plurality of stress relief wires 1050 (discussed below in connection with FIG. 18) and then to a second flange 1040. In this manner, the hydrophone 1000 (and in particular, the reference mandrel, the sensing mandrel, the reference fiber, and the sensing fiber, which are discussed below) are substantially isolated from the axial load. The strength member 1024 is advantageously surrounded by a spring 1060 near that point where the strength member 1024 is joined to the flange 1040 by a conventional high-pressure swaging process. The tubular strands 1020 also advantageously pass through the spring 1060, although the strands 1020 are not shown in this portion of FIG. 16 for the sake of clarity.

Figure 18:
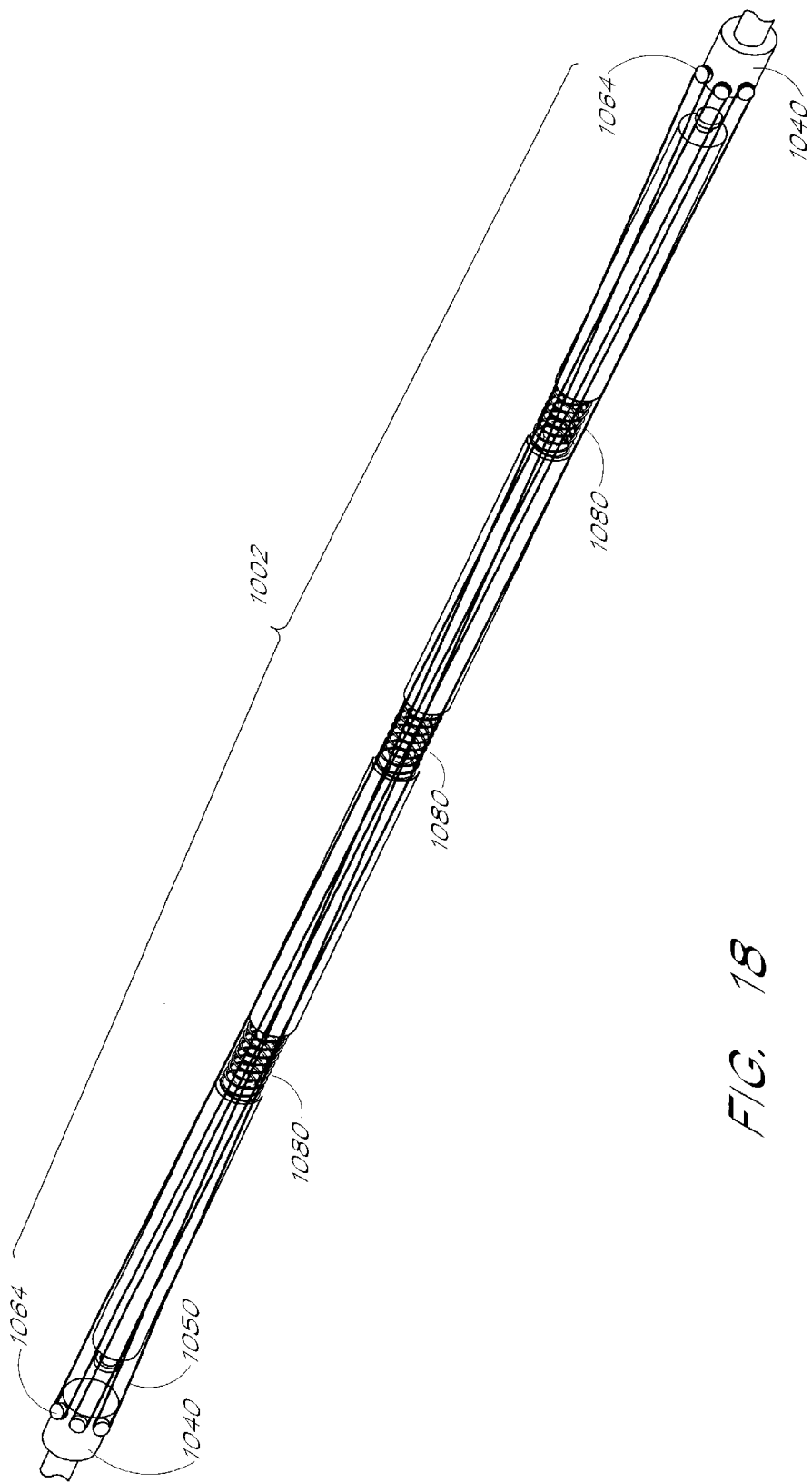
FIG. 18 illustrates mechanical support features used around the hydrophone's sensor to protect it from breakage that might otherwise occur during bending of the cable.

As seen in FIG. 18, the flanges 1040 are located near respective ends of the hydrophone 1000. The flanges 1040 may include a plurality of raised areas 1064 around which the stress relief wires 1050 are wrapped and between which there are grooves (not shown in FIG. 18) that receive the tubular strands 1020. A plurality of 1-inch long spring members 1080 (discussed below) support the stress relief wires 1050. The stress relief wires 1050 advantageously cross over each other as shown in FIG. 18 to form a "cage" that prevents the cable 1004 from being twisted excessively, which could damage the sensors 1002. The stress relief wires 1050 preferably wrap at least ⅔ of the way around the sensor 1002 in the radial sense as they extend from one flange 1040 to the other flange. With this arrangement, the stress relief wires 1050 cross over each other between the spring members 1080 rather than on top of the spring members 1080. The flanges 1040 themselves preferably have no sharp edges or features, in order to reduce the risk of damage to the tubular strands 1020, or to the conductors or optical fibers therein. For the same reason, the stress relief wires 1050 may be Teflon coated. The hydrophone 1000 is advantageously constructed to be flexible enough that it can be bent to a radius of curvature of less than approximately four feet.

Figure 19:
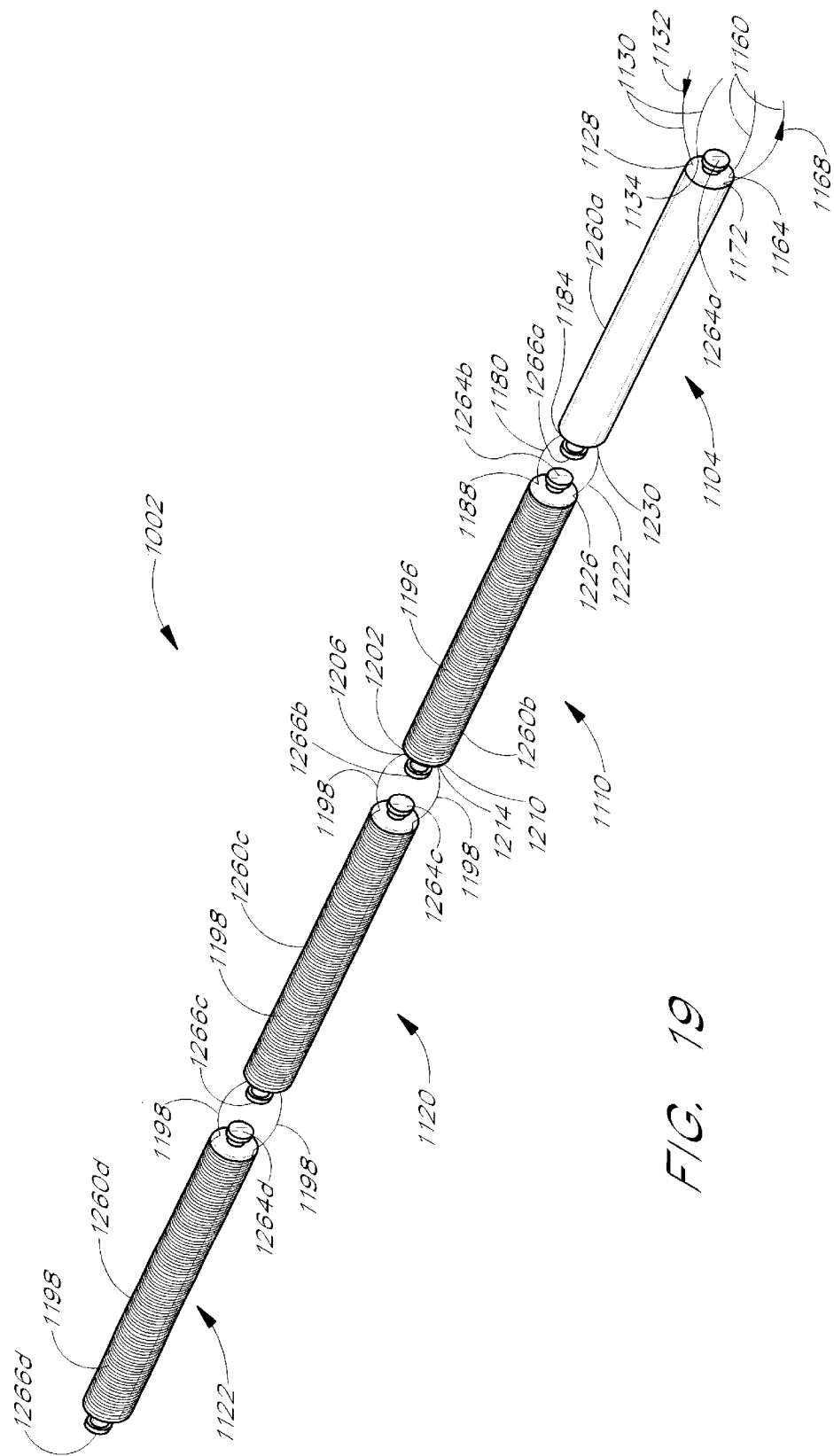
FIG. 19 illustrates an expanded view of the sensor showing a telemetry can, a reference mandrel, and two sensing mandrels, as well as the optical fibers that link them.

As illustrated in FIG. 19, the sensor 1002 includes a telemetry can 1104, a reference mandrel 1110, and at least one, but preferably two, sensing mandrels 1120, 1122, all of which are aligned end-to-end (coaxially) to reduce the profile of the cable 1004. This is to be contrasted with the common prior art configuration of placing the reference mandrel within the sensing mandrel. Using two sensing mandrels 1120, 1122 instead of just one may result in improved sensitivity, since all other things being equal, using two sensing mandrels permits more sensing fiber to be used. The telemetry can 1104 has a hole 1128 therein for receiving a distribution fiber (bus) 1130 that carries an input optical signal 1132 generated by an optical source. Together, the sensors 1002 along the cable 1004 may advantageously form a sensor array such as the 6×16 optical array described in the U.S. patent application Ser. No. 09/107,399 entitled "Architecture for large optical fiber array using standard 1×2 couplers," filed Jun. 30, 1999, which is hereby incorporated by reference herein. The distribution fiber 1130 is spliced to an input telemetry coupler 1150 (see FIG. 20A), which is advantageously located within the telemetry can 1104. A second hole 1134 in the telemetry can 1104 permits passage of the distribution fiber 1130 out of the telemetry can 1104 after a portion of the input optical signal has been tapped off by the coupler 1150. When the sensor 1002 forms part of an array, the distribution fiber 1130 may be advantageously coupled to other sensors at further locations along the array cable 1004.

The telemetry can 1104 likewise houses an output telemetry coupler 1154 coupled to a return fiber (bus) 1160. The return fiber 1160 enters the telemetry can 1104 through a third hole 1164. As the return fiber 1160 enters the telemetry can 1104, the fiber 1160 already carries output optical signals from sensors located distal of the sensor 1002, unless the sensor 1002 is the most distal sensor on a return fiber. A perturbed, output optical signal 1168 from the sensor 1002 is coupled by the output telemetry coupler 1154 onto the return fiber 1160. The return fiber 1160 then passes through a fourth hole 1172 in the telemetry can 1104 and may be coupled to other sensors along the cable 1004 before being directed towards signal processing electronics.

Figure 20A:
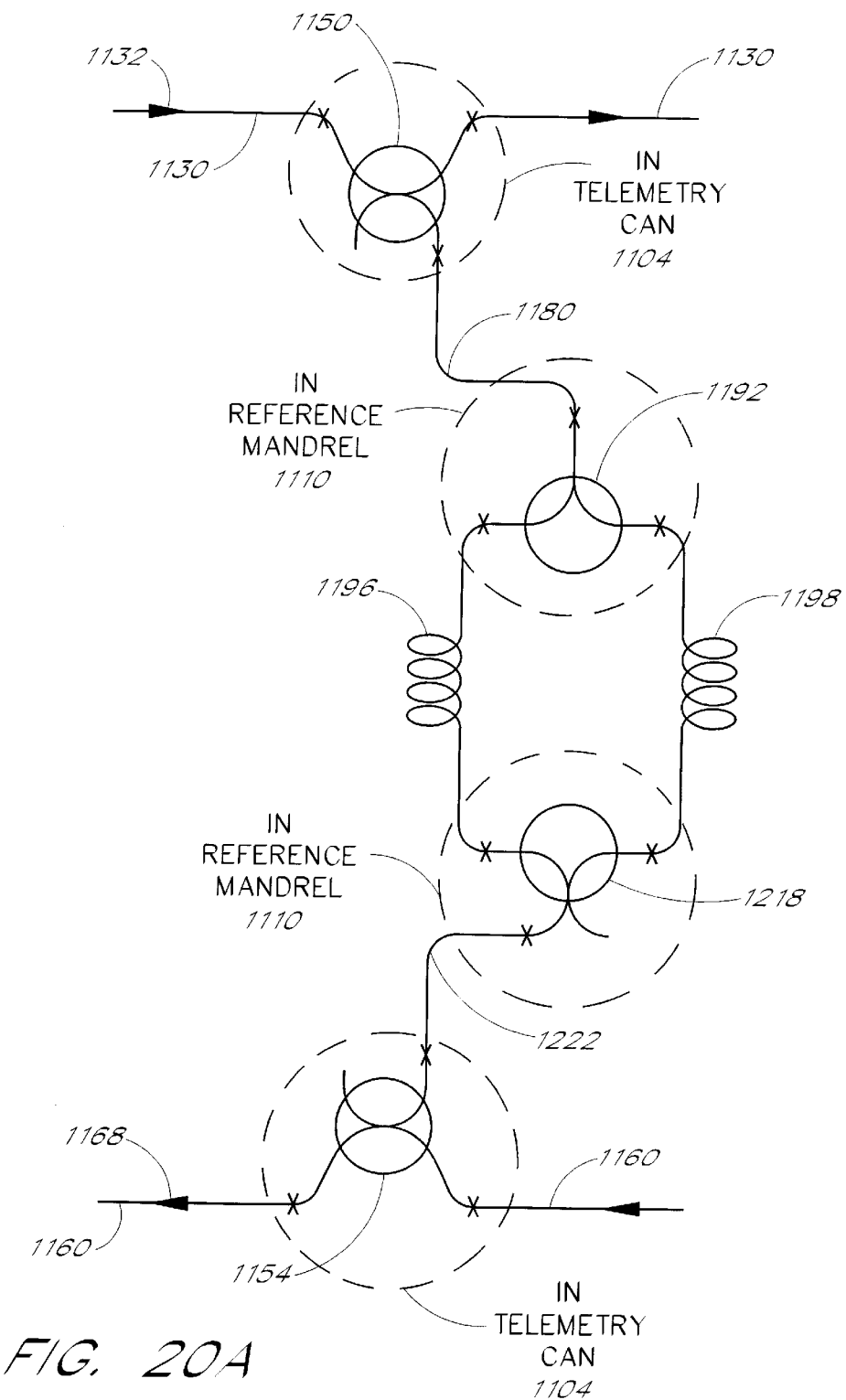
FIGS. 20A, 20B, and 20C, illustrates schematic diagrams of the optical fiber routing within the sensor.

The optical architecture related to the reference mandrel 1110 and sensing mandrels 1120, 1122 is now described. The input optical signal tapped off by the input telemetry coupler 1150 is directed along an input optical fiber 1180 that passes through a hole 1184 in the telemetry can 1104 and a hole 1188 in the reference mandrel 1110. As shown in FIG. 20A, the input optical fiber 1180 is joined to an input hydrophone coupler 1192. The input hydrophone coupler 1192 is located within the reference mandrel 1110 and directs a fraction of the input optical signal onto a reference fiber 1196. Another fraction of the input optical signal is directed onto a sensing fiber 1198.

The reference fiber 1196 and the sensing fiber 1198 act as a reference arm and a sensing arm of an interferometer, respectively, which in FIG. 20A is illustrated as being a Mach-Zehnder interferometer. The reference fiber 1196 exits a hole 1202 in the reference mandrel 1110 and forms 8 "layers" around the reference manual (i.e., the reference fiber is wrapped 8 times in a close packed fashion around the reference mandrel 1110 such that each loop of the reference fiber on the mandrel is in contact with an adjacent loop of the reference fiber) before reentering the reference mandrel 1110 through another hole 1206. The sensing fiber 1198 passes out of a hole 1210 in the reference mandrel 1110 and forms one layer around the sensing mandrel 1120 before being directed to the sensing mandrel 1122, where the sensing fiber forms 4 layers. The sensing fiber 1198 is then directed back onto the sensing mandrel 1120 where the sensing fiber forms 3 additional layers, so that the sensing fiber forms a total of 4 layers on the sensing mandrel 1120. At this point, the sensing fiber 1198 enters a hole 1214 in the reference mandrel 1110. The reference fiber 1196 and the sensing fiber 1198 are spliced to an output hydrophone coupler 1218 (see FIG. 20A) located within the reference mandrel 1110. Light propagating to the coupler 1218 from the two arms interferes at the coupler 1218. Specifically, the output hydrophone coupler 1218 receives an optical signal from the reference arm (reference fiber 1196) and an optical signal from the sensing arm (sensing fiber 1198), and produces an output optical signal which is directed onto an output optical fiber 1222. The output optical fiber 1222 passes out of a hole 1226 in the reference mandrel 1110 and into a hole 1230 in the telemetry can 1104. The output optical fiber 1222 carries the perturbed, optical output signal and is spliced to the output telemetry coupler 1154 as described above.

The sensing fiber 1198 is wound in tension around the sensing mandrels 1120, 1122. The sensing mandrels 1120, 1122 deform (expand and contract) in response to acoustic signals, such that the tension in the sensing fiber 1198 that surrounds the sensing mandrels is modified, thus changing the overall length of the sensing fiber 1198. The length of the sensing fiber 1198 and thus the optical path length for optical radiation passing through the sensing fiber 1198 is altered, which in turn affects the phase difference between the optical radiation propagating in the reference fiber 1196 and the optical radiation propagating in the sensing fiber 1198. In this way, the sensor 1002 acts as a Mach-Zehnder interferometer that records variations in acoustic pressure. Although a preferred sensor architecture has been described with respect to 8 layers of fiber around the reference mandrel 1110 and 4 layers of fiber around each of the sensing mandrels 1120 and 1122, utilizing a different number of layers is possible. Increasing the number of layers and sensing mandrels leads to greater sensitivity, but also increases the cost. The sensor 1002 herein advantageously has a high scale factor of −140 dB relative to radians/micropascal.

Figure 20B:
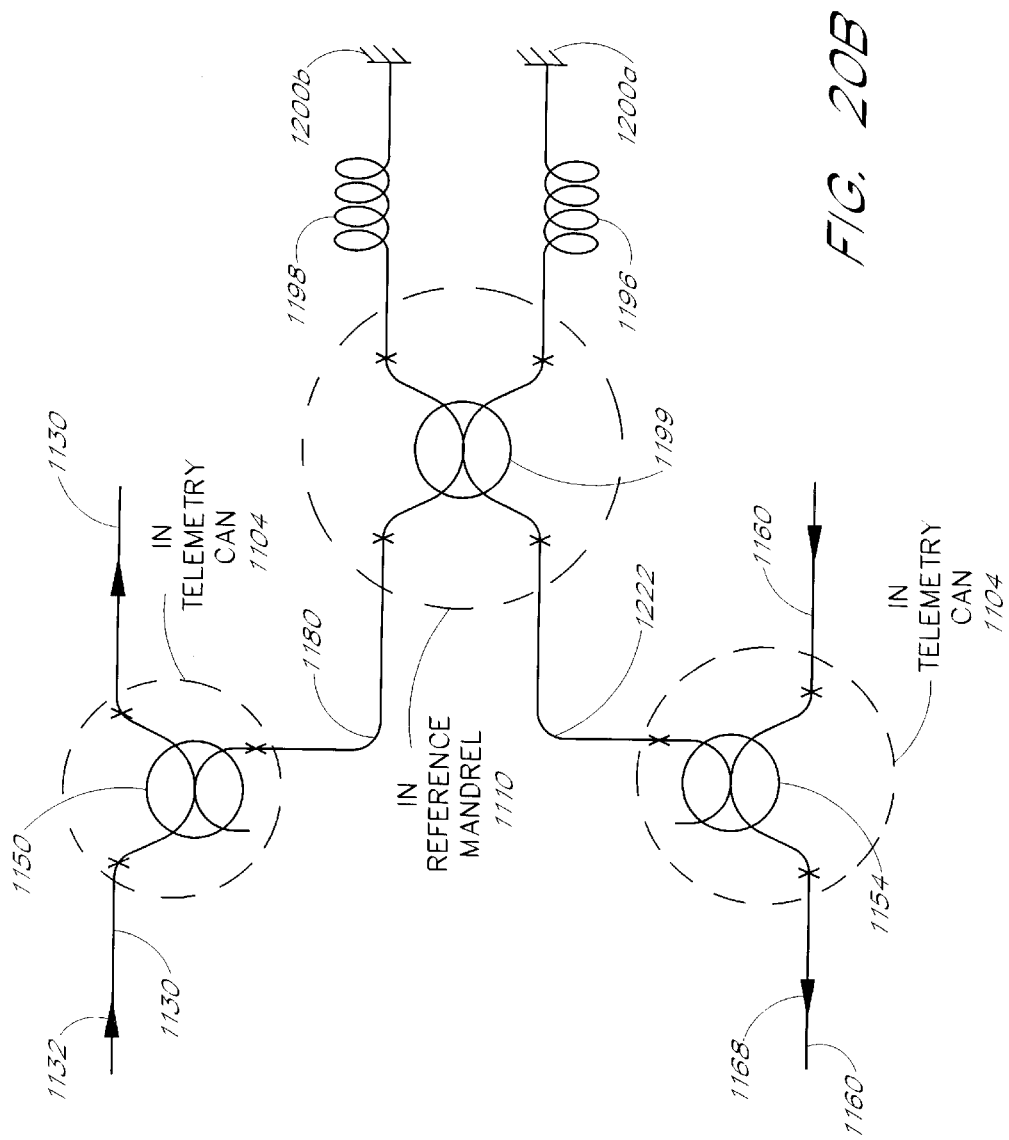

A different interferometer configuration, e.g., Michelson or Fabry-Perot is also possible. FIG. 20B illustrates an alternative configuration, which functions as a Michelson interferometer. The input hydrophone coupler 1192 and the output hydrophone coupler 1218 are replaced by a single hydrophone coupler 1199 which performs both functions. At the end of the reference fiber 1196 and at the end of the sensing fiber 1198 are placed respective reflectors 1200a and 1200b, thereby permitting optical interference in the hydrophone coupler 1199. The hydrophone coupler 1199 of this Michelson configuration is advantageously placed within the reference mandrel 1110.

Figure 20C:
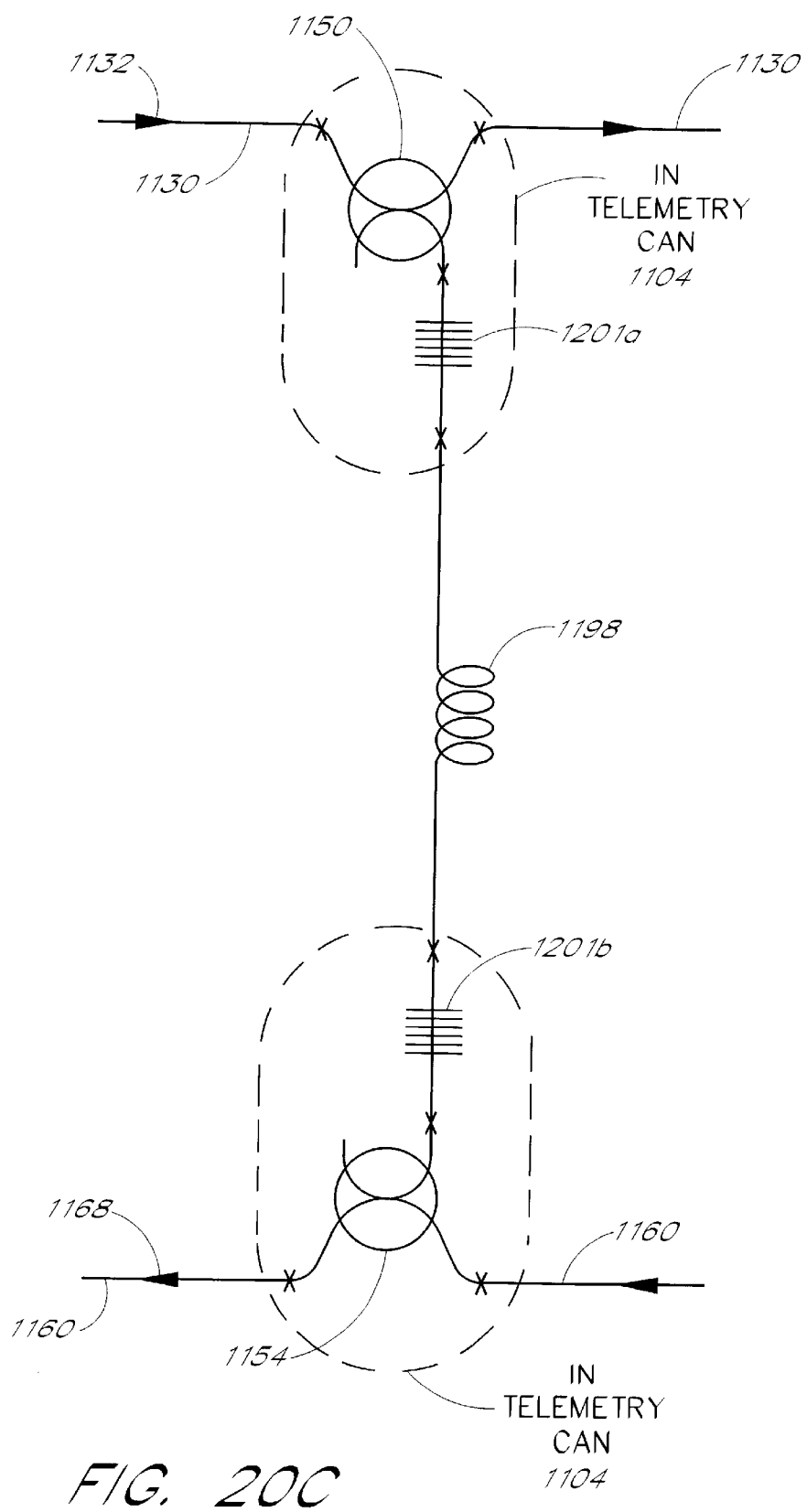

FIG. 20C illustrates yet another alternative configuration, which functions as a Fabry-Perot interferometer. In this design, there is no reference fiber 1196 or reference mandrel 1110. At the output side of the input telemetry coupler 1150 there is a partial reflector 1201a. Similarly, a partial reflector 1201b is at the input side of the output telemetry coupler 1154. The partial reflectors 1201a, 1201b form the Fabry-Perot interferometer and are preferably fiber Bragg gratings. In this configuration, the input telemetry coupler 1150, the output telemetry coupler 1154, and the partial reflectors 1201a, 1201b are advantageously housed within the telemetry can 1104.

Figure 21:
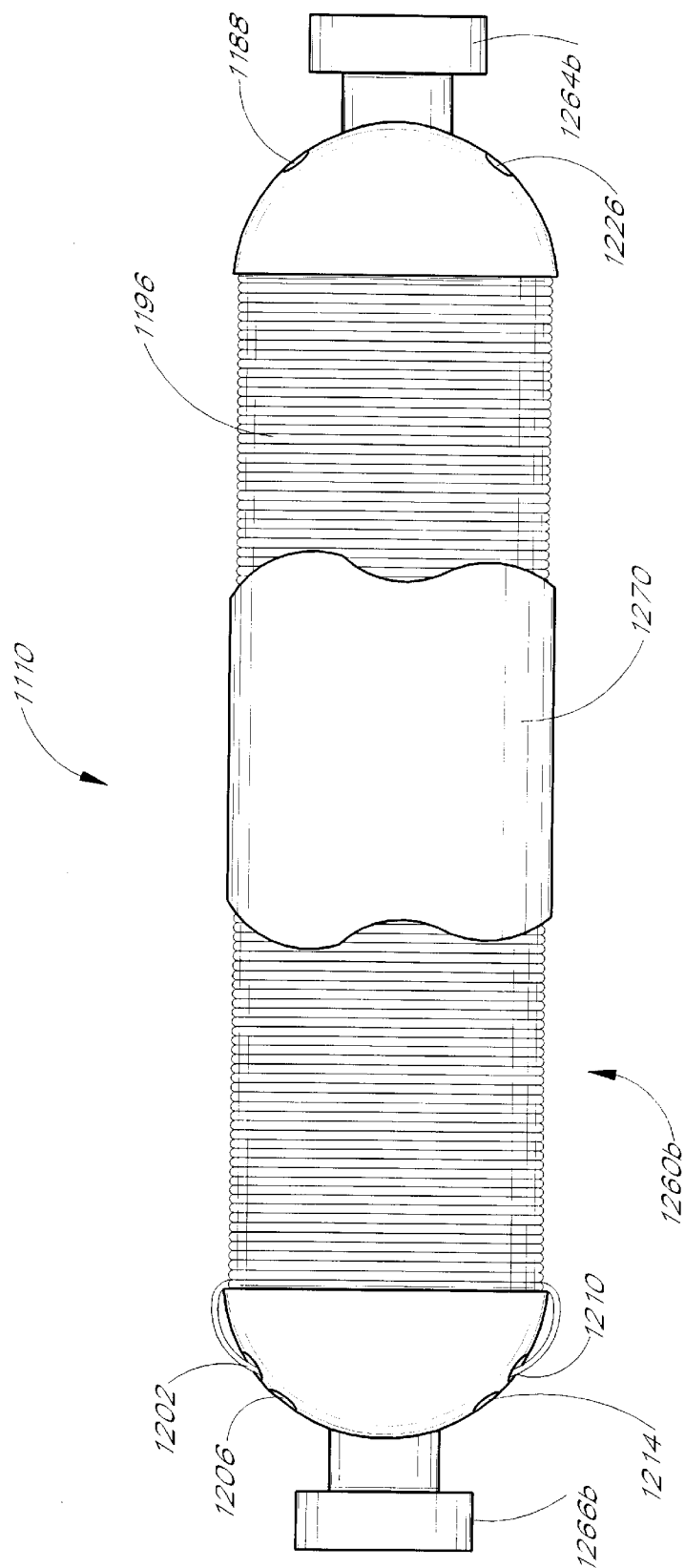
FIG. 21 illustrates a perspective view of the reference mandrel including its hemispherical endcaps.

The telemetry can 1104, the reference mandrel 1110, and the sensing mandrels 1120, 1122 preferably include respective main bodies 1260a, 1260b, 1260c, 1260d of length 3.9 inches and diameter of approximately 0.48 inch as well as respective pairs of endcaps 1264a, 1266a; 1264b, 1266b; 1264c, 1266c; 1264d, 1266d (discussed in more detail below), as illustrated in FIG. 19. FIG. 21 illustrates the reference mandrel 1110 in more detail. As indicated in FIG. 19, the various fibers enter and exit through holes located in the endcaps 1264a, 1266a; 1264b, 1266b. Fibers do not pass through any of the endcaps in the sensing mandrels 1120 and 1122. The endcaps 1264a, 1266a; 1264b, 1266b; 1264c, 1266c; 1264d, 1266d (discussed in more detail below) preferably have a convex-shaped, hemispherical contour to help withstand high pressure and advantageously have diameters which are slightly larger than the diameter of their respective main bodies 1260a, 1260b, 1260c, 1260d, so that the layers of fiber are confined to wrap around the main body. The telemetry can 1104 is preferably of metallic construction, such as steel, and preferably has metallic endcaps 1264a, 1266a.

The sensing mandrels 1120, 1122 are made of a high temperature material which, when it is subjected to high pressure, is stiff enough that the mandrels do not crack due to deformation. On the other hand, the mandrels 1120, 1122 are flexible enough that they bend (undergo strain) in response to acoustic pressure, without buckling under hydrostatic pressure. Further, this high temperature material has a stiffness that remains relatively stable at temperatures over 200° C. Two plastics that are high temperature polymers and that are suitable for this purpose are Torlon™ (specifically Torlon™ 5030) and Celazole™. Of the two, Celazole™ is preferred because it is stable up to higher temperatures, and because its slightly lower stiffness results in greater sensor sensitivity. Further, Celazole™ exhibits lower creep under hydrostatic loading. This latter feature is important in the context of interferometers, since changes as small as a few tenths of a percent in the length of the sensing fiber 1198 can significantly diminish the noise performance of the hydrophone sensor 1002. Both Torlon™ and Celazole™ are advantageous over the prior art materials, which include thin wall aluminum and polycarbonate. Polycarbonate, for example, is in general not suitable for work at temperatures above about 105° C. Torlon™ and Celazole™, however, are suitable for work at pressures of at least 10,000 or even 15,000–20,000 pounds per square inch and temperatures of at least 220° C.

The sensing mandrels 1120, 1122 are made of a high temperature material which, when it is subjected to high pressure, is stiff enough that the mandrels do not crack due to deformation. On the other hand, the mandrels 1120, 1122 are flexible enough that they bend (undergo strain) in response to acoustic pressure, without buckling under hydrostatic pressure. Further, this high temperature material has a stiffness that remains relatively stable at temperatures over 200° C. Two plastics that are suitable for this purpose are Torlon™ (specifically Torlon™ 5030) and Celazole™. Of the two, Celazole™ is preferred because it is stable up to higher temperatures, and because its slightly lower stiffness results in greater sensor sensitivity. Further, Celazole™ exhibits lower creep under hydrostatic loading. This latter feature is important in the context of interferometers, since changes as small as a few tenths of a percent in the length of the sensing fiber 1198 can significantly diminish the noise performance of the hydrophone sensor 1002. Both Torlon™ and Celazole™ are advantageous over the prior art materials, which include thin wall aluminum and polycarbonate. Polycarbonate, for example, is in general not suitable for work at temperatures above about 105° C. Torlon™ and Celazole™, however, are suitable for work at pressures of at least 10,000 or even 15,000–20,000 pounds per square inch and temperatures of at least 220° C.

Torlon™ 5030 is a polyamideimide and has a tensile strength of 24,000 psi, a tensile modulus of elasticity of 1,200,000 psi, an elongation of 4%, a flexural strength of 36,000 psi, a flexural modulus of elasticity of 1,000,000 psi, a compressive strength (10% deformation) of 38,000 psi, a compressive modulus of elasticity of 600,000 psi, all of which are measured at 73° F. Further, Torlon™ 5030 has a coefficient of linear expansion of $1.0 \times 10^{-5}$ in/in/° F., a heat deflection temperature at 264 psi of 539° F., and a maximum continuous service temperature in air of 500° F. (All values are approximate.)

Celazole™ PBI (polybenzimidazole) has a tensile strength of 23,000 psi, a tensile modulus of elasticity of 850,000 psi, an elongation of 3%, a flexural strength of 32,000 psi, a flexural modulus of elasticity of 950,000 psi, a compressive strength (10% deformation) of 50,000 psi, a compressive modulus of elasticity of 900,000 psi, all of which are measured at 73° F. Further, Celazole™ 5030 has a coefficient of linear expansion of $1.3 \times 10^{-5}$ in/in/° F., a heat deflection temperature at 264 psi of 800° F., and a maximum continuous service temperature in air of 750° F. (All values are approximate.)

The endcaps 1264a, 1266a; 1264b, 1266b; 1264c, 1266c; 1264d, 1266d are advantageously hemispherical so that the telemetry can 1104, the reference mandrel 1110, and the sensing mandrels 1120, 1122 flex more uniformly when subjected to pressure and can thereby withstand the higher pressures that may be encountered in the down hole applications disclosed herein, which may easily exceed 3000–4000 psi. This hemispherical design avoids stress being concentrated in small areas and is to be contrasted with the prior art design of cylindrical endcaps which can fail under hydrostatic pressure.

Figure 22:
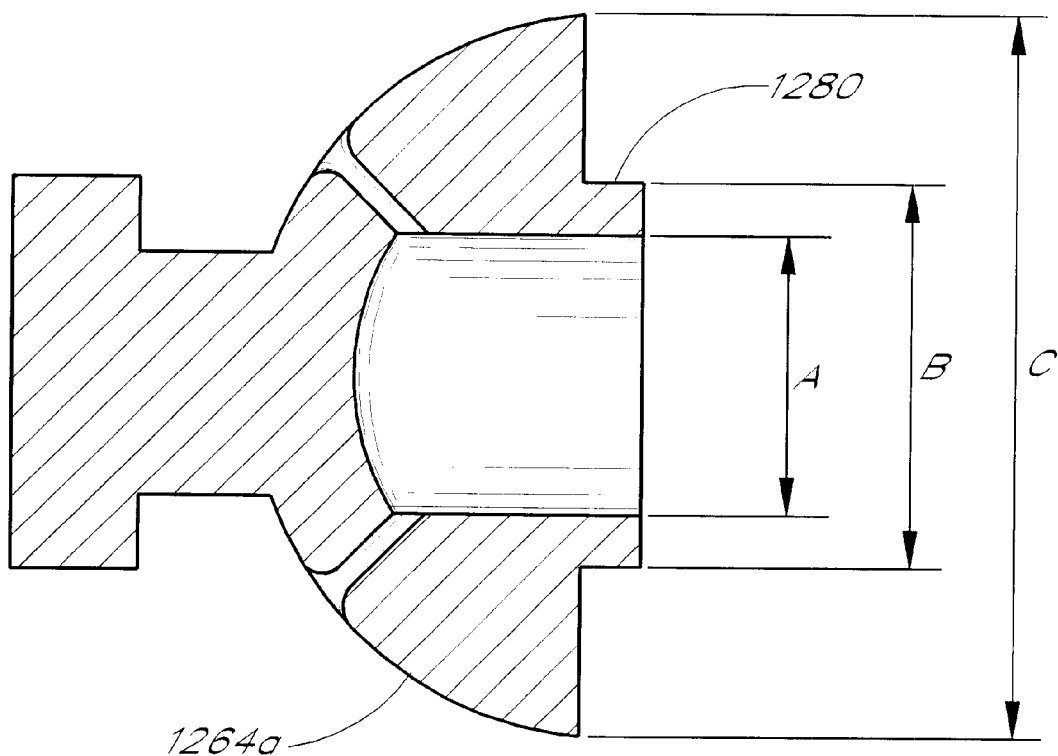
FIG. 22 illustrates a cross sectional view of a hemispherical endcap.

The endcaps 1264a, 1266a; 1264b, 1266b; 1264c, 1266c; 1264d, 1266d (shown in their assembled configuration in FIGS. 19 and 21) are advantageously all the same shape, which is illustrated by the cross sectional representation of a preferred endcap 1264a shown in FIG. 22. The outside diameter (O.D.) of the endcap 1264a (designated as "C" in FIG. 22) is advantageously approximately 0.477 inches. The endcap 1264a has a lip 1280 that has an O.D. of about 0.206 inches (designated as "B" in FIG. 22) and an I.D. of about 0.206 inches (designated as "A" in FIG. 22). The lips 1280 of the endcaps 1264a, 1264b, 1264c, 1264d are designed to slip within and mate with their respective main bodies 1260a, 1260b, 1260c, 1260d. Each of the endcaps 1264a, 1266a; 1264b, 1266b; 1264c, 1266c; 1264d, 1266d is preferably of the same material as its corresponding main body 1260a, 1260b, 1260c, 1260d. Thus, the endcaps 1264a, 1266a, 1264b, 1266b are preferably metallic. The endcaps 1264c, 1266c, 1264d, 1266d are preferably either Torlon™ or Celazole™ to match the construction of their respective main bodies 1260c and 1260d.

FIG. 19 shows that there are three pairs of oppositely facing endcaps: 1266a, 1264b; 1266b, 1264c; and 1266c, 1264d. Each of these pairs of endcaps is advantageously surrounded with a resilient, pliable material (not shown in FIGS. 16, 18, 19, 21, 22 for the sake of clarity) such as polyurethane (PRC 1547 is preferred) which forms a flexible interlink. For example, polyurethane forms a flexible interlink 1296 (see FIG. 23) that joins the endcap 1266a of the telemetry can 1104 to the endcap 1264b of the reference mandrel 1110. The interlink 1296 includes grooves 1300, 1304 therein for accepting the optical fibers 1180 and 1222. Likewise, another flexible interlink (not shown) joins the reference mandrel 1110 to the sensing mandrel 1120, and yet another flexible interlink (not shown) joins the sensing mandrels 1120, 1122 to each other. Each of these additional interlinks has grooves therein for accepting the sensing fiber 1198, thereby protecting the sensing fiber 1198 from damage.

In the case of the telemetry can 1104 and the reference mandrel 1110, the interlink grooves 1300, 1304 are aligned at both ends of the flexible interlink 1296 with a hole in an endcap, e.g., the groove 1300 may be used to route the input optical fiber 1180 from the hole 1184 in the telemetry can 1104 to the hole 1188 in the reference mandrel 1110. Similarly, the groove 1304 may be used to route the output optical fiber 1222 from the hole 1226 in the reference mandrel 1110 to the hole 1230 in the telemetry can 1104. (The endcaps 1264c, 1266c, 1264d of the sensing mandrels 1120, 1122 advantageously use grooves (not shown) rather than holes for receiving the sensing fiber 1198.) The interlink 1296 is thicker between the endcaps 1266a, 1264b than it is near the endcaps as a result of the hemispherical shapes of the endcaps, which helps reduce any localized stresses that might break the fibers 1180, 1222. Further, the grooves 1300 and 1304 are advantageously cut to different depths so that the fibers 1180 and 1222 lie in different planes, i.e., the fibers 1180 and 1222 cross over and are adjacent each other without "pinching" each other. Specifically, the respective depths of the two grooves 1300, 1304 may be selected to differ by at least the width of one of the fibers 1180, 1222. For example, the groove 1300 may be cut one fiber width deeper than groove 1304, with the input optical fiber 1180 (which carries the input optical signal) being laid down first during assembly. With the input optical fiber 1180 in place, the output optical fiber 1222 (which carries the perturbed, output optical signal) may then be placed down in the groove 1304 so that the output optical fiber 1222 crosses over the input optical fiber 1180.

The flexible interlinks, such as the interlink 1296, permit the cable 1004 to be bent and flexed in the normal course of operations, e.g., while the cable 1004 is being reeled in or out, without breakage or damage to any of the fibers. Likewise, the grooves 1300, 1304, as well as the grooves in the other interlinks (not shown), are multi-layered so that when the cable 1004 is bent, the fibers will not damage each other. The grooves 1300, 1304 allow the fibers 1180, 1222 to be routed with a well controlled pitch across a flexible portion of the hydrophone 1000, namely, the interlink 1296. The grooves 1300, 1304 also ensure that the fibers 1180, 1222 maintain this pitch while entering and exiting the interlink 1296. In one preferred embodiment, this pitch is approximately ⅓ inch, i.e., the fiber 1180 (1222, 1198) makes one complete revolution around the interlink 1296 for every ⅓ inch along the length of the interlink. The fiber 1180 (1222, 1198) preferably forms an angle of at least about 72 degrees with the axis of the cable 1004 (or hydrophone 1000) if the interlink 1296 has a diameter of 0.48 inch (or a smaller angle for a smaller diameter interlink, and a larger angle for a larger diameter interlink). Thus, the fiber 1180 (1222, 1198) preferably forms an angle $\theta$ with the longitudinal axis of the hydrophone 1000 such that $\cos \theta$ times the diameter of the hydrophone (or interlink 1296) is less than about 0.18. The interlinks 1296 may advantageously be 1 inch long, corresponding to 3 complete revolutions of the fiber 1180 (1222).

Figure 23:
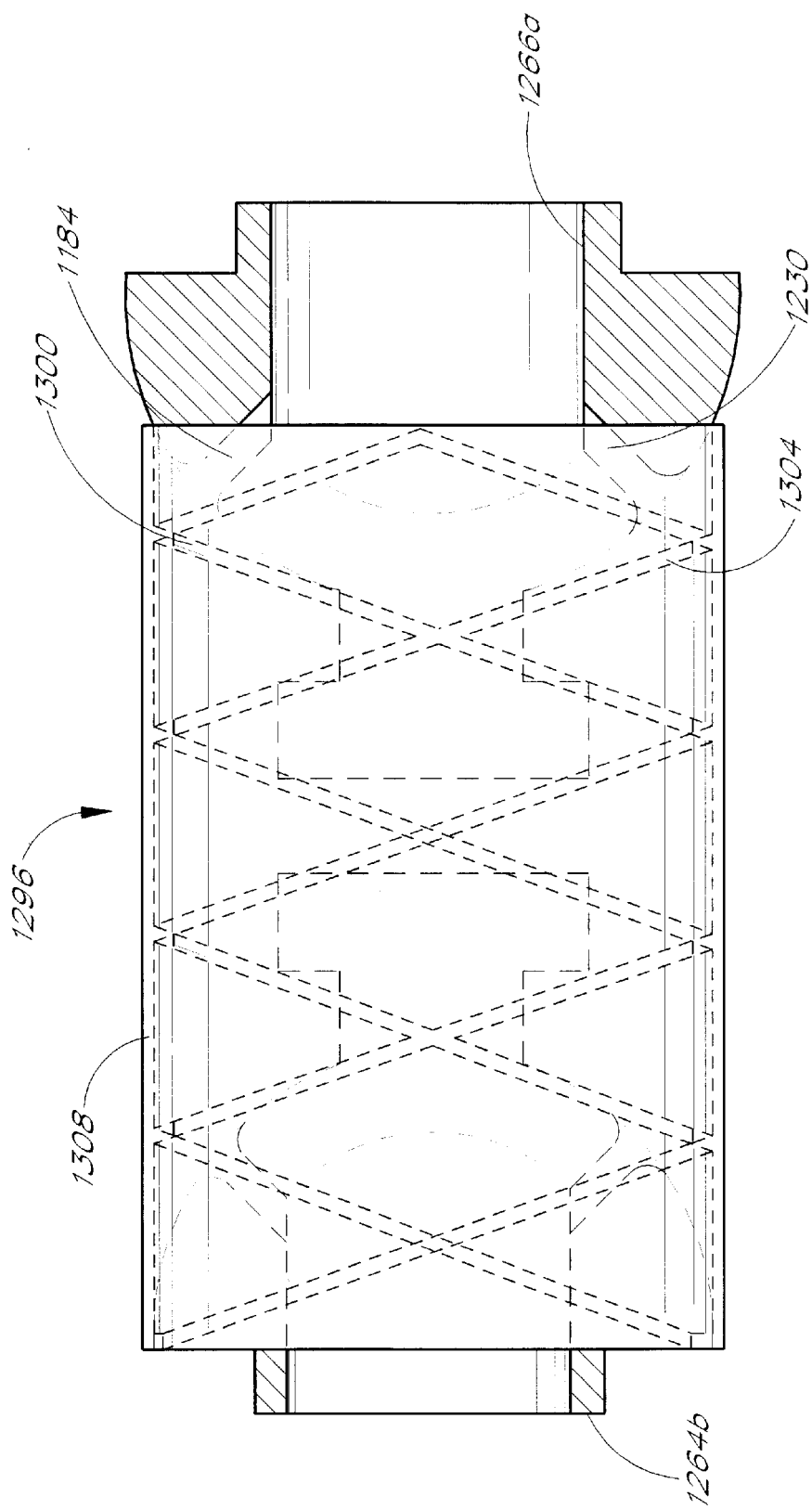
FIG. 23 illustrates a flexible interlink used to join two hemispherical endcaps.

The interlinks may be constructed by taking a pair of endcaps (e.g., 1266a, 1264b) and aligning them so that they are oppositely facing each other, in accordance with FIGS. 19 and 23. Short segments of wire (not shown) such as copper wires may then be inserted into each of the holes 1184, 1230 of the endcap 1266a and the holes 1188, 1226 of the endcap 1264b. With the wire segments in place, a mold (not shown) may be used to form polyurethane around the pair of oppositely facing endcaps 1266a, 1264b, during which time the wire segments keep polyurethane out of the holes 1184, 1230, 1188, 1226. The wire segments may then be removed and the grooves 1300, 1304 cut in the polyurethane, so that the grooves 1300, 1304 are properly aligned with their respective holes in the endcaps 1266a, 1264b.

The telemetry can 1104 is preferably assembled by beginning with two pieces (not shown) corresponding to the two halves of a main body that would be formed when the main body is cut lengthwise. Next, the fibers 1130, 1160 are cut, passed through their corresponding pairs of holes (1128, 1134 and 1164, 1172, respectively) in the endcap 1264a and spliced to the couplers 1150, 1154. The couplers 1150, 1154 along with their corresponding splices, as well as the fibers 1130, 1160 may then be placed into one of the halves. The fibers 1180 and 1222, in turn, may then be passed through their respective holes 1184, 1230 in the interlink 1296, specifically through the endcap 1266a (see FIG. 23). The interlink 1296 and the endcap 1264a are then be glued to the main body 1260a with epoxy, and the fibers 1130, 1168 are glued into their respective holes using epoxy. (The epoxy herein may be a high temperature aluminum filled epoxy such as Cotronics 454B.) The interlink 1296 is then dipped in polyurethane to form a thin layer 1308 that encapsulates the fibers 1130, 1160 to keep the fibers in a fixed position (i.e., the fibers are "hard potted"). The telemetry can 1104 may then be partially potted using epoxy (or glue may be used) to keep the couplers 1150, 1154 and their corresponding splices from being jostled and damaged during operation. The two halves may then be sealed together at ambient pressure with epoxy to form the telemetry can 1104, which is capable of withstanding hydrostatic pressure and protecting the couplers 1150, 1154 which are positioned therein.

The reference mandrel 1110 and the sensing mandrels 1120, 1122 are advantageously assembled in a similar fashion, except that it is not necessary to begin the assembly procedure with halves of a main body. (In the case of the reference mandrel 1110, the hydrophone couplers 1192, 1218 may be inserted into the reference mandrel through one of its ends before the reference mandrel is sealed with its endcaps. The sensing mandrels 1120, 1122, on the other hand, do not house optical components.) The reference fiber 1196 and the sensing fiber 1198 are wrapped around the reference mandrel and the sensing mandrel, respectively. The reference mandrel 1110 and the sensing mandrels 1120, 1122 are likewise sealed at ambient pressure and can withstand very large hydrostatic pressures. In the case of the reference mandrel 1110, the cover 1270 may be placed over the reference mandrel 1110 to act as a pressure buffer, as discussed above.

Once the assembly of the sensor 1002 (see FIGS. 16 and 19) is complete, the interlinks 1296 of the sensor 1002 are advantageously surrounded by the spring members 1080 (see FIG. 18) for additional protection against the strains and stresses that may be encountered during deployment and operation of the hydrophone 1000. Following assembly of the flanges 1040 and their associated stress relief wires 1050 around the sensor 1002, a material such as polyurethane (e.g., the PRC 1547 from Courtaulds Aerospace, discussed above) may be molded around the sensor 1002, the spring members 1080, the spring 1060, the flanges 1040, and the stress relief wires 1050 to form the filler member 1012 so that the hydrophone 1000 is well shielded from the harsh chemical and mechanical conditions associated with down hole applications. As a result of this molding procedure, the interlinks 1296 are well surrounded by polyurethane, since polyurethane is also advantageously used to construct the interlinks, as discussed above. In this manner, the fibers 1180, 1230, 1196, 1198 are embedded in flexible interlinks 1296 which have the pitch and tension necessary to survive the bending encountered during deployment and handling of the cable 1004.

The molding procedures disclosed herein (in connection with, for example, the interlink 1296 or the hydrophone 1000) may be performed by placing a mold around the object to be encased and then pulling a vacuum on that object. The object may be heated to 140° F. for 10–15 minutes before polyurethane is injected around it. After injecting polyurethane around the object, the vacuum may be maintained for 15–20 minutes to degas the polyurethane. The polyurethane may then be cured for 14 hours at 40–70 psi and 140° F. before the mold is removed.

The use of polyurethane in the various components disclosed herein (e.g., the filler member 1012 and the interlink 1296) limits use of the hydrophone 1000 to temperatures up to about 150° C. Teflon or Viton may be substituted for polyurethane, however, and these materials may be used up to about 220° C. The optical couplers and adhesives herein may function up to temperatures of 200° C. or even 220° C.

System Performance

The acoustic sensing system 100 of the present invention may include numerous acoustic sensors S1–S192. The embodiments described above include 96 and 192 sensors S1–S192, respectively, as well as 96 and 192 channels in the processing electronics 304 for processing the output of the 96 or 192 sensors. Having a large number of sensors S1–S192 offers a significant improvement over prior art systems. For example, having a large number of sensors S1–S192 increases the potential resolution of measurements such as cross-well tomography and also dramatically reduces the time required to complete a geological survey.

The acoustic sensing system 100 of the present invention offers other advantages over the prior art. TABLE V provides a summary of the performance and specifications of the acoustic sensing system 100 described above comprising 96 fiber optic sensors S1–S96. The acoustic sensing array 602 of the present invention, however, is not limited to 96 or 192 sensors S1–S192 but may include as many as 400 sensors.

As discussed above, the acoustic array 602 is small enough to fit into production tubing. The cable 202 shown in FIG. 2 can be inserted in production tubing having an inner diameter of two inches and even in production tubing having an inner diameter of 1.25 inches. The cable 202 in the embodiment described above with 96 sensors has an outer diameter of 1.22 inches and includes armoring. Thus, the acoustic array 602 can be inserted in the production tubing in the casing of a well 118 rather than requiring removal of the production tubing to fit the cable in the casing.

The acoustic sensing system 100 of the present invention is rugged enough to operate in the harsh downhole environment. The cable 202 can be inserted in a well 118 to a depth of over 10,000 feet where the temperature is over 150° C. and the pressure is over 5,500 pounds per square inch.

The acoustic sensing system 100 of the present invention has a large enough bandwidth to perform real time sensing of the acoustic wave, including processing the output of the acoustic sensors S1–S192 and outputting data in conventional seismic format. Since the acoustic sensors are optical sensors, they do not limit the bandwidth of the system. Rather, the bandwidth is limited by the bandwidth of the processing electronics 304. However, the processing electronics 304 is fast enough to measure the acoustic vibration produced by an acoustic source 130 and permit viewing of the results soon thereafter. Consequently, if data are to be acquired, processed, and outputted in real time and in a format that the surveyor can read, the surveyor can modify the survey based on the results being generated. For example, if the data appears to indicate the possible presence of an in-place reserve, the acoustic source 130 and/or acoustic sensor array 602 could be repositioned for further investigation.

In contrast, limitations on speed and bandwidth prevent conventional acoustic sensor arrays from achieving real time processing. Rather, once measurements are taken, data is recorded on magnetic tape and is transported to a location away from the well 118 or drill site for processing.

In addition to being fast, the acoustic sensor system 100 of the present invention has a low acoustic noise floor. In particular, the integrated RMS acoustic noise over the detection bandwidth is 0.1 microbar RMS.

The acoustic sensor system 100 of the present invention also has a wide dynamic range. Large voltage outputs for small acoustic signals enable the system to sense and record small amplitude acoustic waves 102. At the same time, the system is able to sense and record large amplitude acoustic waves 102. Specifically, the embodiment described above having 96 sensors S1–S96 has an instantaneous dynamic range of 132 decibels (dB) for the acoustic band ranging from 1 Hz to 400 Hz and has an instantaneous dynamic range of 120 dB for the acoustic band ranging from 401 Hz to 1000 Hz.

TABLE V

| PERFORMANCE CHARACTERISTICS | CAPABILITY | |
|---|---|---|
| Number of Acoustic Channels | 96 | Expandable to 192 |
| Lead Cable Length | 10,000 feet | |
| Array Cable Length | 500 feet | |
| Array Cable Diameter | 1.22 inches | Includes armoring |
| Operating Pressure | in excess of 5500 p.s.i. | |
| Operating Temperature | in excess of 150° C. | |
| Noise Floor | 0.1 mbar RMS | |
| Instantaneous Dynamic Range | 132 dB | Minimum from 1 Hz to 400 Hz |
| | 120 dB | Minimum from 401 Hz to 1000 Hz |
| Distortion | −80 dB | |
| Crosstalk | −85 dB | |
| Acoustic Passband | 1 Hz to 1440 Hz | |
| Ripple | +/−0.2 dB | |
| Channel-to-channel | +/−0.34 dB | |
| Output Data Sample Rate | 4 kHz, 2 kHz, 1 kHz, and 500 Hz | Selectable |
| Output Data Format | SEG-D Rev. 2 | |
| Output Data Resolution | 24 bits | Fixed point |
| Auxiliary Channels | 16 | |
| Input Signal Amplitude | 10 VDC (0 to peak) | |
| Maximum Input Frequency | 1.5 kHz | |
| Sample Rate | 4 kHz | |
| Resolution | 16 bits | |
| External Sync | 10 msec | Bi-directional TTL or switch closure |
| Electronics Cabinet | 48" × 19" × 17"; less than 250 lbs. | AC powered |
| GPS Capability | Included | 1575 MHz antenna |
| Gamma Tool | Included | |

The acoustic sensor system 100 minimizes crosstalk between signals of a different wavelength. The crosstalk of the system having 96 sensors S1–S96 is −85 dB.

The acoustic sensor system 100 also minimizes distortion. The distortion of the system having 96 sensors S1–S96 is −80 dB.

The acoustic sensor system 100 has an acoustic bandpass between 1 Hz and 1440 Hz. Accordingly, frequency components between 1 Hz to 1440 Hz of the acoustic wave are sensed by the system 100. The acoustic sensor system 100 outputs data in SEG-D REV.2 format, a conventional format complying with standards set by the Society of Exploration Geophysicists that is well know in the art. The acoustic sensor system 100 also can output data at a sample rate of 500 Hz, 1 kHz, 2 kHz, and 4 kHz upon the user's selection. The output data resolution is 24 bits.

As described above, the system 100 can accept auxiliary channels. The embodiment described above having 96 sensors S1–S96 can accept sixteen single-ended auxiliary channels or eight differential auxiliary channels. These auxiliary channels have a maximum input frequency of 1.5 kHz. These channels are sampled at a rate of 4 kHz and with a resolution of sixteen bits.

The system 100 also accepts an external sync pulse. The embodiment described above having 96 sensors S1–S96 accepts a 10-millisecond long external sync pulse. This sync pulse can be generated using bi-directional TTL (i.e., with active pull-up and active pull-down) or switch closure (i.e., active pull-down with resistive pull-up).

As described above, the acoustic sensing system 100 preferably comprises a GPS system 628. The acoustic sensing system 100 additionally may comprise a gamma tool. Gamma tools, which are well known in the art, are used to measure the depth of the cable by counting markers on the casing as discussed above.

One additional advantage provided by the acoustic sensing system 100 of the present invention is that this system is significantly less sensitive to tube waves than conventional systems. A tube wave, as is well known in the art, corresponds to acoustic waves traveling up and down the borehole 124, either through the metal casing or through water in the bore hole. During data acquisition, the acoustic sensing system 100 of the present invention advantageously is less affected by tube waves than conventional acoustic sensing systems.

Although the acoustic sensing system 100 of the present invention has been described in the downhole environment for the purpose of geophysical surveys designed to locate oil reserves, its use is not so limited. This acoustic sensing system 100 of the present invention may be otherwise employed to measure acoustic vibrations at a series of remote locations.

More generally, the present invention may be embodied in other specific forms without departing from the essential characteristics described herein. The embodiments described above are to be considered in all respects as illustrative only and not restrictive in any manner. The scope of the invention is, therefore, indicated by the following claims rather than the foregoing description. Any and all changes which come within the meaning and range of equivalency of the claims are to be considered in their scope.

What is claimed is:

1. A system for sensing subterranean acoustic waves emitted from an acoustic source, said system comprising:
    a cable;
    at least one optical source emitting light;
    a plurality of optical sensors surrounded by the cable that receive said light and alter said light in response to said acoustic waves, and wherein each sensor includes, a telemetry can, a reference mandrel and at least one sensing mandrel all aligned end to end coaxially to reduce the profile of the cable;
    at least one optical detector that receives said altered light and outputs an electrical signal; and
    electronics that processes said electrical signal and converts said signal into seismic acoustic data format.

2. The system of claim 1, wherein said optical source comprises a laser source.

3. The system of claim 2, wherein said system comprises a plurality of laser sources at different wavelengths.

4. The system of claim 1, further comprising at least one distribution optical fiber line that distribute said light emitted from said optical source to said sensors.

5. The system of claim 4, wherein said distribution optical fiber lines are contained in the cable.

6. The system of claim 5, wherein said cable is less than 2 inches in diameter.

7. The system of claim 5, wherein said cable is less than 1.25 inches in diameter.

8. The system of claim 5, wherein said cable includes a downlead cable having no sensors but containing said distribution and return distribution optical fiber lines.

9. The system of claim 8, wherein said downlead cable is at least 1,000 feet long.

10. The system of claim 8, wherein said downlead cable is at least 10,000 feet long.

11. The system of claim 8, wherein said downlead cable is at least 20,000 feet long.

12. The system of claim 5, wherein said sensors are contained in an acoustic array cable extending from the cable.

13. The system of claim 5, wherein said cable is lowered into a well.

14. The system of claim 5, wherein said cable is lowered into an oil well.

15. The system of claim 14, wherein said cable is lowered into a casing of an oil well.

16. The system of claim 15, wherein said cable is lowered into production tubing in an oil well.

17. The system of claim 14, wherein said oil well has a top, wherein said cable is lowered into a pipe in said oil well at said top, and wherein a region of said pipe at said top of said oil well has a pressure that is higher than ambient pressure, said pipe being fitted with a grease injection head having an opening therein, and wherein said cable has a uniform outside diameter sized such that said cable fills said opening to thereby maintain said pressure in said pipe.

18. The system of claim 17, wherein said pipe comprises said casing.

19. The system of claim 17, wherein said pipe comprises production tubing.

20. The system of claim 11, wherein said cable is immersed in water.

21. The system of claim 5, wherein the cable includes an acoustic array cable containing said sensors.

22. The system of claim 21, wherein said acoustic array cable does not vary in diameter more than ±0.01 inches.

23. The system of claim 21, wherein said sensors are approximately evenly spaced through said acoustic array cable.

24. The system of claim 23, wherein said sensors are spaced about 5 feet apart within said acoustic array cable.

25. The system of claim 24, wherein said acoustic array cable is at least 475 feet long.

26. The system of claim 24, wherein said acoustic array cable is at least 950 feet long.

27. The system of claim 23, wherein said sensors are evenly spaced a distance between 5 and 100 feet apart within said acoustic array cable.

28. The system of claim 27, wherein said acoustic array cable is at least about 475 feet long.

29. The system of claim 27, wherein said acoustic array cable is at least about 9,500 feet long.

30. The system of claim 27, wherein said acoustic array cable is at least about 950 feet long.

31. The system of claim 27, wherein said acoustic array cable is at least about 19,000 feet long.

32. The system of claim 1, further comprising at least one return optical fiber line that directs said altered light emitted from said sensors to said at least one optical detector.

33. The system of claim 1, wherein said light emitted from said at least one optical source is modulated at at least one modulation frequency.

34. The system of claim 33, wherein said electronics demultiplexes said signal.

35. The system of claim 34, wherein said electronics demultiplexes said electrical signal by mixing said signal with periodic waveforms having frequencies corresponding to said modulation frequencies and to twice said modulation frequencies.

36. The system of claim 33, wherein said electronics demodulates said signal.

37. The system of claim 36, wherein said electronics demodulates said electrical signal by mixing said signal with periodic waveforms having frequencies corresponding to said modulation frequencies and to twice said modulation frequencies.

38. The system of claim 1, wherein said sensors are capable of functioning in a downhole environment.

39. The system of claim 38, wherein said sensors are capable of functioning at a temperature of 150 degrees Celsius and at a pressure 5,500 pounds per square inch.

40. The system of claim 38, wherein said sensors are capable of functioning 10,000 feet below a surface of the earth.

41. The system of claim 1, wherein said optical sensor comprises a hydrophone.

42. The system of claim 41, wherein said optical sensor comprises an Mach-Zehnder interferometer.

43. The system of claim 1, wherein said optical sensor comprises a geophone.

44. The system of claim 1, wherein said optical sensor comprises a combined hydrophone/geophone.

45. The system of claim 1, wherein said optical sensor comprises a fiber optic sensor.

46. The system of claim 1, wherein said optical sensor comprises an interferometer.

47. The system of claim 1, wherein said optical sensor comprises a fiber-optic interferometer.

48. The system of claim 1, wherein said seismic data format comprise SEG D format.

49. The system of claim 1, wherein said seismic data format comprise SEG-Y format.

50. A method for sensing subterranean acoustic waves emitted from an acoustic source, said method comprising:
producing at least one optical beam of light;
altering said beam of light in response to said acoustic waves thereby producing variations in said beam of light;
enclosing sensors that alter said beam of light with stress relief wires to prevent physical damage to the sensors;
molding a filler around the sensors and stress relief wires to provide shielding from harsh chemical and mechanical conditions;
detecting said variations in said beam of light; and
converting said detected variations into seismic data format.

51. The system of claim 1, further comprising a central strength member that comprises:
a plurality of optical fibers extending longitudinally along the axis of the cable;
a tubular shaped sheath surrounding the optical fibers and extending along the length of the central strength member; and
a flange at an end of the sheath and adjacent to one end of a sensor and having an outer surface and plurality of raised areas extending radially therefrom.

52. The system of claim 51, further comprising;
a spring surrounding the central strength member near the flange;
a spring member surrounding interlinks of the sensors; and
stress relief wires connected between flange at opposite ends of the sensors with the wires forming a cage and surrounding the sensors and the spring members to prevent the cable from twisting and damaging the sensors.

53. The system of claim 52, further comprising a filler molded around the sensors, spring and spring members stress relief wires for shielding from harsh chemical and mechanical conditions.

54. A downhole system for sensing acoustic waves emitted from an underground acoustic source, said system comprising:
a cable;
at least one optical source emitting light;
an array of downhole optical sensors surrounded by the cable that receive said light and alter said light in response to said acoustic waves, and wherein each sensor includes, a telemetry can, a reference mandrel and at least one sensing mandrel all aligned end to end coaxially;
a plurality of optical detectors that receive said altered light and output electrical signals; and
electronics that process said electrical signals and converts said signals into seismic data format;and
stress relief wires forming a cage around the sensors, telemetry can, reference mandrel and the at least one sensing mandrel to prevent the cable from twisting and damaging the sensors.

55. A downhole system for performing cross-well tomography, said system comprising:
a cable
a plurality of laser sources each emitting light that is modulated at different frequencies;
an array of downhole optical sensors surrounded by the cable that receive said light and alter said light in response to acoustic waves that impinge on said optical sensors, and wherein each sensor includes, a telemetry can, a reference mandrel and at least one sensing mandrel all aligned end to end coaxially; a plurality of optical detectors that receive said altered light and output electrical signals;
electronics that process said electrical signals and converts said signals into seismic data format; and
stress relief wires forming a cage around the sensors, telemetry can reference mandrel and the at least one sensing mandrel to prevent the cable from twisting and damaging the sensors.

56. The system of claim 1, wherein each mandrel further comprises at each end an end cap having a convex-shaped and hemispherical contour to withstand high pressure and a diameter greater than a body of each mandrel to confine layers of fiber wrapped around the body.

57. A method for sensing subterranean acoustic waves emitted from an acoustic source, said method comprising:

producing a plurality of coherent beams of light;

modulating said plurality of coherent beams of light at different frequencies, altering said beams of light in response to said acoustic waves thereby producing variation in said beams of light;

enclosing sensors that alter said beam of light with stress relief wires to prevent physical damage to the sensors;

molding a filler around the sensors and stress relief wires to provide shielding from harsh chemical and mechanical conditions;

receiving said altered beams of light and outputting electrical signals; and processing said electrical signals and converting said signals into data in seismic data format.

* * * * *